United States Patent [19]

Humphrey

[11] Patent Number: 4,805,571
[45] Date of Patent: Feb. 21, 1989

[54] INTERNAL COMBUSTION ENGINE

[75] Inventor: Duane W. Humphrey, Wilmington, Del.

[73] Assignee: Humphrey Cycle Engine Partners, L.P., Wilmington, Del.

[21] Appl. No.: 907,101

[22] Filed: Sep. 15, 1986

Related U.S. Application Data

[63] Continuation of Ser. No. 734,057, May 15, 1985, abandoned.

[51] Int. Cl.$^4$ ............... F01L 13/00; F02D 9/06; F02D 13/02; F02B 77/02
[52] U.S. Cl. ............... 123/316; 123/90.15; 123/25 C; 123/323; 123/668; 123/73 C
[58] Field of Search ............... 123/90.15, 90.16, 25 C, 123/25 D, 323, 668, 669, 90.6, 316, 73 C

[56] References Cited

U.S. PATENT DOCUMENTS

| | | | |
|---|---|---|---|
| 1,610,888 | 12/1926 | Sauer | 123/316 |
| 1,625,205 | 4/1927 | Grumme | 123/25 C |
| 2,344,993 | 3/1944 | Lysholm | 123/316 X |
| 2,670,595 | 3/1954 | Miller | 123/90.15 |
| 2,817,322 | 12/1957 | Miller | 123/316 |
| 3,019,778 | 2/1962 | Kloss | 123/323 |
| 3,234,923 | 2/1966 | Fleck et al. | 123/90.15 |
| 3,786,792 | 1/1974 | Pelizzoni et al. | 123/90.16 |
| 4,185,593 | 1/1980 | McClure | 123/25 D |
| 4,280,451 | 7/1981 | Moore | 123/90.6 |
| 4,539,946 | 9/1985 | Hedelin | 123/316 X |
| 4,646,707 | 3/1987 | Pfefferle | 123/668 |

FOREIGN PATENT DOCUMENTS

| | | | |
|---|---|---|---|
| 2730608 | 1/1979 | Fed. Rep. of Germany | 123/316 |
| 0093940 | 5/1984 | Japan | 123/316 |
| 1587842 | 4/1981 | United Kingdom | 123/316 |

Primary Examiner—Willis R. Wolfe, Jr.
Attorney, Agent, or Firm—Mortenson & Uebler

[57] ABSTRACT

A two- or four-stroke internal combustion engine is provided having individual features and combinations of features not heretofore known which provide enhanced power, efficiency and braking performance compared to known engines.

20 Claims, 25 Drawing Sheets

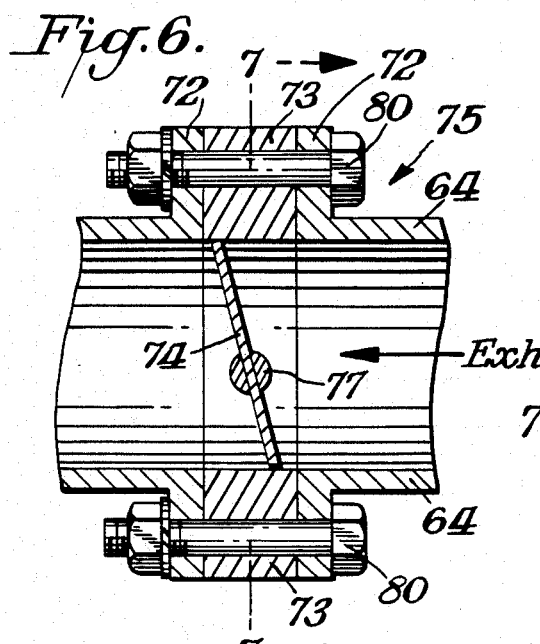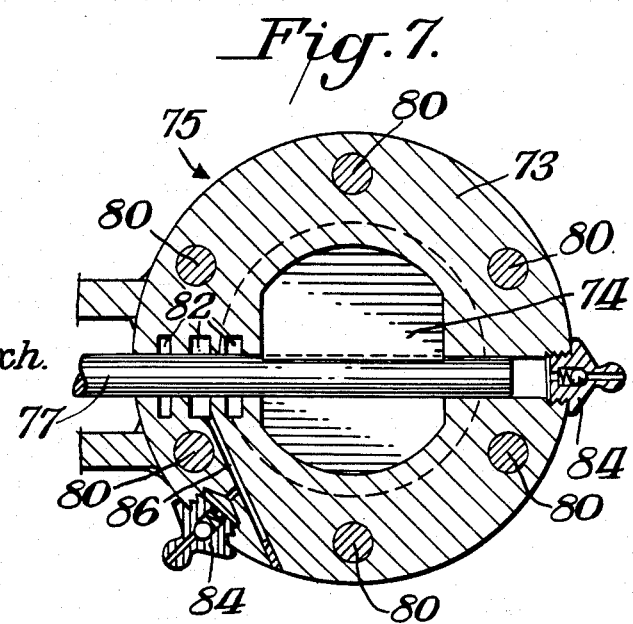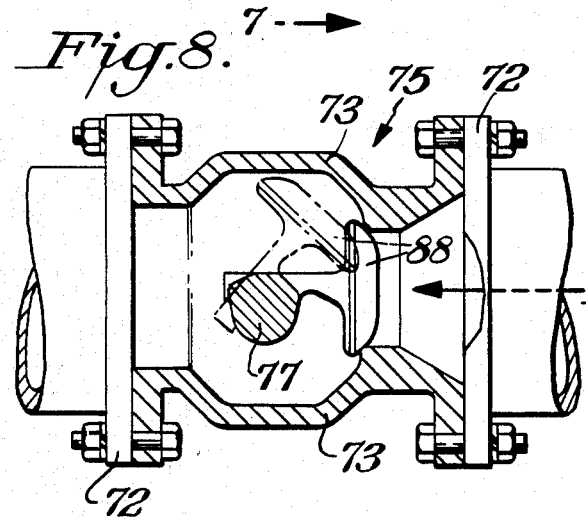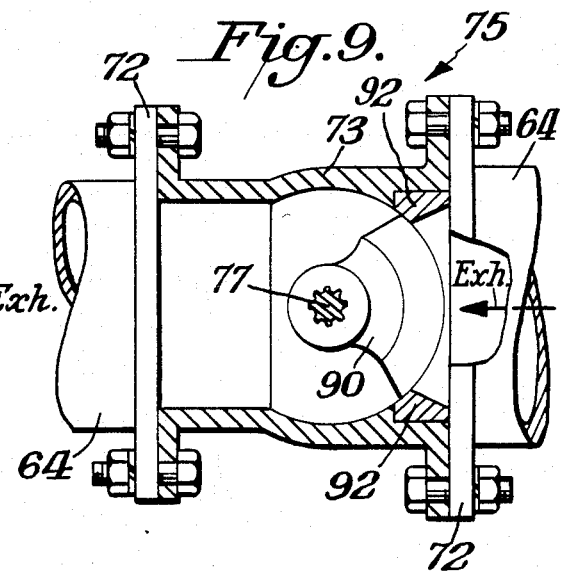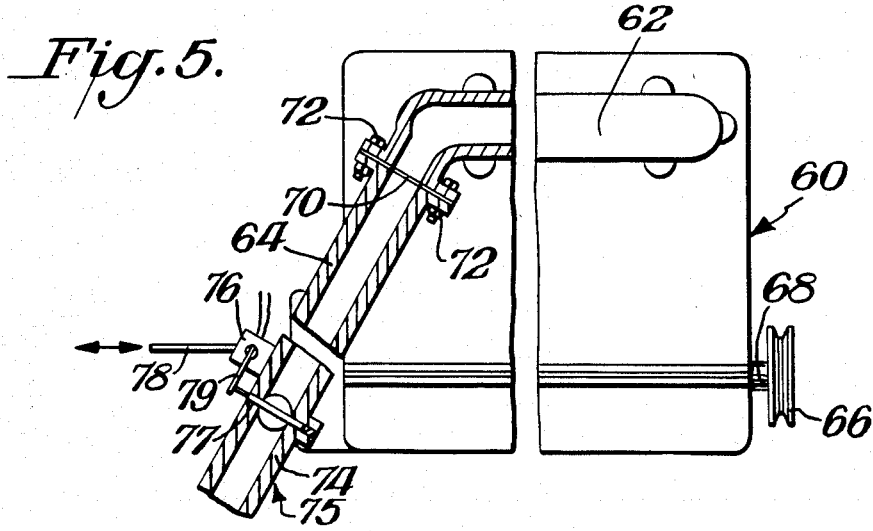

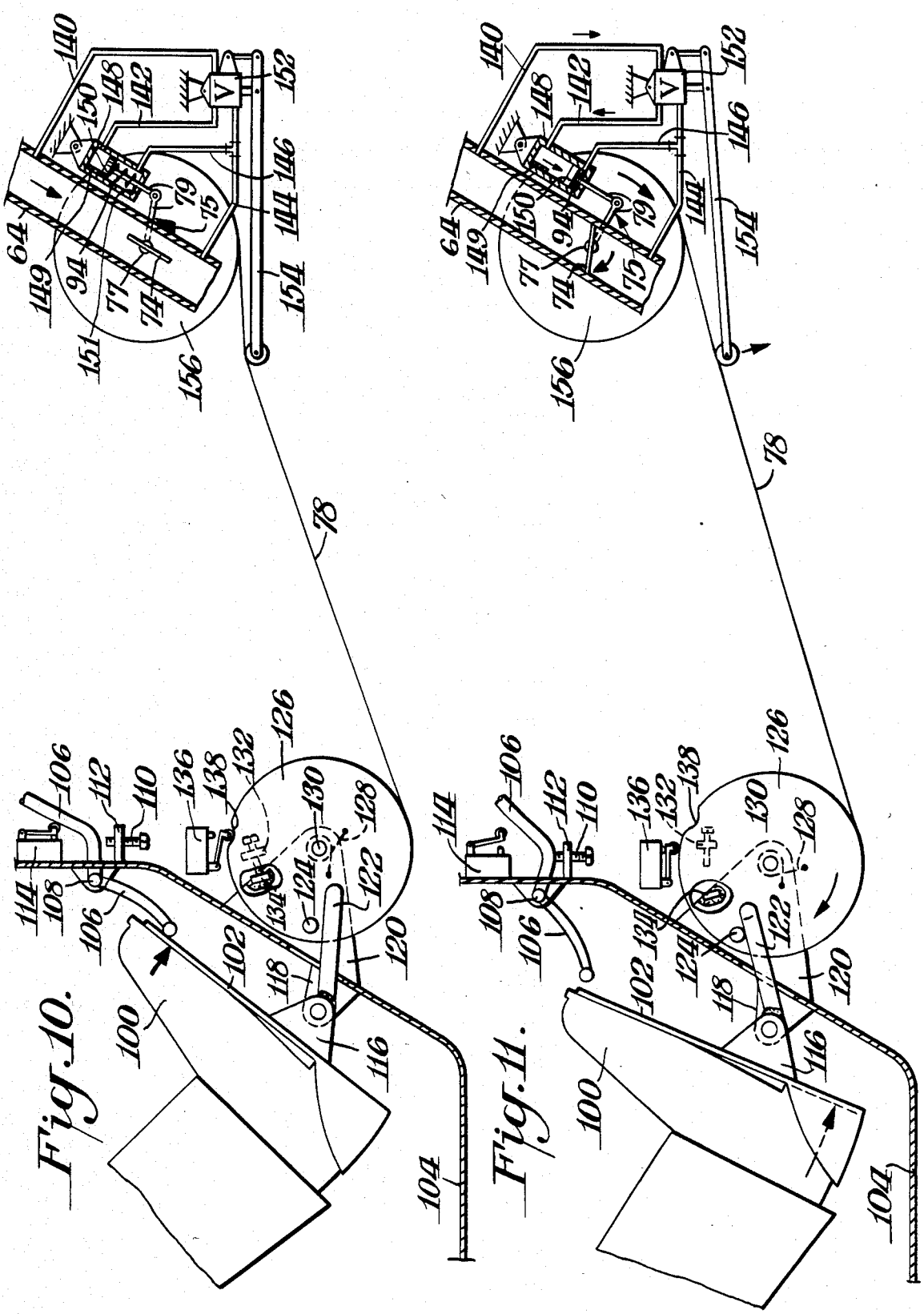

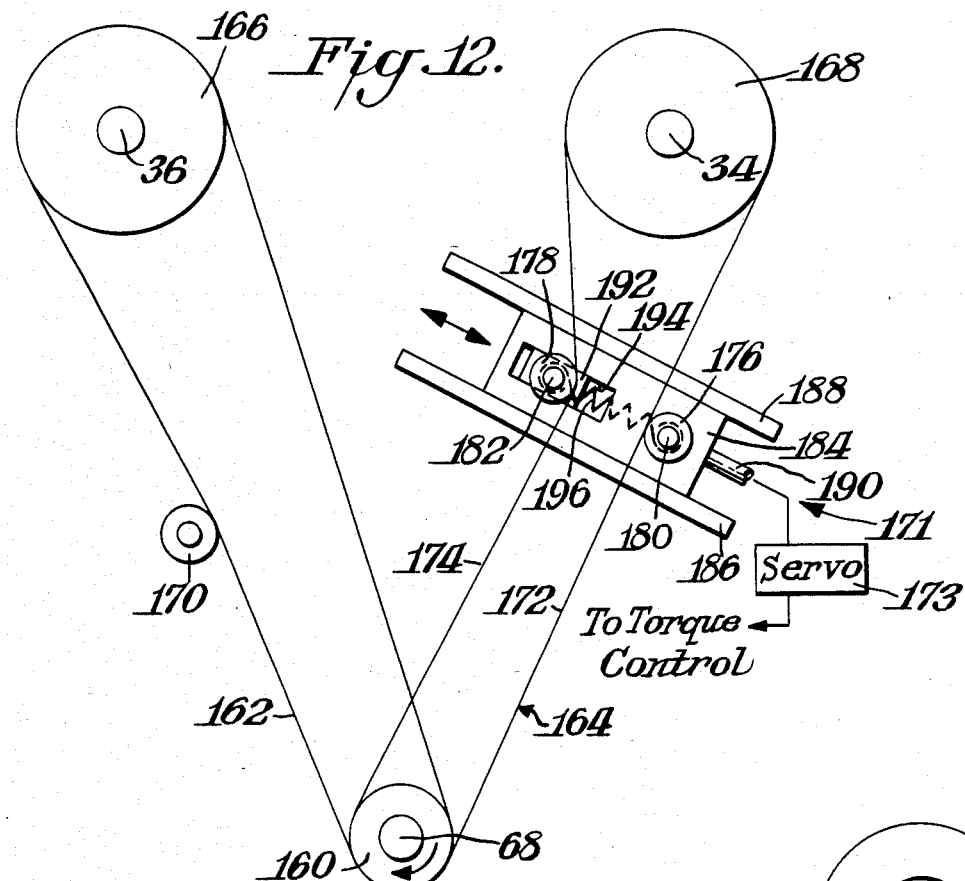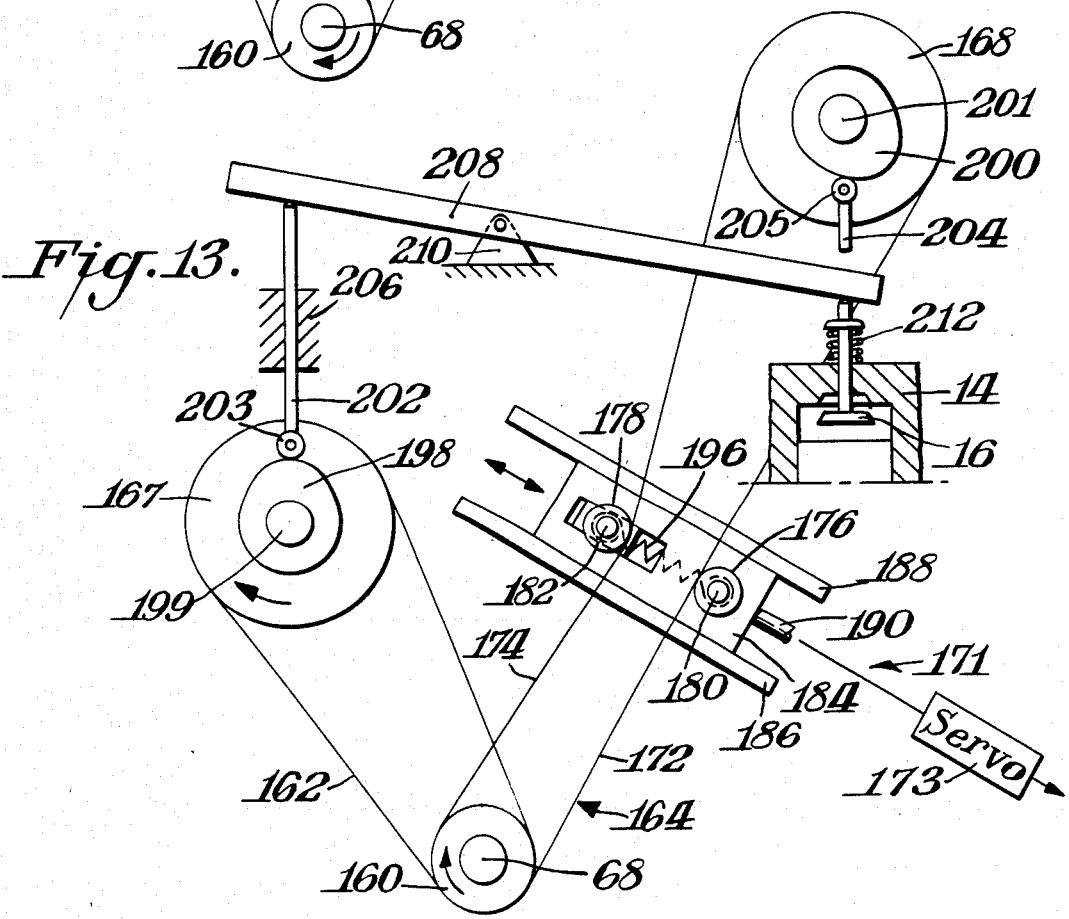

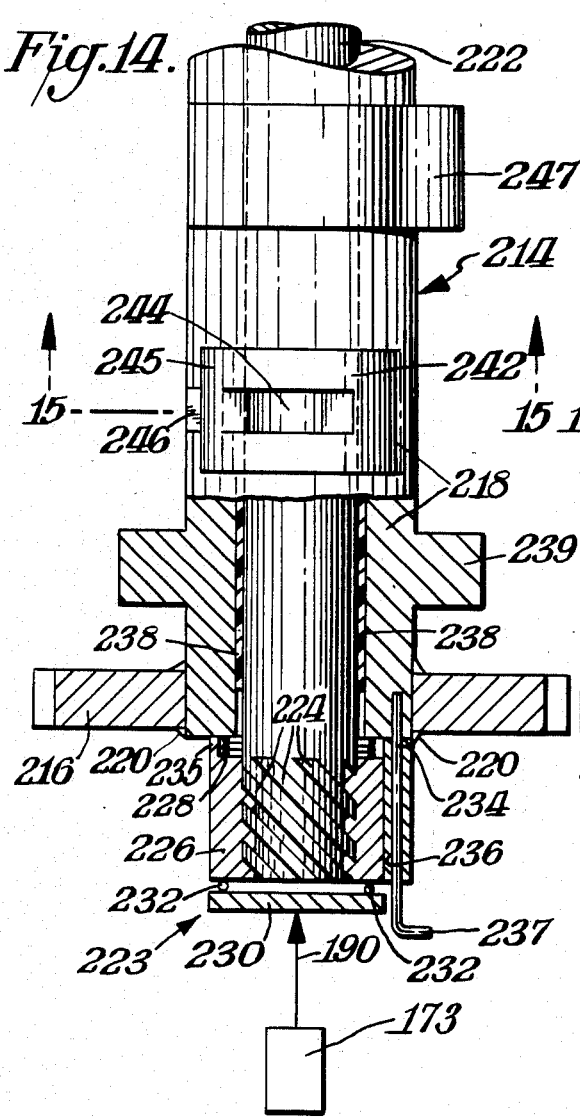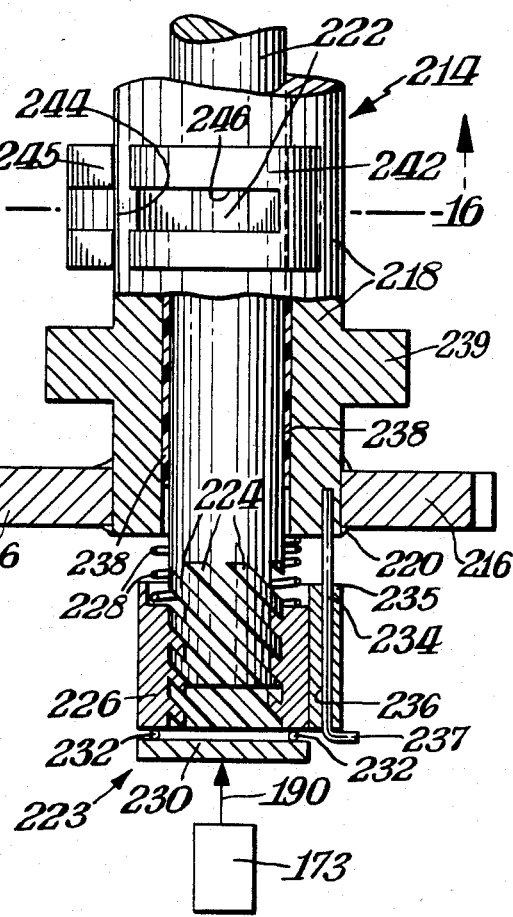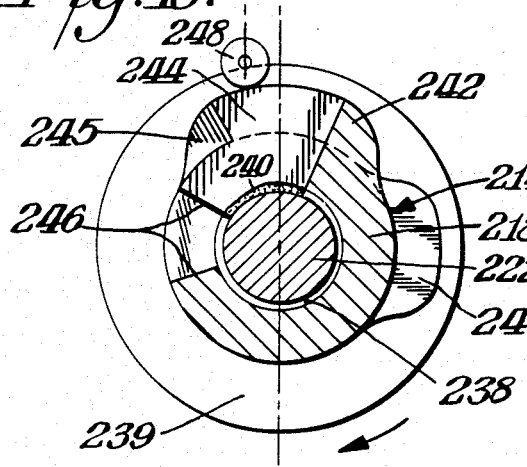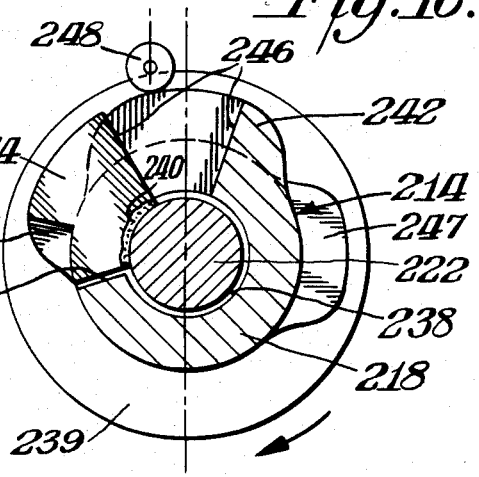

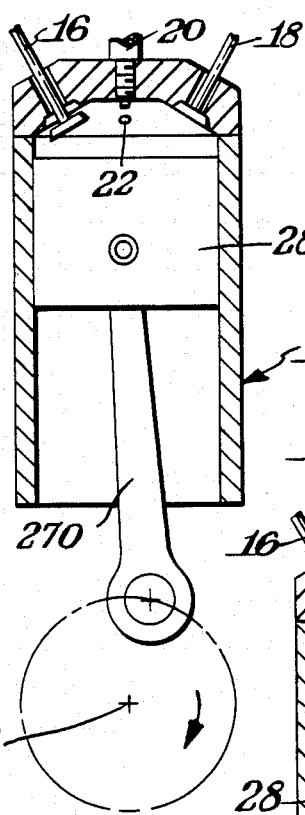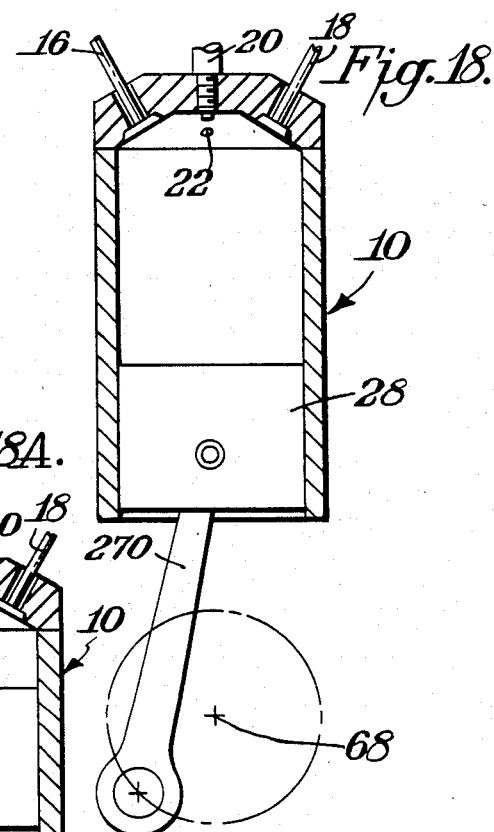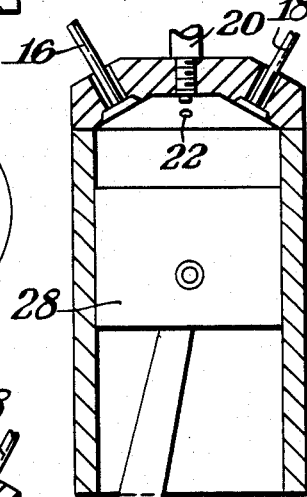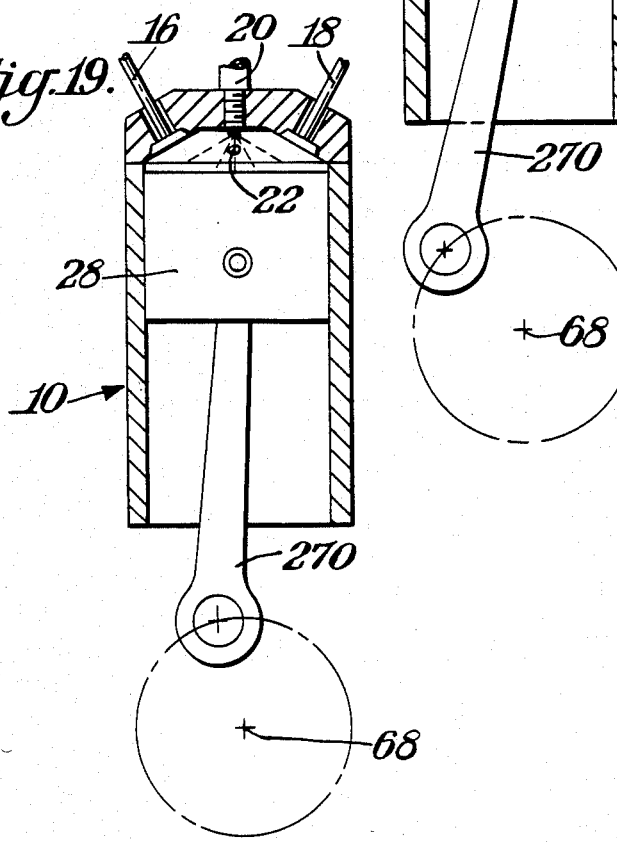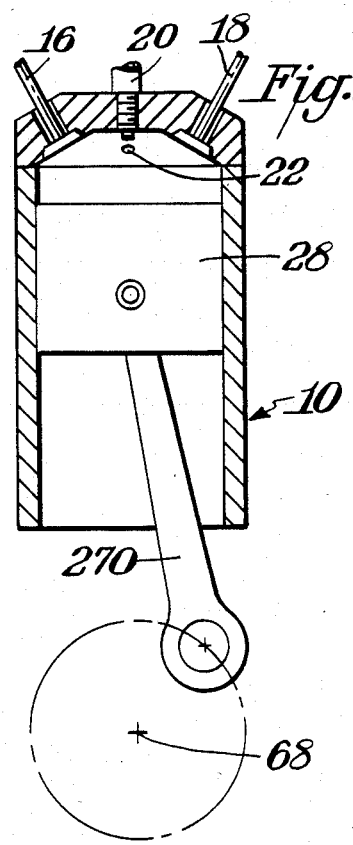

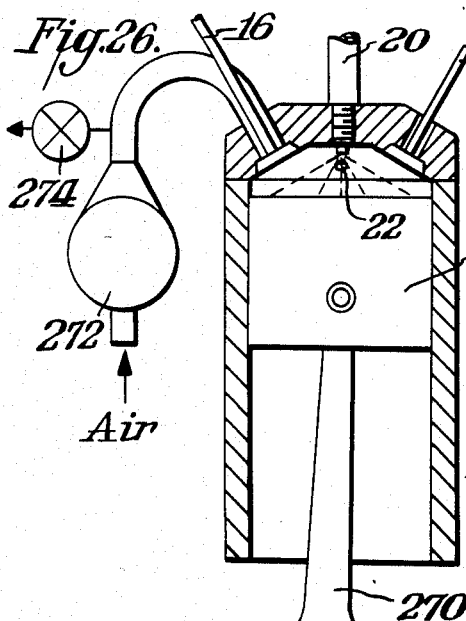
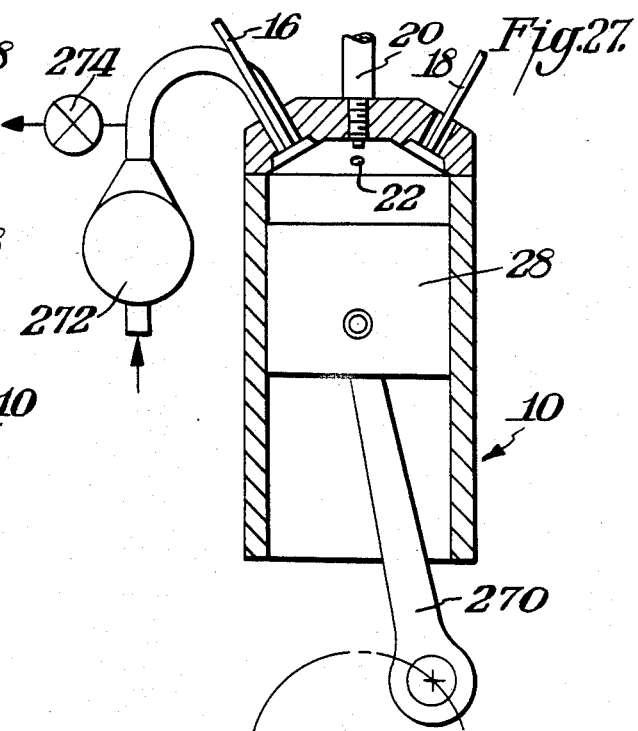
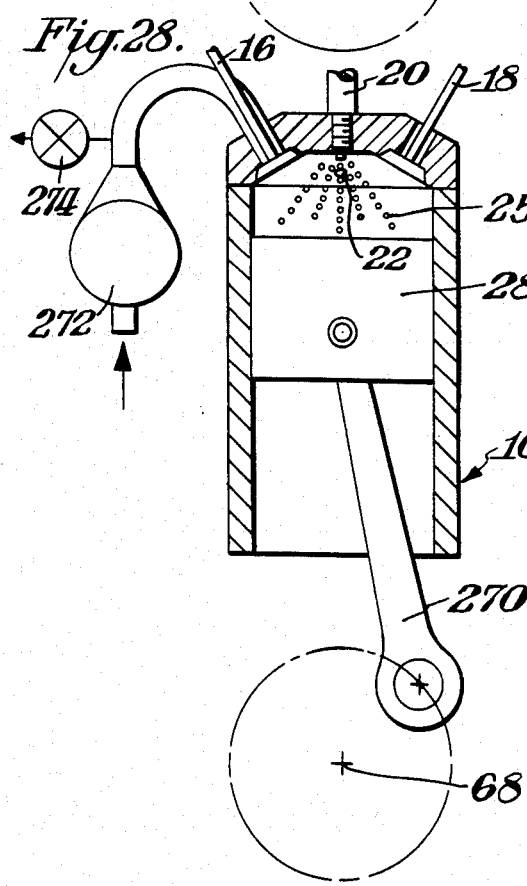
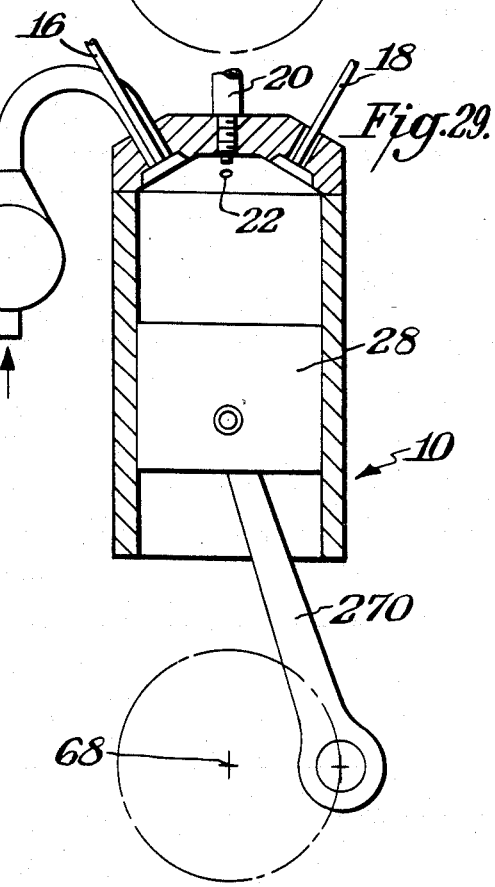

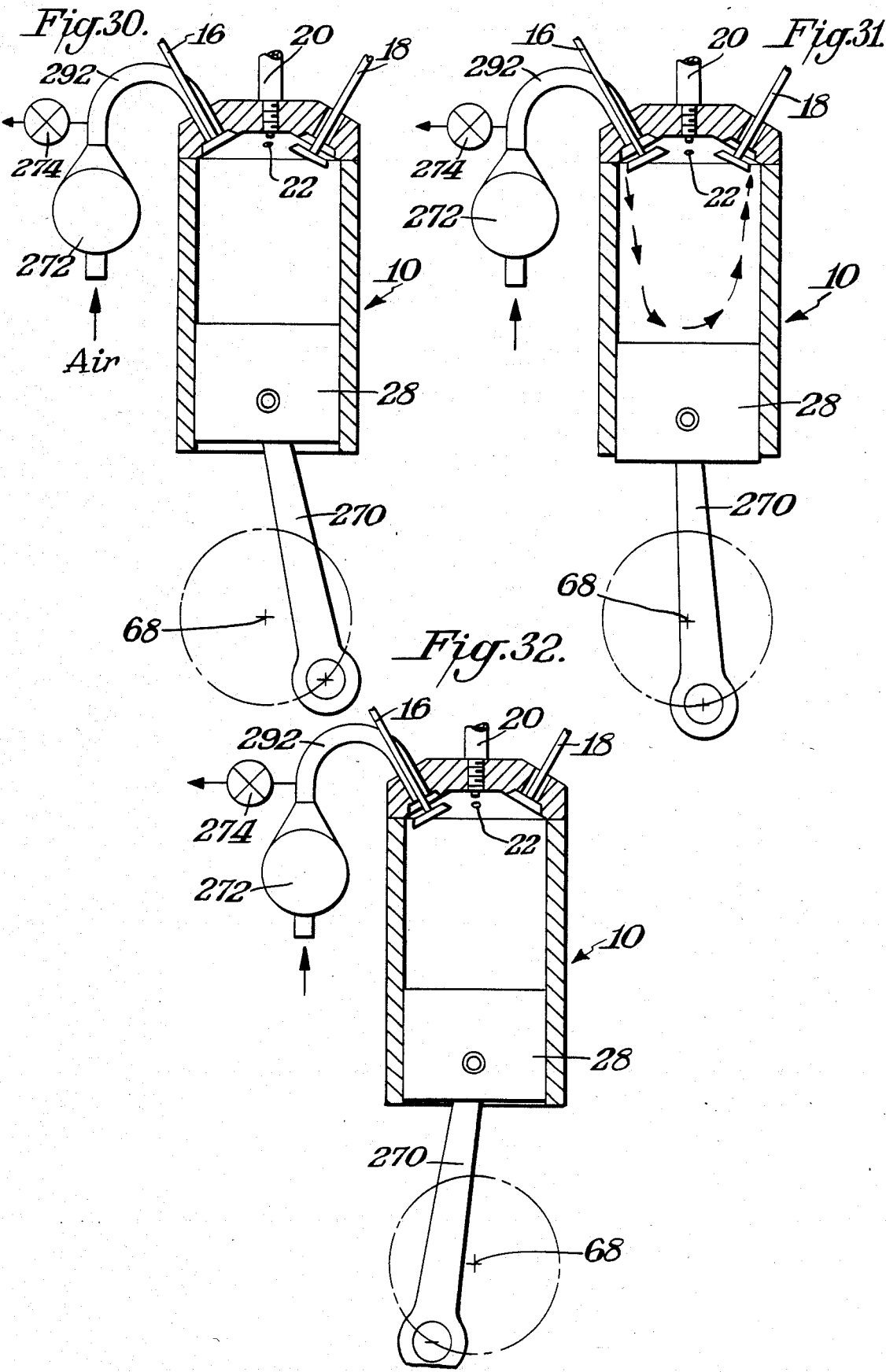

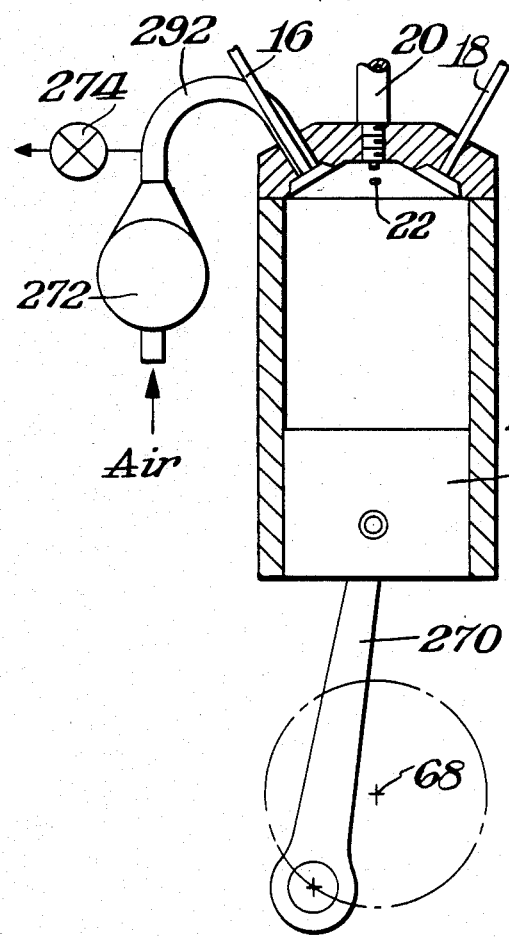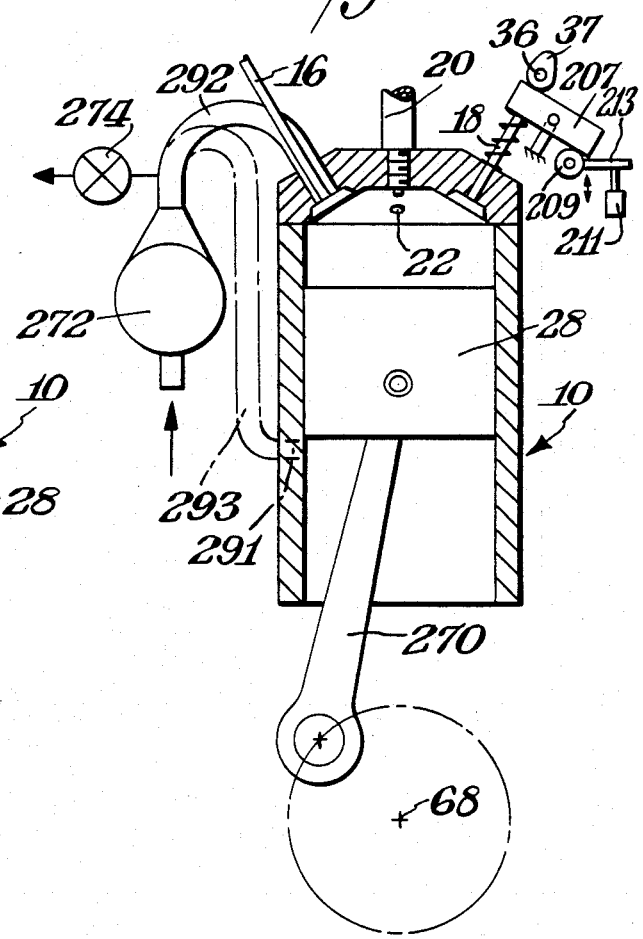

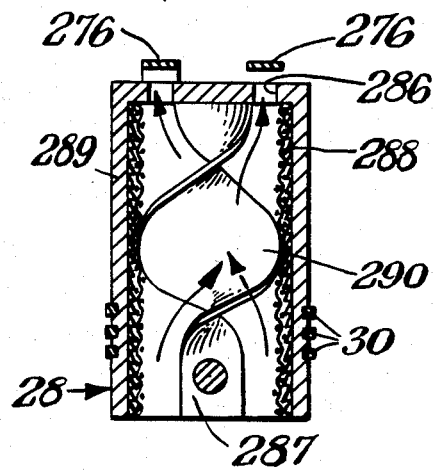

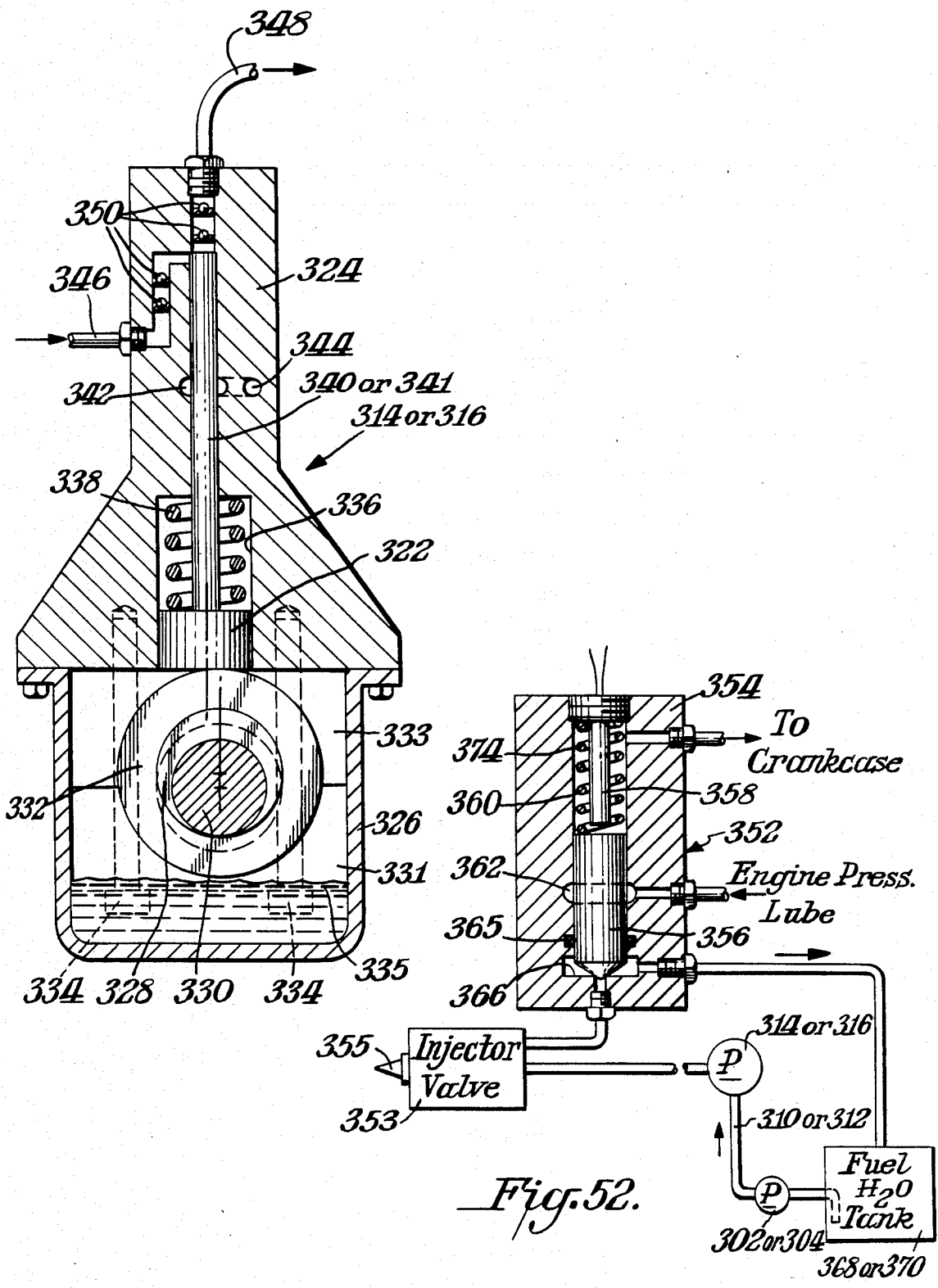

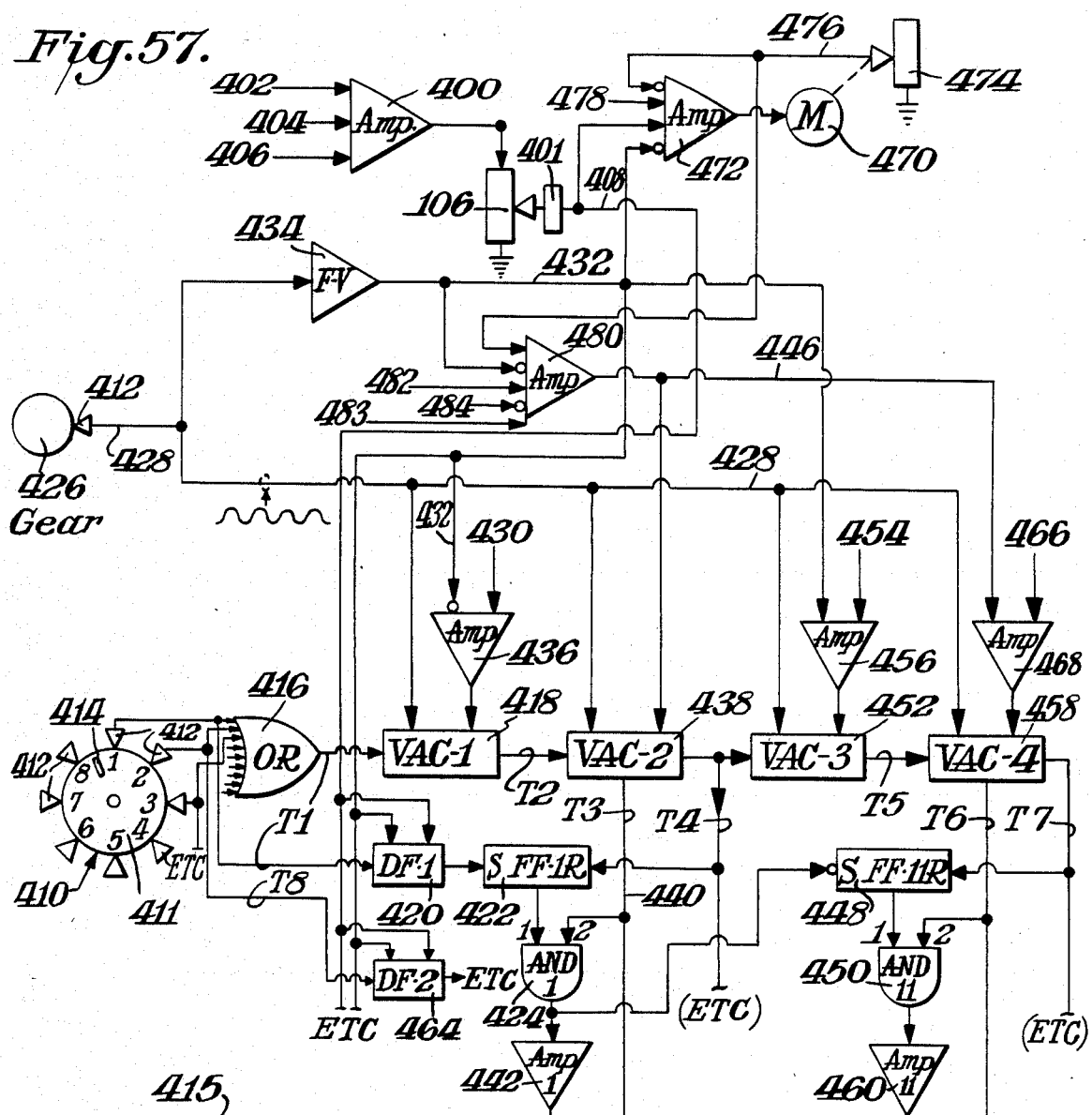
Fig. 57.
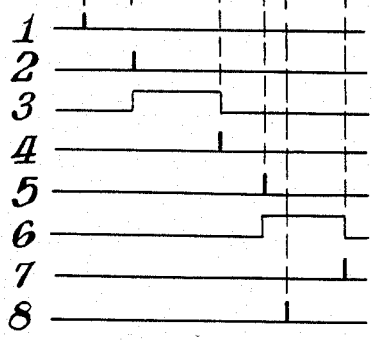
415 Timing Sequence

INTERNAL COMBUSTION ENGINE

CROSS-REFERENCE TO RELATED APPLICATION

This application is a continuation of prior copending application Ser. No. 06/734,057, filed May 15, 1985, now abandoned.

BACKGROUND OF THE INVENTION

The present invention relates to internal combustion engines for all present uses including the actuation of vehicles such as automobiles and trucks.

Conventional gasoline fueled "Otto" cycle engines are characterized by approximately an 8 to 1 compression ratio, controlled fuel-air ratio, variable fuel/air charge controlled by the accelerator, variable compression, and combustion pressure and require non-leaded gas to protect the platinum catalytic converter. Each cylinder of a four-stroke cycle engine fires on every other revolution of the crankshaft. Of the fuel used, about 30% of the available energy is lost to jacket cooling, about 30% is exhausted to the atmosphere and the engine is about 27% efficient. The engine requires 80+ octane fuel, has average weight per horsepower delivered, runs well at high rpm and with variable torque, but has poor efficiency, has high air pumping losses for the four-cycle engine and extremely high air pumping losses for the two-cycle engine.

Conventional diesel engines are generally characterized by operation at a compression ratio of about 24 to 1, using a controlled fuel and fixed air charge providing a variable fuel to air ratio and fixed compression pressure with slightly variable combustion pressure. These engines generally require No. 2 fuel oil and fuels. Generally, high NOx gases are emitted. Cylinders of the four-stroke cycle engine fire every other revolution of the crankshaft. About 27% of the available fuel energy is lost to jacket cooling, about 25% is exhausted to the atmosphere and the engine is about 32% efficient. The engine weight per horsepower delivered is relatively high. The engine generally runs poorly at high rpm and runs best at constant torque. Air pumping losses of the four-stroke engine are low and are moderate for the two-stroke engine.

Certain modifications to conventional engines are known. Water injection into the cylinders of internal combustion engines are known such as, for example, the disclosure of U.S. Pat. No. 4,281,626 and the references cited therein. That reference discloses water injection before, at the end of, or after the combustion process.

Fixed early or late intake valve closing is also known, such as, for example, the disclosure of U.S. Pat. No. 4,280,451. That reference discloses fixed intake valve timing set for early closure, before the piston reaches bottom dead center, achieved by shaving the valve timing cam lobe on throttled "Otto" cycle engines. This is said to achieve a lower air charge by always starting the compression of the fuel/air charge at sub-atmospheric pressure, allowing high (13:1) compression ratios without excessive pressure and preignition at the end of the compression stroke.

Firing on demand of four, six or all eight cylinders of a V-8 engine became commmercially available in 1982.

Thermal insulation of internal surfaces of combustion chambers is also know, e.g. U.S. Pat. No. 4,103,655 and presently is in a developmental stage.

The effect of engine gear-down on vehicle braking is kown.

Among the objects of the present invention is the provision of novel engines and related drive devices that improve energy efficiency Additional objects of the present invention include the provision of engines and related drive devices that are relatively simple to manufacture.

Further objects of the invention will be more fully understood from the following description of several of its exemplifications.

SUMMARY OF THE INVENTION

A two- or four-stroke internal combustion engine is provided having pistons, cylinders forming combustion chambers, intake and exhaust valves, and having intake, compression, expansion (power) and exhaust phases in its cycle, and having means for introducing a combustible fuel and air into the cylinders, means for igniting the fuel and air mixture in the cylinders and means for exhausting gases from the cylinders following combustion. The engine has one or more of the following:

(a) means for adjustably retarding the closing of the intake valves on demand and during engine operation to close each valve after the corresponding piston reaches bottom dead center, thereby reducing air pumping losses by eliminating throttling while adjusting the air charge on demand;

(b) means for injecting fuel into the cylinders on demand;

(c) means for metering the fuel injected to stoichiometric proportions to match the air charge;

(d) thermal insulation on the surfaces of the combustion chambers;

(e) means for providing that no lubricated, sliding surface within each cylinder is directly exposed to combustion chamber gases;

(f) means for injecting water into the combustion chambers after air intake, fuel injection and after a part or all of combustion, in proportion to the amount of fuel injected;

(g) means for providing a variable and adjustable compression ratio and air charge and a fixed, high expansion ratio during engine operation;

(h) a continuous, high temperature glow plug with fast response temperature control;

(i) means for exchanging heat between exhaust gases and fuel, air and water intake;

(j) means for controlling battery charge to obtain maximum efficiency, power, and engine braking;

(k) means for throttling of exhaust gases to provide enhanced engine braking;

(l) means for pumping air and injecting fuel into the combustion chambers in a swirling or spiral flow pattern;

(m) in a two-stroke cycle engine, means for retarding the closure of the exhaust valve on demand and in a four-stroke cycle engine, means for adjustable duration opening of the exhaust valve during the compression stroke, to effect variable air charge and compression ratio and fixed, high expansion ratio;

(n) means for injecting fuel and water into the cylinders;

(o) means for recovering injected water and scrubbing the engine exhaust;

(p) means for safely using low grade exhaust heat for heating the passenger compartment;

(q) means for adjusting the timing of the start of fuel and water injection into the cylinders during engine operation;

(r) means for changing the volume (i.e. cubic centimeters per degree of crankshaft rotation) of fuel injected into the cylinders;

(s) means for utilizing many types of liquid-like fuels;

(t) means for controlling the vehicle transmission for maximum efficiency, power and engine braking;

(u) means for injecting a hydrogen peroxide solution into the cylinders instead of air and water;

(v) means for accurately measuring the rate (gallons per minute) and the total volume (gallons) of fuel injected into the cylinders;

(w) means for sensing, calculating and displaying miles travelled, miles per gallon (instantaneous or trip), fuel consumed since last fill up and fuel remaining, specific fuel consumption (pounds of fuel per horsepower/hour), miles per hour, horsepower being generated and torque being generated;

(x) control overrides for an air conditioner which provide improved power, engine braking, and efficiency;

(y) means for flash vaporizing fuel upon injection;

(z) means to hold the exhaust or intake valves partially open for engine braking enhancement;

(a,a) means for adjustably advancing the closing of the intake valves on demand and during engine operation to close each valve before the corresponding piston reaches bottom dead center, thereby controlling the engine torque and reducing air pumping losses by eliminating throttling;

(b,b) means for effecting a piston-to-cylinder, pressure-balanced gas seal by recessing the seal rings into the cylinder instead of into the pistons, thereby permitting a shorter piston design and lower friction losses;

(c,c) means for controlling fuel and water injection timing and quantity by use of an electronically energized, moving magnetic coil, polarized, fast, hydraulically balanced, by-pass valve; and (d,d) means as in (c,c) utilizing a piezo electrical signal instead of a moving coil.

BRIEF DESCRIPTION OF THE DRAWINGS

FIG. 5 is a cross-sectional in place view of an exhaust, flow-restricting, engine-braking-enhancement butterfly valve;

FIG. 6 is a side cross-sectional view of a preferred embodiment of an exhaust-flow-restricting butterfly valve;

FIG. 7 is a down stream cross-sectional view of the valve shown in FIG. 6;

FIG. 8 is a side cross-sectional view of a camflex valve used for exhaust flow restricting;

FIG. 9 is a side cross-sectional view of a sectional ball valve used for exhaust-flow-restricting;

FIG. 10 is a schematic cross-sectional view of an accelerator pedal and associated command signal generator, including the engine braking enhancement valve servo, all shown in the power-demand position;

FIG. 11 is a schematic cross-sectional view of an accelerator pedal and associated command signal generators, including the engine braking enhancement valve servo shown in the full engine braking position;

FIG. 12 is a schematic view of an engine having dual overhead camshafts with means to retard or advance the relative rotational position of the intake camshaft with respect to the exhaust camshaft;

FIG. 13 is a schematic view of a conventional engine having a single camshaft with push rods and rocker arms to operate the valves, modified by the addition of a second, overhead camshaft with means to retard its relative rotational position in order to retard closing of the intake or exhaust valves;

FIG. 14 is a top plan partly in cross-section, showing many of the principles of the preferred camshaft according to this invention, in the position for maximum engine torque;

FIG. 14a is a top plan view partly in cross-section, showing many of the principles of the preferred camshaft according to this invention, in the position for minimum engine torque;

FIG. 15 is a cross-sectional view taken along line 15—15 of FIG. 14;

FIG. 16 is a cross-sectional view taken along line 16—16 of FIG. 14a;

FIG. 17 is a first schematic in a series of one cylinder view in a fourstroke cycle engine showing the sequence of events in the engine according to the invention, depicted in this figure at the position where the exhaust valve closes;

FIG. 18 shows the cylinder at the position where the intake valve is closed during high torque operation;

FIG. 18a shows the cylinder at the position where the intake valve is closed during low torque operation;

FIG. 19 shows the cylinder at the position at the start of fuel injection;

FIG. 20 shows the cylinder at the position at cessation of fuel injection;

FIG. 26 is a first schematic in a series of one-cylinder views in a two-stroke cycle, external scavenging pump, adjustable closing intake valve engine, showing the sequence of events in the engine according to the invention, depicted in this figure at the position where in the injection of fuel starts;

FIG. 27 shows the cylinder at the position at the stop of fuel injection;

FIG. 28 shows the cylinder at the position of the start of water injection;

FIG. 29 shows the cylinder at the position at the stop of water injection;

FIG. 30 shows the cylinder at the position at the opening of the exhaust valve;

FIG. 31 shows the cylinder at the position at the opening of the intake valve;

FIG. 32 shows the cylinder at the position of the closing of the exhaust valve;

FIG. 33 shows the cylinder at the position of the closing of the intake valve (high torque demand);

FIG. 33a shows the cylinder at the position of the closing of the intake valve (low torque demand). Included is optional intake porting and engine braking enhancement;

FIG. 44 is an end view, partly in cross-section of the mechanical arrangement of the two-stroke cycle engine of FIG. 35;

FIG. 45 is a plan view of the top of the combustion chamber of the engine shown in FIG. 44;

FIG. 46 is a plan view of the top of the piston and cylinder shown in FIG. 44;

FIG. 47 is a cross-sectional elevational view of the piston shown in FIG. 44;

FIG. 48 is a schematic of apparatus for preheating combustion air;

FIG. 49 is a schematic view of a layout of fuel and water injection systems;

FIG. 50 is an elevational cross-sectional view of one plunger of an inline design of a fuel or water injection pump of the embodied invention;

FIG. 52 is an elevational cross-sectional view of a by-pass valve and schematic diagram of the associated equipment in fuel and water injection systems of this invention;

FIG. 57 is a schematic diagram of signal flow and electronic (pneumatic, hydraulic, mechanical) logic of the engine controller according to this invention;

Figures 1, 3:
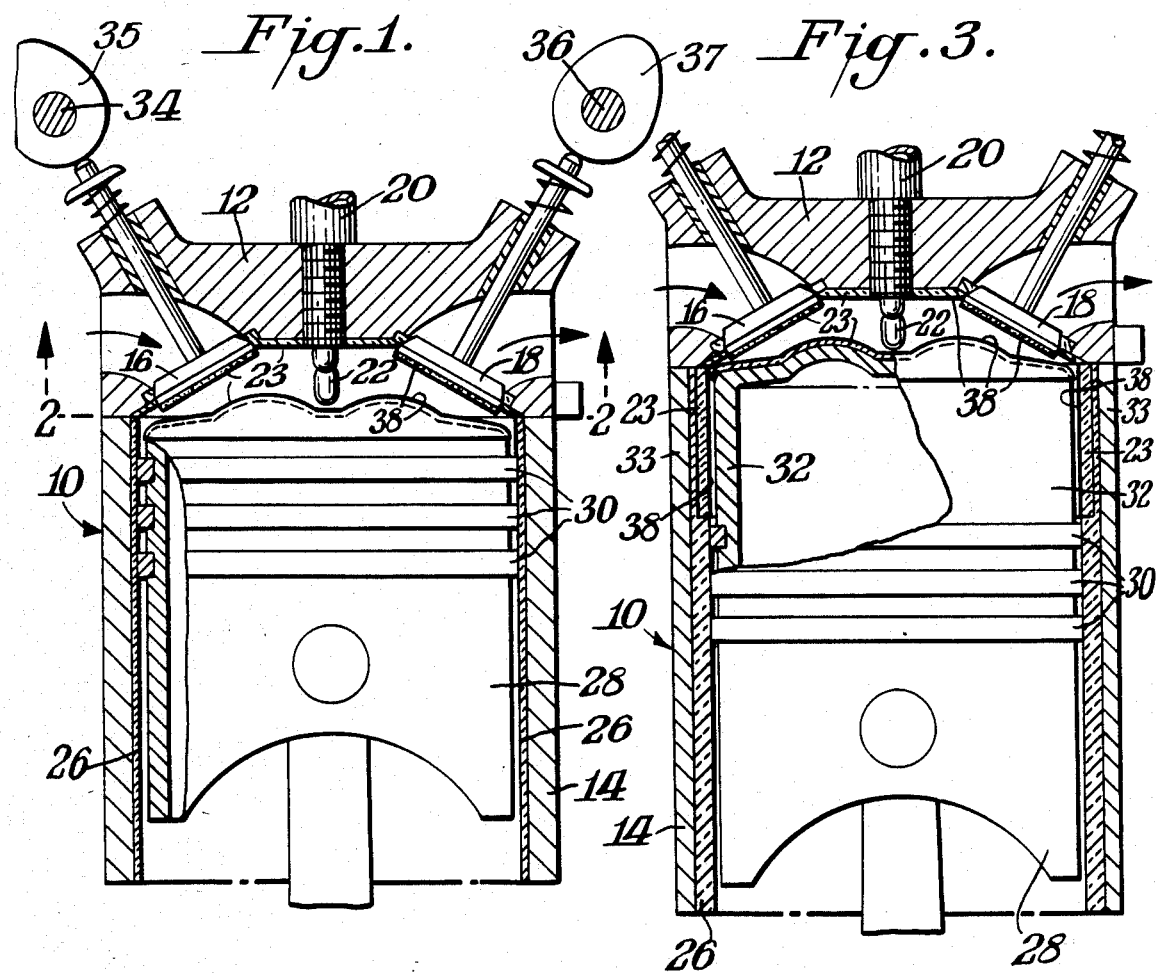
FIG. 1 is a cross-sectional view of an engine combustion chamber and associated devices for an engine in which the gasses of combustion directly contact the lubricated cylinder walls.
FIG. 3 is a cross-sectional view of an engine combustion chamber and associated devices for an engine in which the gases of combustion do not directly contact lubricated surfaces.

DETAILED DESCRIPTION OF THE INVENTION AND PREFERRED EMBODIMENTS WITH REFERENCE TO THE DRAWINGS

A two- or four-stroke internal combustion engine is provided having individual features and combinations of features not heretofore known which provide enhanced power, efficiency and braking performance compared to known engines.

According to one aspect of the present invention, a unjacketed, compression and glow-plug ignition engine is provided having an engine body containing at least one cylinder, a fuel injector in the cylinder to introduce and vaporize fuel, a continuous glow-plug in the cylinder to ignite the introduced fuel, a water injector in the cylinder to introduce water into the cylinder, and a water injection control connected to cause injection of enough water at each expansion stroke to enable operation of the engine under all conditions without a cooling blower or jacketed cooler, and with the engine temperature controlled by the quantity of water injected, which quantity varies with the quantity of fuel that is injected and, if desired, the fuel-water relationship is further varied in response to the exhaust temperature.

According to another aspect of the present invention, an automotive vehicle has a brake control and a reciprocating piston internal combustion engine that includes an exhaust conduit connected to receive exhaust as it is expelled by the piston from at least one cylinder so that the exhaust can be led away for discharge, and closure means is connected to the conduit and to a brake control to block the discharge of exhaust from the conduit when the brake control is actuated, thereby to cause the exhaust to build up in pressure in the exhaust conduit and thus cause the cylinder to provide substantial braking action on the vehicle during the exhaust stroke of the cylinder.

Exhaust braking is more effective when the exhaust valve in the cylinder relied on is connected to close no later than when its intake valve is connected to open. Also the cylinder can be connected to draw in a full charge of air during exhaust braking. The gases squeezed during the exhaust stroke into the combustion chamber of the cylinder are blocked off from the exhaust conduit when the cylinder's exhaust valve closes, and this blocked, pressurized portion of those gases is then vented into the intake system when that cylinder's intake valve opens. The intake system should be arranged to handle such venting of hot pressurized gas.

An exhaust braking brake control in one embodiment is provided with at least two actuated positions, in one of which it causes the application of braking forces directly to wheels on the vehicle, and in another of said actuated positions it causes the application of the foregoing exhaust braking without applying braking forces directly to the wheels.

The compression stroke compresses the air charge and terminates with the start of the injection of a charge of fuel from a fuel injector nozzle. Combustion starts and continues as a result of the temperature rise caused by the compression but mainly due to the local heating and catalytic effects of a glow plug.

When combustion is nearly complete, at least a few degrees of crankshaft revolution after fuel injection terminates, water injection is begun. It is continued or repeated well into the power stroke, and serves to cool the combustion products without reducing the degree of combustion completeness. Indeed, the water injection can be continued to well past bottom dead center piston position. The injected water is flashed into steam, the net effect of which is to add power to the power stroke, while cooling the hot combustion gases to temperatures that can be below 400° F. Because of such rapid cooling, dilution and stoichiometric air/fuel mixture, the formation of undesired NOx gases is reduced. Such formation is even further reduced by having the glowing exterior of the glow plug made of platinum or other catalytic material that tends to decompose, or reduce the formation of NOx.

Water injection can be started without waiting for the few degrees of delay mentioned above. Small amounts of water injected immediately after, or even immediately before, fuel injection terminates can be tolerated so long as they do no quench the burning of fuel. Thus a very fine water injection can be started immediately and continued as long as 60 crank degrees beyond bottom dead center, or even later. It is preferred not to begin the water injection until the fuel injection terminates. Thus, along with proportionate control of the amount of water injected to the quantity of fuel injected, is much more effective than the water-introduction shown in U.S. Pat. No. 4,281,626.

The exhaust stroke expels nearly all the cylinder's contents through the exhaust valve. This transfers most of the cooled exhaust gases to the exhaust manifold. The cylinder head, piston and block undergo a relatively modest heating from the very short duration of the combustion, before the quenching effect of the water injection. Thus the high combustion temperature, which can sometimes reach 3500° F., is not very effectively transferred to the head block, piston or valves, particularly when they are coated with thermal insulation covered with a heat reflecting material. The aluminum of the head rapidly spreads the heat so that the hottest spot is normally below 325° F., even when the engine is operating at maximum power. To further reduce the heating of the cylinder head, the walls of the exhaust valve port can also be heavily coated with thermal insulation to reduce the transfer of heat to the head from the discharging exhaust gases. However, at the time of transfer, the exhaust gases should be near 300° F.

Where an exhaust manifold is secured to the cylinder head to collect and lead away the exhaust gases, such manifold can be heated by those gases to a temperature higher than that of the cylinder head. In such event, a gasket of poor thermal conductivity between the head and the exhaust manifold is desirable, and bolts holding the manifold to the head can be made of steel or similar poor thermal conductors. Transfer of heat from the head to the engine block can be similarly inhibited inasmuch as such heat is dissipated and its energy lost.

Directing the water injection so that it concentrates at the exhaust valve will further reduce the temperature of that valve. Having the combustion chamber surface flash coated with platinum and iridium, then polished so that it better reflects infra-red radiation, also reduces the heating of the engine.

Excessive dissipation of heat from the engine to the ambient air is undesirable inasmuch as that heat is no longer available to add to the engine's power output. Heat removed through the discharged exhaust gases can, however, be used to heat the interior of a vehicle by use of a heat pipe system, and to operate an absorption-type air-cooling system for that interior.

The power output of the engine is controlled by adjusting the quantity of air introduced and the stoichiometric amount of fuel injected into the cylinders, and/or by interrupting the enable signal for fuel injection every other firing cycle, or every 2nd or 3rd cycle, or, preferably, at random. The air charge present for combustion is thus diminished with need by delaying or advancing the closing of the intake valve(s) or delaying the closing of the exhaust valve(s). This is readily accomplished with engines having a separate camshaft for its intake or exhaust valves. Many valve train systems can be installed which will allow continuous adjustment of the closing or opening position of valves during the engine cycle.

The electronic logic portion of cutting off fuel injection in one or more cylinders can be accomplished as in U.S. Pat. No. 4,103,655 and in the art cited in that patent as it applies to Otto cycle engines and their injection systems. This cutting off can be randomly selected, as by an electronic computer, or can be sequentially selected in successive crankshaft cycles. Repeating the cut-off in the same cylinder or cylinders at every crankshaft cycle tends to cause excessive vibration and requires a more massive flywheel. Governor controlled mechanical injectors or diesel engines have employed random stopping of fuel injection to achieve low torque to idle operation without misfires resulting from an overly lean mixture.

Delaying or advancing the closing of the intake valve reduces the air charge and reduces the amount of heat generated at the compression stroke. It may therefore be desirable to increase the heat supplied to the glow plugs when the air charge is reduced. Maintaining a stoichiometric combustion mixture increases engine efficiency. Eliminating throttling reduces the power requirements needed for pumping combustion air.

For most effective enhanced engine braking, by restricting the exhaust conduits, the engine's intake valves are preferably arranged to open no earlier than when their mating exhaust valves close. However, a little overlap of these valves may be tolerated.

One embodiment of enhanced engine braking of a vehicle is to have a braking control with at least two actuated positions, in addition to a non-actuated position. Running of the vehicle is carried out with that control in the non-actuated position, but, when gradual braking is desired, the control is moved to one of the actuated positions where it causes an exhaust conduit valve to close, or partially close, but does not directly apply braking forces to the wheels. For rapid or panic braking, the control would be moved to a second actuated position to cause braking forces to be applied directly to wheels or brake drums or brake discs. In that second position, the exhaust braking can also be applied to maximize the braking action.

A separate caution light, such as of amber color, can be provided for lighting when exhaust braking is applied without wheel braking. This would warn motorists following such a vehicle that it is being partially braked. By way of example, the normal brake pedal of a vehicle equipped with exhaust braking could be fitted with a switch or lever that actuates the exhaust braking when that pedal is pressed down as little as one millimeter. The standard wheel braking could be arranged so as not to be actuated by this small amount of pedal travel. For heavy or panic braking, the pedal would be pressed down further causing both or all braking systems to operate. If desired, the exhaust braking could be applied gradually, as by gradually closing a valve in accordance with the amount of brake pedal is depressed.

It may be preferred to disable the exhaust braking when the engine speed drops to idling rpm. Thus, a solenoid could be energized through an electric circuit in which is inserted a switch that responds to engine rpm and opens when that rpm drops to idling.

The preferred embodiment braking arrangement is controlled by the conventional accelerator pedal of a vehicle. Such pedal can be arranged to have its toe portion lifted up by pressing down on its heel portion, as in some racing automobiles, so that normal acceleration is obtained by pressing down on its toe portion but braking is obtained by pressing down on its heel portion. The heel pressure could then be arranged with an engine-braking control as described above for the brake pedal.

The operating temperature of warmer areas in the engine can be kept from rising excessively by placing them in good heat exchange contact with the water injection and/or fuel injection conduits. Thus, a length of these conduits could be brazed to the head alongside the exhaust ports, or these liquid conduits could be cast into the head itself. These liquids will then abstract heat from the warmer areas, and the abstracted heat would not be wasted. Pre-heating of the fuel in this way also would improve its burning in the cylinders and, accordingly, help the engine run smoother. Still further smoothness could be obtained by mixing more rapidly combustible liquids such as ethers, naphtha or low-boiling gasoline, with the fuels. These more rapidly combustible liquids, and even D.L. citronella or hydrogenated or unhydrogenated turpentine could be used as alternative fuels in the engine of the present invention, with or without being mixed with fuel oil. Shale oil, liquified coal, and carbon from coal colloidally dispersed in methanol or other fuels, could also be used with these engines. While special cooling fins can be used on hot spots, they are not as desirable. To the extent the warmer areas can be kept from over-heating, it is preferred to thermally insulate the outside of the engine to minimize heat losses. The intake and exhaust porting of the cylinder head could be modified to place them very close to each other, so that the intake air would more effectively cool the exhaust valve. The resulting extra warming of the intake air would increase engine efficiency and slightly reduce the maximum power available.

The efficiency increase to be obtained by pre-heating the engine intake air could also be obtained by pre-heating the air using the engine's exhaust. A heating muff could be connected in the exhaust line and the intake air passed through a duct in the muff. That duct could be provided with a by-pass having switching deflectors connected to the engine's power controller to cause the incoming air to shift to the by-pass when the power controller is actuated to maximum power output position.

The present invention could also be embodied in an internal combustion engine of the two-stroke cycle variety. In such a modification, the cylinder construction need not be changed but the valve timing should be changed in accordance with two-stroke operation. Injection of fuel and of water could then occur at each revolution of the engine. Thus, the changed intake valve opening and exhaust valve opening could both take place about 30 to 40 degrees before the pistons reach bottom dead center. In addition, the intake air could be arranged to be supplied to the intake port at a superatmospheric pressure of from about 1 to about 30 psig by a scavenging blower or by connecting the crankcase as a scavenging pump to flush out as much of the cylinder's contents as could be accomplished during the time both valves are open. Exhaust braking would also be effected in such as engine by closing a valve in the exhaust pipe as above described, in which event the scavenging blower or the crankcase scavenge pumping reacts against the closed valve in the exhaust pipe to absorb energy and brake the engine. A drive connection between the engine and the scavenging blower or the crankcase scavenging would transmit the braking forces to the engine to reduce its rotating speed. The preferred engine braking embodiment for the two-stroke cycle engine would be to slightly open the exhaust valve during the entire compression and expansion (power) strokes. This simulates hard engine cranking caused by leaky piston rings and/or valves. Retarding intake valve closing could also be used in place of throttling for air charge control. The preferred embodiment for a two-stroke cycle engine would be the use of retarded closing of the exhaust valve(s) in place of throttling for air charge quantity control.

While standard glow plugs could be used with the engines of the present invention, it would be helpful to have the heated glow plug element directly exposed to the gases of combustion and made of platinum or similar catalytic material that inhibits the production of nitrogen oxides and/or promotes the conversion of carbon monoxide to carbon dioxide and the reaction of hydrogen and oxygen to form water vapor. It would be further helpful to maintain the catalytic surface very hot and thus reduce its tendency to become coated by carbon, lead, etc., during engine operation. The thin platinum surface glow plug is capable of rapid temperature recovery from load changes.

Conductors such as platinum have electrical resistances that increase with temperature, and thus partially control increases in temperature. The overall electrical resistance of the glow plug could be set to provide a desired minimum film temperature when the engine is operating with the minimum running or minimum starting voltage across the plug. Overheating of the film could be prevented as by a series-connected varistor or by shunting the plug with a xener diode circuit that keeps the voltage from rising above the prescribed value. Other control arrangements could be used to maintain the glow plug temperature and its electrical resistance nearly constant.

As an alternative, or an addition, to the exhaust braking described above, the engine could be arranged to have supplemental braking applied through power take-offs such as those ordinarily used to operate an air conditioner, or a battery-charging alternator. Thus, the initial supplemental braking effected when a brake pedal is depressed a very small amount could be established by having the supplemental braking control turn on the air conditioner, if it is not already on, and place it in the maximum cooling mode, and/or switch the alternator or generator to maximum, or near maximum output by increasing the field current of the alternator to cause it to pass a heavy charging current into the vehicle's battery, or into one or both of its batteries if it has two batteries. Any or all of the foregoing could be combnd with a fuel cut-off and applied as braking step that precedes or accompanies the exhaust braking step. Any or all of them could during heavier braking to further reduce the wear of the usual brake pads and linings.

When the engine is powering a vehicle through an automatic transmission, the automatic transmission could also be connected to shift into a lower gear ratio, that is, more engine revolutions per mile, as soon as the vehicle speed permitted and to lock in the torque converter (i.e. no slip), to further increase the braking effect of the engine.

The transmission could alternatively be arranged to automatically shift into neutral when the accelerator is in idle position, and engine braking is not actuated. This would permit the vehicle to free-wheel, with its engine consuming minimum fuel, until such time as braking action or acceleration is desired. When the engine braking or accelerator is operated, the transmission would automatically shift into the appropriate drive connection.

Some of the aspects of the present invention, such as the exhaust braking, do not require the cylinder construction preferred for high engine efficiency. Thus, engine braking could be accomplished when the cylinders are fired by spark plugs instead of glow plugs, when no water injected is used, and even when the cylinders are ordinary water-cooled or blower-cooled gasoline engine cylinders.

The water for injection into the cylinders could be stored in a container having its lowest portion in good thermal contact with the exhaust gases, and having flexible, corrugated walls that would expand when its water content freezes in cold weather. The water could thus freeze without damaging the container, and the starting of the engine with the frozen water would very quickly melt some of the water so that it could be injected. It would take several minutes before a cold engine would overheat when operated without water injection, and the melting would provide sufficient melted water before overheating took place.

The water injection supply structure, including the pump, could be placed close to the exhaust system or inside the engine so that it will warm up as the engine warms up. Water supply passageways in the engine or secured to the engine head should be of small bore and of great strength so that freezing of water in those bores will not burst open the passageways or or damage the engine. All pumps, valves and tubes could be automatically or manually drained and purged of water when the engine is stopped in freezing weather.

The engine should have an automatic thermal alarm then shut-off to stop the supply of fuel when any hot spots exceed the maximum operating temperature. With such construction it would be safe to start the engine in exceedingly cold weather and run it until its thermal shut-off automatically shuts it down, even if its water supply has not yet sufficiently thawed. The shut-down engine would still be hot enough to continue to thaw the water, so that by the time the engine is ready to be restarted, or shortly after restart, an adequate supply of melted water should be available.

Other thawing arrangements could be used, or, if desired, the water could be mixed with a small amount of methanol to keep it from freezing or to accelerate its thawing.

Inasmuch as the water injection pursuant to the present invention consumes water at a rapid rate, it is desirable to recover some of that water from the exhaust. A substantial amount of water would condense in a cold exhaust system even in the absence of water injection, and such condensate could be fed into the water injector supply of an engine as it is being warmed up and would hel thaw a water supply that was still frozen. During engine warm-up the water injection could be reduced or completely cut-off to help acclerate the warm-up and thawing.

Passenger space heating by utilizing the low grade heat in the exhaust could be affected by jacketing a length of the exhaust pipe with a conduit of a heat exchanger that absorbs heat from the exhaust gases, heats the heat-exchanger conduit containing a liquid e.g., Freon ® or similar heat exchange material, which is first vaporized and then carried by a tube through a radiator through which air can be blown to heat the interior or the vehicle equipped with the foregoing engine. The Freon ® heat exchange material would be condensed in the radiator, the liquid Freon ® carried by a tube through a trap and solenoid and returned to the exhaust pipe heat exchanger. In cold weather the vehicle would be thus heated and in warm weather the solenoid valve on the liquid return would not be opened, no Freon ® would be vaporized and little or no exhaust heat would reach the passengers. The hazards of exhaust gases reaching the passengers from the heater system would be eliminated.

Exhaust heat could be arranged to operate an absorption type air-conditioner.

The exhaust piping could be heavilyy finned, both inside and outside if desired, to enhance cooling of the exhaust gases down to near ambient temperatures. Because those gases are not very hot, as well as not very far from saturation, upon leaving the engine's exhaust ports they can be readily cooled sufficiently to condense a good deal of their moisture. Recirculation of condensed water through a pump, air exchanger cooler, a filter, a water storage tank, a second pump and finally through a direct contact spray condenser in the exhaust system of this invention would constitute a very effective means of recovering water (and methanol when it is used in subfreezing weather) and to scrub the exhaust gases of particulates.

The condensed water for injection could be passed through a second filter to assure that undesired solid particles are removed. If soluble minerals and salts such as sulfates or nitrates or the like are present in the condensate, they could be removed by de-ionizer or a small reverse osmosis unit.

The water used for injection into the combustion chambers need not be absolutely pure, although it should not contain materials that would deposit in the engine and build up and interfere with the engine's operation. By way of example, the water could contain excess oxygen in the form of dissolved oxygen, and/or as hydrogen peroxide as described in U.S. Pat. No. 4,291,657. Such excess oxygen would be liberated when the water is injected, and this would permit the injection of more fuel without exceeding stoichiometric limits. It also would increase the rate at which the fuel burns, yet the water would still effect the desired cooling. The presence of 1% releasable oxygen, by weight, in the injected water should make a significant difference. It is preferable not to dilute the releasable oxygen with releasable nitrogen or carbon dioxide or the like.

By subjecting the water to pressurized oxygen gas, sufficient oxygen could be dissolved at 0° C. to provide about $\frac{1}{2}$% oxygen by weight, and the remainder of the releasable oxygen would be provided by adding $H_2O_2$. Alternatively, a water solution of $H_2O_2$ providing about $\frac{1}{2}$% releasable oxygen by weight could be contacted with pressurized oxygen gas to bring the releasable oxygen content to about 1%. A small amount of ozone could be present in the gaseous oxygen, to further increase the releasable oxygen content of the water.

Increasing the releasable oxygen content to 2% or even to 5% of the weight of water that is injected would further increase the maximum power output of the engine by further increasing the quantity of fuel that could be injected to get good combustion. A releasable oxygen content of over 5% would make it practical to operate the engine with an air intake, particularly if the fuel is pre-treated with pressurized oxygen to dissolve some and thus provide additional releasable oxygen. The total amount of releasable oxygen should then be sufficient to effect enough combustion to volatilize all or nearly all of the water present in the cylinder. A small amount of superheat should result in the most efficient operation.

It will be noted that the releasable oxygen is to be directly applied to all of the fuel consumed by the engine, and not merely as disclosed in U.S. Pat. No. 3,958,538, to a small, pre-fired fuel charge that is then used to ignite the main charge.

Operation could be effected without an intake valve. Also, a two-stroke cycle is all that would be needed. Both the fuel and the oxygen-releasing water could be simultaneously injected into a cylinder at or near the end of an exhaust stroke, the exhaust valve opened a short time before the end of the previous expansion (power) stroke and closed at the end of the exhaust stroke.

The absence of an air intake would permit such an engine to be operated where air is not available or is not to be consumed, as in torpedoes, submarines, space vehicles and the like. The generation of $H_2O_2$, $O_2$ and fuels such as ($C_{10}H_{20}O$) DL citronella require only readily available raw materials and large amounts of energy, which could be from solar energy or other non-depletable energy sources. Thus, this embodiment of the invention would be a viable alternate to fuel cells, aluminum batteries and other non-polluting energy storage methods.

A detailed description of the invention and preferred embodiments is best provided by reference to the accompanying drawings.

FIG. 1 is a cross-sectional view of a cylinder according to one embodiment of the invention, including the cylinder 10, which is preferably aluminum but may be cast iron or steel or plastic. Many of these materials would require a cylinder liner 26 to provide good wear, seal and strength properties. The cylinder 10 may be one of several in the cylinder block 14. The head 12 is preferably aluminum but may be cast iron or steel or plastic. The surfaces of the head 12 contacting the combustion chamber are coated with a heat-insulating material 23 which will usually be ceramic but should not be limited to this class of material. The insulating material is coated with a thin layer of platinum 38 like material to reflect heat, seal the ceramic surface and act as a combustion catalyst. The purpose of the ceramic lining is to slow heat transfer to and from the combustion chamber. When the walls of the combustion chamber remain hot, fuel vaporization is enhanced, ingition is improved, unburned gases are reduced and loss of heat, which is usable energy at this point in the cycle would be reduced. The head 12 is not heated to the temperature where it requires cooling with the associated loss of energy. The head should be shaped to accept the valves 16 and 18, the injector nozzle 20 and the glow plug 22 as well as promote swirl of the gases in the combustion chamber. The head should be shaped to match the piston head to effect a maximum compression ratio of approximately 25 to 1 and a fixed expansion ratio of approximately 25 to 1. The engine of this invention is a composite cycle engine because it employs part of the diesel cycle, part of the Otto cycle, part of the Rankine cycle, and principles which have not been used before.

The intake valve 16 has its head covered with ceramic 23 and for the same reasons as the head 12. According to this invention, the intake valve 16 may be closed very late and well into the compression stroke upon demand to effect a reduced compression ratio and combustion air charge while retaining a high (full) expansion ratio. This arrangement would allow for substantial reduction of combustion air throttling losses and provide increased expansion of the gases of combustion, while permitting the adjustment of torque output from the engine.

The exhaust valve 18 would have its head covered with ceramic 23. It would serve the normal function of exhausting spent combustion gases. It may also be used instead of the intake valve 16 to effect variable compression ratio and combustion air charge by opening during a portion of the compression stroke and exhausting part of the combustion air charge.

The piston 28 is substantially conventional employing piston rings 30. However, the top of the piston is shaped to clear protrusions and also to effect the desired maximum compression ratio of approximately 25 to 1 and the fixed expansion ratio of approximately 25 to 1. The piston head 28 should be covered with ceramic 23.

The glow plug 22 should be of a design that permits accurate temperature control, usually in the range of 1200° F. to 2000° F. The glow plug 22 is to be controlled at this temperature at all times when the ignition switch is turned on. The head is to be hemispherical in shape and is many times greater in diameter than the critical diameter of a heated sphere which will propagate combustion of any of the expected fuels for the embodied engine. The placement of the glow plug 22 should be near to and in the limited path of the injected fuel, where a much richer fuel/air mixture is present than in the rest of the combustion chamber. Under the above conditions, ignition and combustion would start quickly and burn smoothly without substantial detonation for the duration of injection and shortly afterward.

The fuel injection nozzle 20 in the preferred embodiment would be designed to start injecting fuel when the fuel introduced to it reached a pressure of 1000 psi to 1500 psi above combustion chamber pressure. The spray would be directed in a narrow pattern toward the glow plug 22 where the rich mixture starts burning. The smoothness of burn (combustion) would be determined by the fuel used, the spray pattern, the temperature and diameter of the glow plug 22 and it catalytic properties, the swirl, temperature and pressure of the combustion air, and in one of the important aspects of this invention, the volume of fuel displaced by the plunger of the injector pump per degree of crankshaft rotation, which determines the number of degrees of crankshaft rotation where combustion occurs. Some fuels may benefit from an electrically heated flash vaporizer on the tip of the fuel injector.

The intake camshaft 34, the intake cam lobe 35, the exhaust camshaft 36, and the exhaust cam lobe 37 complete the items shown in FIG. 1.

Figure 2:
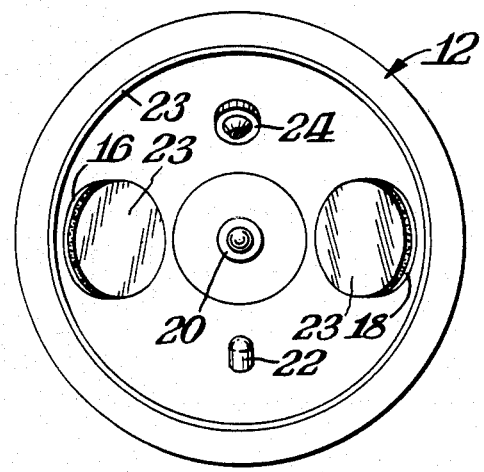
FIG. 2 is a plan view of the top of the combustion chamber shown in FIGS. 1 or 3.

FIG. 2 is a plan view of the cylinder of FIG. 1 taken along line 1-1. The head 12, the valves 16 and 18, the glow plug 22, the fuel injector nozzle 20, the water injector nozzle 24, and heat insulation 23 are shown. The water injector nozzle 24 would have a spray pattern directed away from the glow plug 22. When desired, water injection should shart after the completion of fuel injection and continue until sufficient water has been injected to lower the exhaust gas temperature from the combustion chamber to approximately 300° F. Water injection covers the combustion chamber into a direct contact boiler and results in increased gas pressure on the piston. Thus, water injection would incorporate the Rankine cycle into this composite cycle engine. Lowering the exhaust temperature from the usual 700° F. to 1400° F. down to 300° F. would reduce the amount of high quality energy which is exhausted. It also quickly lowers the combustion temperature of 3000° F. to 4000° F. and would dilute the gases with steam, greatly reducing the amount of NOx which is formed. Many of the present engines add air to hot gases in the exhaust manifold where more NOx is formed. The hot gases, 700° F. and above, are exhausted to the atmosphere where even greater amounts of NOx are formed but not measured. In one embodiment of this invention, the 300° F., exhaust gases are scrubbed to recover water, and in winter, methanol, for reinjection and to scrub out particulate matter. As a result, the exhaust gases to the atmosphere would usually exit below 150° F. Below 300° F., very little NOx is formed, and below 150° F. The formation of NOx approaches equilibrium.

FIG. 3 shows modifications of the cylinder assembly of FIG. 1. The gases of combustion do not directly contact any lubricated and cool surface. Thus, an engine utilizing this embodiment of the invention would result in longer wear because the lower temperature protects the lubricated surfaces of the cylinder walls. The gases of combustion would lose less heat because they directly contact and radiate only to ceramic and platinum insulated surfaces. The loss of high grade heat energy is greatly reduced, as is the need for cylinder wall cooling and its parasitic energy losses. These advantages are accomplished by use of a piston extension termed a "top hat" 32, and a cylinder extension 33 which includes a ceramic lining 23 with a platinum flashing 38. The covering for the ceramic lining 23, wherever it is employed, preferably would be a thin flashing (coating) of platinum 38, which may have a low content, as low as 1%, of iridium to provide improved heat reflecting qualities to the surface of the platinum. Platinum has a thermal expansion coefficient close to most ceramics and is ductile so that it would fill the pores and small cracks that would tend to form in ceramic when it is heated and cooled. The smooth surface would not trap fuel or leave the fuel unburned and a pollutant. The smooth surface promotes gas flow and better mixing, and carbon and other deposits do not easily adhere and build up.

This invention also embodies the alternate concept of recessing the piston rings 30 into the walls of the cylinder 10 and 26 instead of into the walls of the cylinder 10 and 26. This is most useful in the case of the top hat arrangement as it would allow use of a shorter piston 28 and cylinder 10 and 26.

Figure 4:
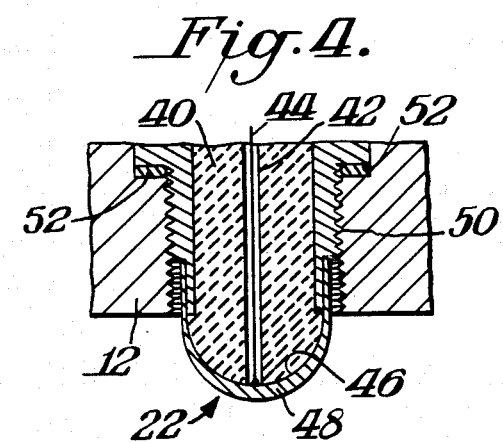
FIG. 4 is a cross-sectional view of a preferred glow plug having a hemispherical, tapering, platinum, heated coating.

The preferred embodiment glow plug 22 is shown in FIG. 4 inserted in the engine head 12 and having metal shell 50, gasket compression seal 52, electrical and heat insulating ceramic body 40, hemispherical tip of the ceramic body 46, current carrying electrode 44 in passageway 42 and platinum tip covering 48. Platinum has an expansion coefficient similar to most ceramics and will fill the pores and small cracks in the ceramic. Platinum is a noble metal and will not oxidize or vaporize with long usage at 1200° F. to 2000° F. It is ductile, resists mechanical damage, and has a strong postiive coefficient of electrical resistance to temperature. Platinum is one of the best known catalysts for promoting chemical reactions, especially combustion. The hemispherical platinum tip 48 varies in thickness as shown from the greatest thickness at the point of contact with the electrode 44, to the minimum thickness at the point of contact with the metal shell 50. Electrical current, either AC or DC, flows from the electrode 44 to metal shell 50 through platinum coating 48. The more current, the higher the temperature and electrical resistance. The temperature of the tip 48 is maintained equally over all surfaces by maintaining a constant cross sectional area of platinum through which current passes. The glow plug 22 is largely self-temperature controlled. When a constant voltage is applied the current flows through the resistance of the platinum coating 48 causing the temperature and resistance to rise until equilibrium is reached between current, temperature, resistance and heat losses. When heat losses are increased, the temperature will drop resulting in increased current flow and a lower equilibrium temperature, but not so low as would be experienced when the current is held constant. These principles demonstrate a temperature equilibrium for each specific voltage. The higher the voltage, the higher the temperature, the lower the voltage, the lower the temperature. Because the heating element (platinum tip 48), is in direct contact with the cooling medium (the combustion gases), the response time to heat loss change will be almost immediate. Therefore, the temperature of glow plug tip 48 can be maintained despite rapid changes in heat loss. At a temperature of 1200° F. to 2000° F. carbon, lead, mineral or other deposits will not occur and the glow plug 22 should last the life of the engine.

An internal combustion engine 60 without intake throttling is shown in FIG. 5. The resulting lower vacuum in the intake manifold requires little power to rotate the engine. Use of a non-throttling engine to slow down a vehicle or to maintain a reasonable speed when traveling down a long slope is not very effective and wear on the friction brakes is increased. According to this invention a valve mechanism 75 is placed in the exhaust pipe 64 to restrict flow during engine braking and absorb energy. The exhaust throttle valve shaft 77 is used to rotate and close the butterfly vane 74. The throttle valve acutating cable 78 is assisted by the throttle valve actuator 76 and moves the butterfly vane shaft lever 79 to move the valve shaft 77 and the vane 74. On the exhaust stroke of the engine 60 the piston expells gases out of the exhaust valve to the exhaust manifold 62 through the gasketed flange 70 with bolts 72 joined to the exhaust pipe 64 and to the exhaust gas throttling valve mechanism 75. When the valve 75 is partially closed, gas pressure builds up forcing the pistons to move against this higher pressure during the exhaust stroke and expending energy. With a compression ratio of 25:1 the maximum pressure reached would be approximately 300 psi. In that case, the volume of the exhaust manifold 62 and the exhaust pipe 64 before the throttle valve 75 will result in slightly less pressure. The compressed gas in the cylinder will not return its energy to the engine during the intake stroke because the exhaust valve will close and the intake valve will open, venting the compressed gases in the cylinder through the intake valve. Harmonic balancer 66 and crankshaft 68 are shown for completeness.

A cross-sectional view of the exhaust flow restriction engine braking enhancement valve 75 is shown in FIG. 6, in the actuated, closed position. The shaft 77 is offset from center and there is more area of the butterfly vane 74 exposed to the upstream, higher pressure acting to open the valve than the smaller area trying to close the vane 74. Thus, whenever engine braking enhancement is desired, a force is required. The arrow indicates the direction of the flow of the exhaust gases. The valve body 73 is made so it can be slipped between the flanges 72 with bolts 80 of the exhaust pipe 64.

An end view, in cross-section of the preferred valve mechanism 75 of FIG. 6 is shown in FIG. 7. This view from the downstream end shows the greater area of the vane 74 exposed to the upstream higher pressure that tends to open the valve 75. The vane shaft 77 is shown in the offset position having means of lubricating through grease fittings 84 and passageway 86. Also, the lambreth seals 82, needed to prevent leakage of gases, are shown. The valve body 73 and the flange bolts 80 are shown for completeness.

FIG. 8 shows the use of a "camflex" valve mechanism 75 to accomplish the throttling of the exhaust gases according to the invention. An eccentric plug 88 is used instead of a vane 74. The shaft 77, the body 73 and the exhaust pipe flanges 72 complete the figure.

FIG. 9 shows the use of a sectored ball valve 90 closing against a replaceable seat 92 to accomplish the throttling means 75 according to the invention. The shaft 77, the valve body 73, the exhaust pipe 64 and the flanges 72 complete the figure.

FIG. 10 shows a majority of the inputs which control the engine according to the invention. The accelerator pedal 102, and an operator's foot 100 are shown in the power demand position. When the speed control lever 106 is partly depressed, it transmits its motion through pivot 108 to the engine side of the fire wall 104. It is noted that lever 106 is not in contact with the engine idle adjustment screw 110 held in bracket 112. Lever 106 adjusts the position of a potentiometer (not shown) that generates the desired vehicle speed input. When the accelerator pedal 102 is fully depressed for maximum power, the three pole maximum power switch 114 is actuated as shown by lever 106. The first pole switches the alternator to the minimum charge rate, the second pole switches the air conditioning to "off" and the third pole switches the combustion air inlet from hot to cold, all to achieve maximum power to the drive train.

The accelerator pedal bracket 116 pivots on the internal fire wall bracket 118 and the engine braking engagement lever 122 moves in response to the accelerator pedal 102. At no time during power demand is lever 122 in contact with engine braking engagement pin 124; therefore, the fire wall engine braking sheave 126, which is mounted on the engine side of fire wall bracket 120 through pivot 130, is held in the maximum counterclockwise position by spring 128. This position is adjusted by zero braking position adjusting screw 132 which rests against stop 134 attached to bracket 120. At zero braking position, engine braking switch 136 drops into a detent 138 in the fire wall sheave 126 and is deactivated.

The braking throttle valve actuating cable 78 is attached to the fire wall sheave 126 and the braking throttle valve sheave 156 which is in the fully open position against stop 149 in actuated cylinder 148. Because of slack in cable 78, lever 154 is in its uppermost position, causing three-way valve 152 to shut off higher pressure exhaust gas through gas line 140 from line 142 and actuator cylinder 148. The valve 152 in the position shown opens the path for gases in cylinder 148 to pass through line 142 to line 144 to the low pressure end of exhaust pipe 64. Under these conditions, there is equal pressure on each side of actuator piston 150 in actuator cylinder 148, and the spring 94 pushes piston 150 fully up against stop 149. At this position, the shaft levers 79 attached to shaft 77 rotate vane 74 to the full open position, and substantially no engine braking is provided. The spring 94 end of actuator cylinder 148 has full closed stop 151. This same cavity is always vented to the low pressure end of exhaust pipe 64 through gas line 146 and 144.

FIG. 11 shows the control devices of FIG. 10 set for maximum engine braking. The operator's foot 100 and the accelerator pedal 102 are shown with the heel fully depressed. Under these conditions, speed control lever 106 is no longer in contact with the accelerator pedal 102; it rests on the idle screw adjustment 110. Maximum throttle switch 114 is not actuated under engine braking conditions. The vehicle speed potentiometer (not shown) is set at engine idle with the transmission signaled to the neutral position.

The engine braking engagement lever 122 is shown rotated to contact and move pin 124 on fire wall sheave 126 in a clockwise direction as shown by the arrow on pivot 130 against the force of spring 128. The zero position adjusting screw 132 is off the stop 134 mounted on bracket 120. The switch detent 138 has moved away from three pole engine braking switch 136. These poles are actuated in sequence. The first pole to actuate overrides other signals and switches the transmission into the lowest gear consistent with vehicle speed, disengages the torque converter and stops all fuel injection. The second pole to actuate switches the alternator to its maximum charge rate and forces the air conditioning compressor to "on". The third pole to be actuated causes the valve camshaft to move the maximum compression ratio position to introduce the most air charge to the engine so exhaust throttling has the most effect.

As sheave 126 is rotated clockwise, it pulls cable 78 to the left on the drawing shown and removes the slack from cable 78. Valve lever 154 is moved down at the same time as sheave 156 is rotated clockwise by cable 78. As the sheave 156 rotates clockwise as indicated by the arrow, the butterfly vane 74 of the exhaust throttling valve 75 is moved to start throttling. As throttling starts, the differential pressure across the vave 74, with offset shaft 77, develops a counter-clockwise resisting force. To reduce the effort of the operator which would be needed to apply enging braking with only heel force, the exhaust pressure powered servo system actuates. Valve lever 154 moves downwardly when the slack is taken out of cable 78. The servo three-way valve 152 then connects the high pressure exhaust gas line 140 to the servo cylinder 148 through gas line 142. Valve 152 disconnects gas lines 142 and 144. As a result, the high pressure exhaust gases force piston 150 against spring 94 through levers 79 and shaft 77 to boost the closing force on vane 74.

When vane 74 is fully closed as shown, the piston 150 rests against the stop 151 to prevent jamming the levers 79 and the throttle valve 75.

FIG. 12 shows schematically, an apparatus for a dual overhead cam engine to effect variable compression ratio, variable air charge engine operation with a fixed, high expansion ratio. The desired advantages of this embodiment are: low air handling losses (i.e. throttle losses); maximum expansion of each combusted fuel/air charge (i.e. low pressure dump of combustion gases); ability to always run with a nearly stoichiometric fuel/air mixture. All of the above result in substantially improved efficiency with a high reserve power availability. The apparatus shown in FIG. 12 applies to a dual overhead cam installation. In this embodiment, both intake and exhaust cams are conventionally ground and conventionally timed for maximum torque conditions. FIG. 12 shows one method for retarding the closing and opening of the intake valves for reduced air charge. With the intake valve open, at 90° of crank rotation into the compression cycle, a portion of the air charge is returned to the air intake manifold. With less air required to be compressed, less fuel is injected into the cylinder. The expansion ratio remains fixed and high and the pressure in the combustion chamber when the exhaust valve opens is much lower than in an Otto or Diesel cycle engine. Thus, more work is extracted from the fuel. The unwanted retarded opening of the intake valve will result in a higher initial vacuum in the combustion chamber with a moderate increase in air handling losses.

In FIG. 12, the crankshaft 68 drives two timing gear sprockets 160 which drive two timing belts or chains 162 and 164. Timing belt 162 drives timing gear sprocket 166 on exhaust cam shaft 36. This sprocket 166 has twice the circumference of the crankshaft sprocket gear 160 and runs at one-half the speed on a four-stroke cycle engine. Tension of belt 162 is maintained by tensioning roller 170. The timing of the exhaust cam 36 is not to be adjusted during operation in this example. Timing belt 164 drives intake cam timing gear sprocket 168 which drives camshaft 34.

It is desired to maintain tension on belt 164 and also to retard or advance the intake camshaft 34 position with respect to the engine crankshaft 68 while the engine is in operation to meet changing torque demands. The torque control actuator 171 is shown in the normal, low torque, at rest, no signal position. Actuator 171 is held in this position by the torque control servo 173 which may be powered mechanically, electrically, hydraulically or pneumatically. The torque control actuator 17 uses two rollers 176 and 178. Spaced roller 176 is used to adjust the tension side length 172 of timing belt 164. The second spaced roller 178 maintains slack side belt 174 tension because it 178 is pulled toward spaced roller 176 by spring 196 connected to small block 192 in guideway 194. The second spaced roller 178 is secured to the small block 196 by pin 182. Spaced roller 176 is secured to slide block 184 by pin 180. Slide block 184 is moved in the rail 186 and the rail 188 by linkage 190 and torque control servo 173 in the directions shown by the drawings. Servo 173 moves slide block 184 to the left by means of linkage 190. As this happens, the length 172 of timing belt 164 becomes longer. Second spaced roller 178 moves to the left and allows the length 174 of timing belt 164 to thus become shorter. With respect to crankshaft 68, intake camshaft 34 then will rotate clockwise. This rotation advances the closing and opening of the intake valve(s) and results in high torque (greater air charge to the cylinders and higher compression ratio).

The arrangement shown in FIG. 12 is to be used according to this invention on either a two- or four-stroke cycle engine where adjustable, retarded or advanced closing of either the intake valves or exhaust valves is required. FIG. 12 also applies to engines where there are at least two intake or two exhaust valves and it is desired to control the crank position when one of the two intake or exhaust valves close. An engine with a four valve head (two intake and two exhaust valves) for a four-stroke cycle engine would be adjusted to retard closing of one of the intake valves to control torque. The engine is to be supplied with one camshaft 36 which functions to open and close one of the two intake valves and to open and close the two exhaust valves at the same time. According to an embodiment of this invention, a second camshaft 34 is added as shown in FIG. 12 with adjustable retard and advance actuator 171. The added camshaft 36 will, in this example, control one of the intake valves. The main camshaft 36 would continue to operate the other intake valve and the two exhaust valves. When the added cam shaft 34 is fully advanced, the operation of the engine is as before. When the added camshaft 34 is retarded, i.e. up to 90° of crankshaft 68 rotation or more, the engine operation is modified as follows: the intake valve operated by the main camshaft 36 will open approximately 2° before top dead center near the end of the exhaust stroke; the intake valve operated by the added camshaft will open at approximately 88° after top dead center, well into the intake stroke; the first intake valve to open will close at approximately 225° after top dead center, which is about 45° into the compression stroke; and the second intake valve to open will close at approximately 315° after top dead center, or 135° into the compression stroke. The result is that, with the added camshaft 34 fully retarded, the combined intake valves are open for approximately 317° of crankshaft rotation as opposed to 227° in a conventional engine. As a result, only a small air charge is introduced which results in low torque output while, at the same time, utilizing the maximum high expansion ratio of the engine. Air throttling losses are very low.

FIG. 13 illustrates how an otherwise conventional engine with a main intake and exhaust camshaft 199, push rods 202, rocker arms 208, and overhead valves 16 and 18 type of valve train can be adapted according to this invention to retard the closing only of the intake or exhaust valves without changing any other valve opening or closing timing. Valve trains which retard closing only of the valves such as shown in FIG. 13, are more efficient and result in a smoother running engine than some other arrangements, such as shown in FIG. 12. When maximum torque is required, the valve train of FIG. 13 offers no particular advantages over conventional or the above method of FIG. 12. When adjustable torque is required to obtain desired economy with the type of load involved, then the arrangement shown in FIG. 13 would be more efficient than the method of FIG. 12. With this embodiment, full torque adjustment would be available. No high vacuum would be drawn in the cylinders at any time during the cycle. Exhaust gases would not be mixed with new charges of air during low torque operation, as occurs when a single conventional cam is retarded, thereby delaying opening and closing of both the intake and exhaust valves.

FIG. 13 shows the single cam push rod 202, rocker arm 208, crankshaft sprocket 160 mounted on crankshaft 68, timing chain 162, timing gear sprocket on the main camshaft 167, a main intake cam lobe 198, a main intake valve tappet 203, tappet guide 206, push rod 202, rocker arm 208, rocker arm pivot 210, intake valve 16 and valve spring 212. This valve train would result in maximum torque valve timing. In order to adjust the intake valve 16 closing for less than maximum torque, the auxiliary intake camshaft 201 and its associated valve train is to be added. The auxiliary intake cam valve train connects crankshaft 68. Crankshaft timing gear sprocket 160, timing chain 164, torque control actuator 171 and servo 173. The auxiliary intake timing gear sprocket 168 is connected to auxiliary intake camshaft 201, auxiliary cam lobe 200, auxiliary intake valve tappet 205, auxiliary intake push rod 204, rocker arm 208 and intake valve 16 sealed by spring 212. Standard hydraulic tappets at 203 and 205 are not preferred, but tappets with mechanical adjustment and elastomer cushions solve the tappet slack problem and are preferred.

During maximum torque operation, the two cam lobes, main 198 and auxiliary 200, would have their lobe centerlines in contact with their respective tappets 203 and 205 at precisely the same position of crankshaft 68. When moderate torque is required, the torque control actuator 171 would move one-half way to the right retarding the auxiliary cam lobe 200 by 22.5°, which would retard closing of the intake valve 16 by 45° of crankshaft 68 rotation. When low torque is required, the torque control actuator 171 would move fully to the right to the position shown. The auxiliary intake cam lobe 200 would thus be retarded a total of 45°, which would retard closing of the intake valve 16 by 90° of crankshaft 68 rotation.

FIGS. 14, 14a, 15 and 16 depict an adaptation for engines having conventional valve train arrangements, i.e., push rod, single overhead cam or dual overhead cam. This adaption 214 allows adjustable retarding (or advanced closing) of the intake (or exhaust) valves. FIGS. 14 and 14a also show a helix actuator 223 method for changing the relative positions of two rotating shafts. In this case, the helix actuator 223 is used to change the relative position of the inner 222 and outer 218 camshafts. The helix actuator 223 could also be used to change the relative position of the rotating timing gear sprocket 168 and its associated camshaft 34 shown in FIG. 12. FIGS. 14 and 15 indicate the minimum duration of the intake cam lobes and the intake valves closing in the most advanced position (earliest). Under these conditions, maximum torque, i.e., maximum air charge, is obtained. In FIG. 14 the camshaft timing gear sprocket 216 controls the rotation of the outer camshaft 218 with respect to the rotation of the crankshaft 68, not shown. The assembly 223 is shown fully compressed, fully advanced, and ties the outer camshaft 218 to the inner camshaft 222.

The outer camshaft 218 carries the camshaft main bearings 239, the fixed cam lobes 247, in this case the exhaust lobes 247, the leading fixed opening half of the intake lobe 242, the outer shell for the bearing 238 between the inner camshaft 222 and other camshaft 218, the pin 234 which slides in pin guidewawy 236 to rotate the helix nut 226 with the outer camshaft 218.

In FIG. 14, the inner camshaft 222 is shown in the most advanced clockwise relative position with respect to the outer camshaft 218 due to the compressed condition of the helical nut 226 on the helical threads 224. The inner camshaft 222 closes the intake valve early in this example. The "T" shaped portion of the adjustable intake cam lobe 244 and 245 is welded or otherwise secured to camshaft 22. The inner cam lobe 244 and 245 is the adjustable portion and moves in slot 246 in the outer camshaft 218. The inner cam lobe 244 and 245 is shown fully advanced clockwise with respect to the outer cam lobe 242 for maximum torque. The total camshaft assembly is indicated as 214. The timing gear 216 is welded 220 or otherwise secured to the outer camshaft 218.

The helix actuator assembly 223 in FIG. 14 is shown in the fully compressed, maximum torque condition. The actuator assembly 223 consists of servo 173, linkage 190, thrust plate 230, thrust ball bearings 232, helical nut 226 which rotates with the outer cam 218 and helical threads 224 on inner camshaft 222. Stop 235 limits compression movement and stop 237 limits expansion movement. Spring 228 is fully compressed.

The adjustable closing camshaft assembly 214 does not necessarily require the use of the helix assembly 223 to adjust the position relationship of the inner camshaft 222 to the outer camshaft 218. As an alternate embodiment, the outer camshaft 218 can be driven as explained above having a fixed relation to the crankshaft 68. The inner camshaft 222 would have a timing gear sprocket 168 having the same number of teeth as the timing gear sprocket 216. The inner cam 222 would then be retarded and advanced by use of a torque control actuator 171 shown in FIGS. 12 and 13.

FIG. 14A illustrates the intake cam lobe 242, 244 and 245 at the maximum valve open duration position with the intake valve(s) 16 closing 90° of crankshaft 68 rotation late which is, in this example, the most retarded position. Under these conditions, minimum torque (minimum air charge) is obtained.

The drive of the camshaft assembly 214 is the same as described for FIG. 14. In FIG. 14A, the helix actuator 223 is in the fully retracted (expanded) condition. This rotates the inner camshaft 222 counter-clockwise approximately 45° with respect to the outer camshaft 218. No change occurs to the timing of the fixed portion of the cam lobe 242 on the outer camshaft 218, but the inner "T" cam lobe 244 and 245 retards approximately 45° which results in the closing of the intake valve 16 approximately 90° of the crankshaft 68 rotation later. The nut travel stop 237 accurately determines this position.

FIG. 15 is a cross-sectional view of the camshaft assembly 24 taken along line 15—15 shown in FIG. 14. The adjustable valve closing cam lobe 242, 244 and 245 adjusts intake valve 16 closing in this example. The lobe 242, 244 and 245 is advanced for earliest valve 16 closing, maximum torque and maximum air charge in operation. The inner camshaft 222 and its attached lobe parts 244 and 245 are shown rotated fully clockwise in bearing 238 with respect to outer camshaft 218 and its fixed portion of the intake valve 16, cam lobe 242 and camshaft main bearing journals 239. Weld 240 is one method to secure adjustable cam lobe 244 and 245 to the inner camshaft 222. The slot 246 in the outer camshaft 218 allows approximately 45° of rotational movement of inner camshaft 222 lobe parts 244 and 245. Exhaust cam lobe 247 is a non-adjustable part of the outer camshaft 218. A roller cam follower 248 is normally used with the cams of this invention. The preferred base circle of the cam lobes 242 and 247 of this invention have a 2 or 3 times greater radius compared to conventional cam lobes. The cam follower 248 may have its axis on a radius line of the camshaft 222. However, it is preferred to offset the axis of the cam follower 248, parallel and toward rotation from the camshaft 222 radius line. The offset usually lies within ¼ to ½ of the lobe 242 and 247 base circle.

FIG. 16 is an end cross-sectional view through the center of the adjustable intake valve lobe 242, 244 and 245 of FIG. 14A. The inner camshaft 222 is fully retarded counter-clockwise approximately 45° which results in approximately 90° of crank 68 rotation delayed closing of the intake valve 16 in a four-stroke cycle engine. The moveable cam lobe parts 244 and 245 welded 240 or otherwise secured to the inner camshaft 222 are also retarded. The gap [slot] 246 in the outer camshaft has moved ahead of adjustable cam lobe 244. The fixed exhaust cam lobe 247 has not changed its duration or relative position in this example of retarded intake valve 16 closing.

Most of the cam arrangements shown in FIGS. 12-16 can be utilized to effect adjustable early closing of the intake valve, well into the intake stroke. Adjustable early closing of the intake valve(s) controls the amount of air charge and, thus, the compression ratio and torque of the engine. Using adjustable early closing would eliminate the need for a throttle valve and the air handling losses inherent with its use. The vacuum developed by early closing of the intake valve in the intake stroke consumes power, but this same vacuum releases power during the first portion of the compression stroke.

FIG. 17 is the first of nine schematic cross-sectional views of one cylinder in a four-stroke cycle engine showing the sequence of events of the major components of this embodiment of the invention. This sequence shows adjustable delayed closing of the intake valve 16 into the compression stroke. This invention includes the option of opening the exhaust valve 18 during part of the compression stroke to effect variable ratio [adjustable air charge]. All valve 16 and 18 opening and closing events are stated with reference to degrees of crankshaft 68 rotation at 50 mils lift of the cam lobe 35 or 37. Degree count starts at top dead center at the beginning of the intake stroke. In FIG. 17 the crankshaft 68 is at 2° and piston 28 is just starting down. The exhaust valve 18 has just closed [50 mils rise on cam lobe]. The crankshaft 68 is pulling the connecting rod 270 which is pulling the piston 28 down in the cylinder 10 which is drawing in air through the open intake valve 16. The fuel injector nozzle 20 is not active at this stage of the sequence.

FIG. 18 is the same as FIG. 17 except the crankshaft 68 is at 218° which is 38° into the compression stroke. The intake valve 16 closes. The maximum amount of combustion air is trapped for compression which results in the maximum compression ratio (maximum air charge) and maximum torque output.

FIG. 18A is a step in the sequence which is used when low torque is needed. When FIG. 18A is used, FIG. 18 is not used in sequence. FIG. 18A is the same as FIG. 18 except the crankshaft 68 is at 308° which is 52° before the end of the compression stroke. The intake valve 16 closes and traps a small amount of combustion air for compression. Much of the air which was compressed in FIG. 18 has been returned to the air intake manifold 292 in FIG. 18A. The small amount of the compression stroke used for compression results in a low compression ratio, sometimes as low as 2:1. No high vacuum has been developed to reduce the combustion air charge and compression pressure. Therefore, the air pumping losses [throttling losses] are very low compared to the conventional Otto cycle engine at all torque operations except maximum. Air throttling losses are a function of the throttling valve setting, the amount of vacuum drawn and the number of intake strokes per minute. These losses for conventional Otto cycle automobiles vary between 2 horsepower and 25 horsepower or greater.

FIG. 19 is the same of FIG. 18 except the crankshaft 68 is approximately 348°, or 12° before the end of the compression stroke. The fuel injector nozzle 20 starts injecting fuel at a fixed rate, i.e., cc per/degree of crankshaft rotation, which can be adjusted by injector pump changes to effect combustion without rapid rise and high pressure spikes. The injected fuel spray is directed to move with the combustion air swirl pattern to and around the glow plug 22 where a rich air/fuel mixture at high temperature is exposed to a very high temperature (1200° to 2000° F.) sphere whose temperature and radius are far greater than the critical ignition value which acts quickly to initiate and sustain combustion. The number of degrees of crankshaft 68 position before top dead center at the start of fuel injection will be continuously adjusted on demand, mainly according to the rpm of the engine and, to a lesser degree, to the type of fuel used, the temperature of the fuel and the combustion air and the walls of the combustion chamber, and, the size of the air charge which largely determines pre-combustion air pressure and temperature.

FIG. 20 is the same as FIG. 19 except the crankshaft 68 is at 360° at the start of the power [expansion] stroke to as much as 405° or greater, which is 45° after the start of the power [expansion] stroke, when the fuel injection through the fuel injection nozzle 20 is stopped. Fuel injection in the engine of this invention takes place over a greater number of degrees of crankshaft 68 rotation than the diesel engine. The amount of fuel injected per degree of crankshaft 68 rotation is linear and constant. Therefore, the number of degrees of crankshaft 68 rotation, where injection takes place, accurately meters and measures the amount of fuel injected for each combustion as well as the total amount of injected over any selected period of time. The amount of fuel injected for each combustion is determined by the timing of the closing during the compression stroke of the intake valve 16 [or exhaust valve 18], the temperature of the air to the combustion chamber and the rpm of the crankshaft. The start of fuel injection changes very little but the stop of fuel injection in degrees of crankshaft 68 rotation varies linearly with the torque required and the mass of combustion air charge. A trim control for best combustion, economy and cleanness of emissions which is near a stoichiometric mixture is set by the amount of excess oxygen in the exhaust.

Figure 21:
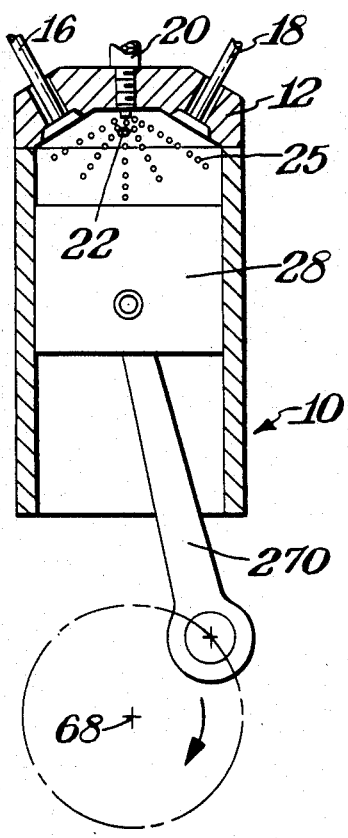
FIG. 21 shows the cylinder at the position at the start of water injection.

FIG. 21 is the same as FIG. 20 except that the crankshaft 68 has rotated an adjustable number of degrees after the stop of fuel injection, in this example 5°, so that crankshaft 68 position is 410° or 50° into the power [expansion] stroke. The water injection 25 has just started into the combustion chamber, directed away from glow plug 22. Water is injected to cool the gases of combustion. The water is vaporized and the vapor expands to approximately 1500 times the volume of the water. This steam volume is greater than the decrease of volume caused by decreasing the combustion gas temperature, so a greater average of combustion gas-plus-steam pressure is exerted on the piston resulting in greater torque from the same fuel charge, this results in greater fuel economy. The added torque is obtained by not transferring approximately 30° of the fuel heat energy out of the cylinder 10 wall and head 12 cooling jacket. These jacket losses, by calculation, can be reduced to 10%. Approximately 35% of the fuel heat energy is normally lost out of the exhaust pipe of a convention combustion engine. Injection of water into the combustion chamber after combustion prevents the exhaust of high grade, i.e., high temperature, energy which is present even with the high constant expansion ratio used in this invention. With water injection, the exhaust temperature will be around 300° F. instead of 700° F. to 1400° F. Water injection and high expansion ratio reduce the fuel heat losses out of the exhaust. Water injection increases the mass of the exhaust gas to reduce the number of BTU's of low grade heat energy saved. Calculations indicate exhaust fuel heat losses should be reduced to around 15%.

Figure 22:
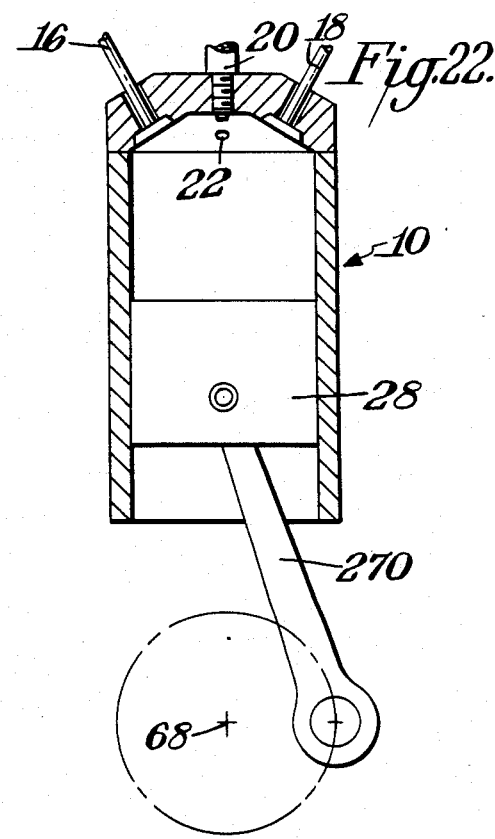
FIG. 22 shows the cylinder at the position at cessation of water injection.

FIG. 22 is the same as FIG. 21 except that the crankshaft 68 has rotated an additional 5° to 90° with an expected average of 45° as shown in this example of 445° and water injection 25 has stopped. The calculated volume of water to fuel is 7 to 1. This ratio considered in the relative plunger 340 and 341 diameters of the injection pump 314 and 316, see FIG. 51. Water is injected for the same number of degrees of crankshaft 68 rotation as fuel is injected. Since each degree of crankshaft 68 rotation results in a linear amount of displacement by the injector pump plungers 340 and 341, the fuel and water are accurately ratioed. Trim of this ratio is effected electronically to change the number of degrees of water versus injection to give the proper temperature and more economy.

Figure 23:
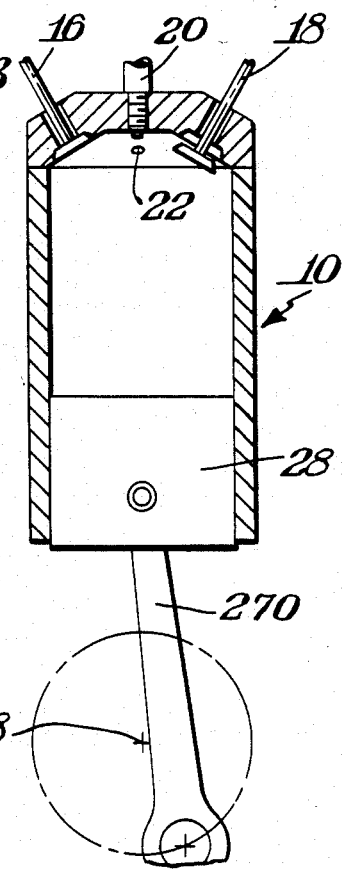
FIG. 23 shows the cylinder at the position of the opening of the exhaust valve.

FIG. 23 is the same as FIG. 22 except the crankshaft 68 has rotated to 502°, which is 38° before the end of the power (expansion) stroke. At this time, the exhaust valve 18 opens. A key element of this invention is the fixed, high, expansion ratio of approximately 25 to 1. This expansion ratio will result in dumping pressures of approximately 100 psi to the exhaust manifold during the torque operation, down to 10 psi or less during low torque operation. Most diesel engines dump cylinder pressures to the exhaust at about 120 psi at all times because they are essentially a constant torque engine with a full air charge each cycle. The gasoline, "Otto" cycle, engine dumps cylinder pressure to the exhaust manifold at about 400 psi during full torque operation and at about 75 psi, or less at idle, during low torque operation. Any pressure above atmospheric pressure in the cylinder at the time the exhaust valve opens is usable work energy and is far more valuable than heat (internal) energy. At maximum torque, the gasoline, "Otto" cycle, engine wastes about 7 times as much usable work as the engine of this invention. The diesel engine at low torque dumps 10 to 12 times the amount of usable work as the engine of this invention.

A rule of thumb is that the adiobatic rise in pressure of a combined stoichiometric fuel/air mixture as the result of combustion for the fuels being considered is in the range of 5 to 10 times. Seven times was selected as representative of example fuel calculations. Using the 7 times factor shows extremely high maximum cylinder pressures resulting when using high compression ratios of, for example, 25:1. Tests have shown that the friction of the piston rings results in high power losses and rapid wear at compression ratios about 15:1. The engine of this invention utilizes approximately twice the cubic inch displacement compared to the Otto or diesel cycle engines for the same application. Thus, the compression ratio (air charge) will be well below 15:1 for 90% or more of engine operation. At the same time, the expansion rato remains fixed and high (approximately 25:1) resulting in low cylinder pressures at the time the exhaust valve opens to dump the combustion gases. As a result, efficiency is greatly improved, as in a steam (Rankine) engine with early steam cut-off and high expansion.

Figure 24:
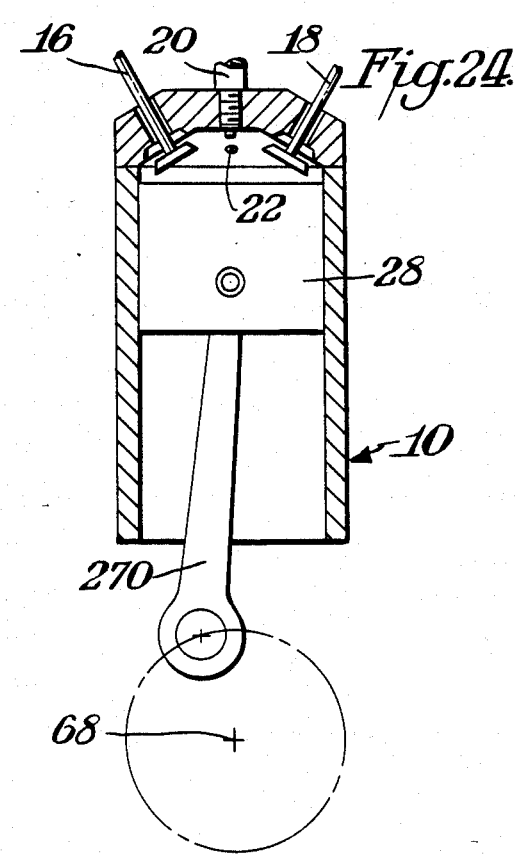
FIG. 24 shows the cylinder at the position of the opening of the intake valve.

FIG. 24 is the same as FIG. 23 except that the crankshaft 68 has rotated to 718°, just 2° before the end of the exhaust stroke. At this crankshaft 68 position, the intake valve 16 opens to allow the velocity of the exhausting gases to draw in fresh combustion air, i.e., scavenge. Events and required equipment with the exhaust stroke are very important to fuel economy. For example, most automobile gasoline (Otto cycle) engines utilize a catalytic converter to enable them to meet emission standards. Under maximum horsepower operation the differential pressure across the converter may be 40 psi or greater. When other exhaust system pressure drops are added to the 40 psi, the piston pushes against at least 70 psi for the full exhaust stroke, which amounts to at least 5% loss of the total power generated. In addition, the scavenging effects at the beginning of the intake stroke can not take place and the air charge is reduced, dilution occurs and much less maximum horsepower is available. It has been demonstrated that at maximum legal highway speed some Otto cycle engines cars can obtain as much as 37% more miles per gallon by elimination of the catalytic converter. The engine of this invention does not require a catalytic converter because it utilizes, in preferred combination, water injection, stoichiometric fuel/air mixture, platinum glow plug ingition, swirl mixing in the combustion chamber, hot smooth wall surface in the combustion chamber, 300° F. air and fuel pre-heat, exhaust gas scrubbing and exhaust to atmosphere at approximately 150° F.

Figure 25:
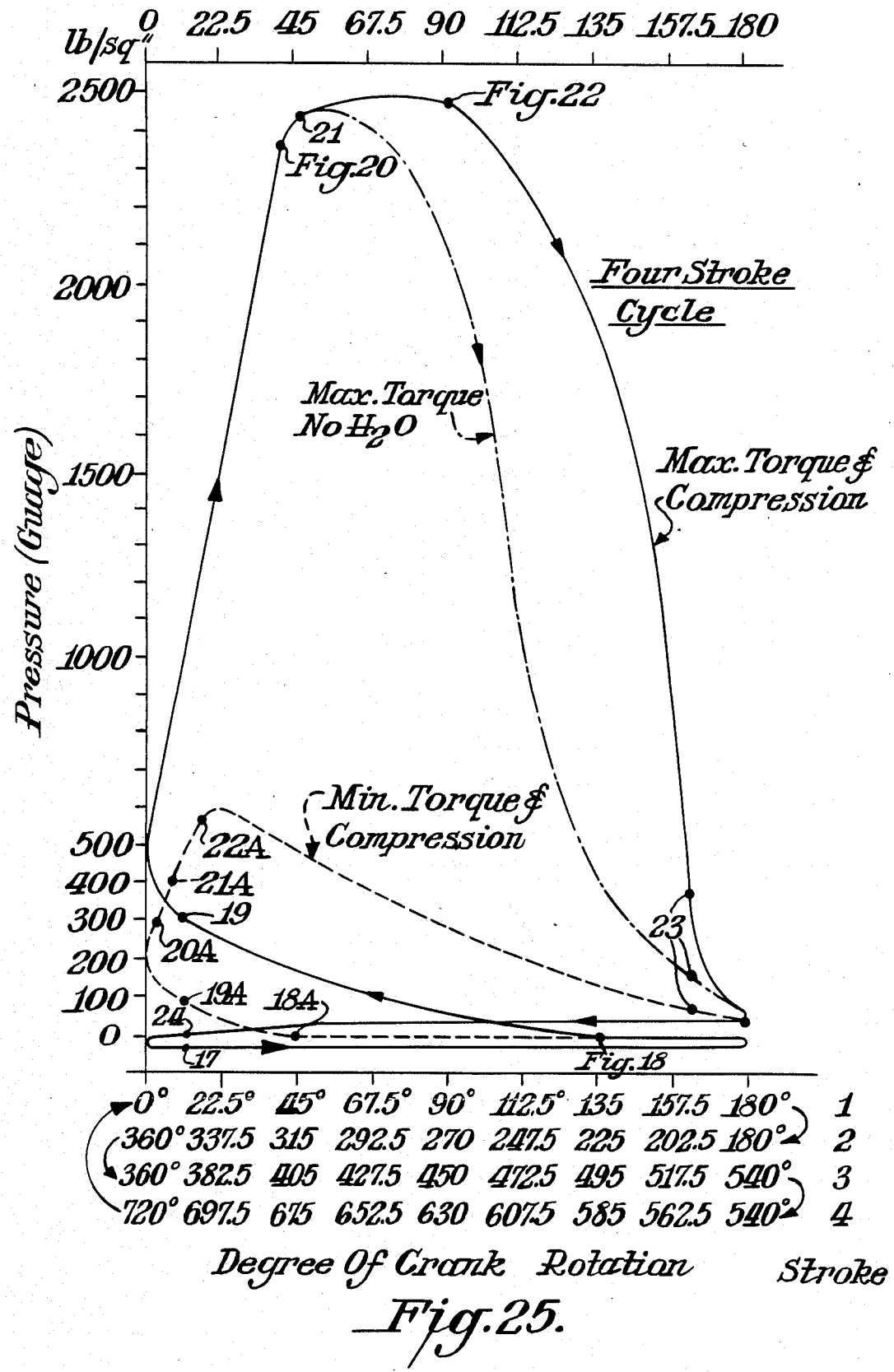
FIG. 25 is a graph of cylinder pressure versus degree of crankshaft rotation (volume) diagram for a four-stroke cycle engine (corresponding to FIGS. 17 to 24) according to this invention.

FIG. 25 is a diagram of pressure vs. crankshaft position which is used to establish efficiency, torque and horsepower available and the differences between the engine cycle of this invention and the Otto, Diesel, Rankine and other known thermodynamic cycles. Most text books utilize a slightly different diagram of pressure vs. volume. Test measurements in the form shown of cylinder pressure vs. crank position or volume in steam (Rankine cycle) or internal combustion engines are called indicator cards. FIG. 25 is drawn to simulate as close as possible an indicator card (actual conditions) rather than a purely theoretical presentation. The solid line denotes the sequence of operation shown in FIGS. 17 through 24 during maximum torque operation. The dashed line denotes the changes in the pressure during the compression and power strokes experienced when the intake valve 16 is closed at 90° of crankshaft 68 rotation late for low torque operation as shown in FIG. 18A. The dotted and dashed line denotes the changes in pressure which occur during the power (expansion) stroke when no water is injected. The average pressure for the power stroke is lower and results in lower torque and lower power from the same fuel charge. The torque and, thus, power generated per four-stroke cycle is proportional to the area inside the lines scribed through dots 18, 19, 20, 21, 22, 23 and then returning to dot 18. From the above area, one should subtract the area inside a line scribed through dots 17, 18 and 24 and return to dot 17. This amounts to subtracting the power used to exhaust spend combustion gases and intake a fresh air charge from the power generated during the power stroke.

FIG. 26 is the first of nine schematic cross-sectional views of one cylinder 10 in a two-stroke cycle, externally scavenged engine with adjustable, delayed closing, intake valves 16. Adjustable delayed closing of the exhaust valves 18 is the preferred embodiment of this invention for two-stroke cycle engines and is shown in FIGS. 35 through 42. FIG. 26 depicts the position of the crankshaft 68 at 350°, or 10° before top dead center, the piston 28 near its maximum compression, the start of fuel injection through fuel injector nozzle 20, the intake valve 16 is closed, the exhaust valve 18 is closed, the scavenging pump 272 is pumping air to the intake valve 16 which is closed, so intake air is compressed to the point that the scavenging air pressure control 274 opens. The fuel mixes with air and is ignited by glow plug 22 with short delay, continually and smoothly during the full period of fuel injection.

FIG. 27 is the same as FIG. 26 except the crankshaft 68 has rotated to 35° after top dead center. At this position, the fuel injector pump 314 has moved through enough stroke to inject a near stoichiometric mixture of fuel for the compressed air present. Fuel injection through fuel injection nozzle 20 stops and combustion is completed shortly thereafter. High temperature and pressure are present due to the combustion process. The piston 28 is forced down to turn the crankshaft 68 resulting in shaft power.

FIG. 28 is the same as FIG. 27 except that water 25 has started to be injected through water injector nozzle 24 (not shown). The crankshaft 68 in this example has moved an additional 5°, and is now 40° after top dead center. The piston 28 is well into the power stroke and the temperature and pressure of the gases in the combustion chamber has started to decrease. The injected water is flashed to steam resulting in approximately 1500 times the volume of water injected. The heat to flash the water to steam is taken from the combustion gases lowering their temperature from approximately 3500° F. to approximately 500° F. and resulting in a reduction of the volume by about 3 times. The result is an increase in cylinder 10 pressure resulting in more power output from the same fuel charge. The generation of NOx is greatly reduced compared to the Diesel engine because a lean fuel/air mixtrue is not used and the mixture is maintained near stoichiometric proportions. Also, the high, approximately 3500° F. temperatures occur only during combustion in the presence of hot platinum and then are quickly quenched with water to approximately 500° F. The gases and vapors are then expanded down to approximately 300° F. and exhausted from the cylinder 10 to the exhaust system where the gases are quenched and scrubbed with water to approximately 150° F. These temperatures, times, fuel/air ratio, etc. result in very little NOx generation while allowing complete combustion of the fuel and very little CO (carbon monoxide).

FIG. 29 is the same as FIG. 28 except that the crankshaft 68 has rotated an additional approximately 50°, and is now at 90° after top dead center. The injection of water stops. The amount of water injected is precisely metered by controlling and ratioing the amount of the water injection pump 316 plunger 341 stroke to the stroke of the fuel injector pump 314 plunger 340 stroke. Trim adjustments of this ratio are made to set exhaust temperature.

FIG. 30 is the same as FIG. 29 except that the crankshaft 68 is now at 45° before bottom dead center which is 135° after top dead center. The exhaust valve 18 opens to exhaust the combustion gases and steam. This dump pressure may be over 125 psi when the engine is running at full torque and may be down to atmospheric pressure or less when running at low torque. A low back pressure exhaust system is a critical need when the two-stroke cycle engine is used because the time for exhausting is very short and no exhaust stroke is used.

FIG. 31 is the same as FIG. 30 except the crankshaft 68 is now approximately at 5° before bottom dead center or 175° after top dead center. The intake valve 16 opens to let pressurized combustion air fill the cylinder 10 and scavenge [purge] the remaining exhaust gases. The pressurized combustion air is supplied to the scavenging pump 272. When the intake valve 16 opens to relieve the scavenging air pressure, the relief valve 274 closes so all air from pump 272 is available to purge [scavenge] and charge cylinder 10. When a multi-cylinder engine is used, a large intake manifold 292 is used along with more frequent operation of intake valves 16 to prevent the operation of relief valve 274 which wastes energy.

FIG. 32 is the same as FIG. 31 except the crankshaft 68 has rotated to 25° after bottom dead center or 205° after top dead center. The exhaust valve 18 is closed.

Most of the exhaust gases have been exhausted and later closing would waste combustion air and reduce the air charge to the cylinder 10. Later closing of the exhaust valve 18 for reduced torque in the arrangement FIG. 26 through 33A is a preferred embodiment of this invention shown in detail by FIGS. 35 through 43.

FIG. 33 is the same as FIG. 32 except the crankshaft 68 has rotated to 45° after bottom dead center or 225° after top dead center. The intake valve 16 closes, having charged as much air into the cylinder 10 as possible and not allowing much, if any, air to return to the intake manifold 292. The above condition results in maximum air charge, maximum torque and maximum compression ratio.

FIG. 33A is the same as FIG. 33 except the crankshaft 68 has rotated to 45° before top dead center or 315° after top dead center. The intake valve 16 closes, having allowed a full charge of air into the cylinder 10 and then allowing most of the air charge to return to the intake manifold 292 where it is relieved to atmosphere by valve 274. The above condition results in near minimum air charge, minimum torque and minimum compression ratio. Closing the intake valve at any position between what is shown in FIG. 33 and 33A results in an air charge, torque and compression ratio between maximum and minimum and is an embodiment of this invention to obtain control with low throttling losses. In the two-stroke cycle engine, the use of exhaust conduit 64 with restriction 75, (see FIG. 5), may not adequately increase the braking ability of the engine. In order to obtain good engine braking on these engines, an exhaust valve leak is introduced for engine braking. Based upon the knowledge that an engine with leaking valves (or poor rings) cranks very hard and slow, the amount of leak that is most effective varies with the engine rpm and needs the air charge control set for maximum. The amount of valve 18 opening for engine braking is a balance of events in the compression and expansion strokes. If there was no leak during the compression stroke, the most power would be absorbed. However, during the expansion stroke it would be best if all the air had been bled off and the valve closed so a vacuum would be drawn for maximum engine braking. The embodiment of this invention provides for the heel of the accelerator pedal 102 shown in FIG. 11 to be depressed to obtain more leak and more engine braking. An override is connected [electrically, mechanically, hydraulically or pneumatically] to limit the opening of the valve 18 as a function of engine speed. One example of methods to incorporate this embodiment has been added to FIG. 33A. It includes an auxiliary rockerarm 207 inserted between camshaft 36 with cam lobe 37 and the stem of valve 18. Normally the auxiliary rockerarm 207 moves with the stem of valve 18 with no override effect. During braking operation, eccentric 209 is rotated through linkage 213 by actuator 211 to raise the right end of the auxiliary rockerarm 207 which lowers the left end of rockerarm 207 and opens the valve 18 slightly. When the cam lobe 37 moves down, it takes over control of the valve 18 and opens it fully per the normal sequence. When the actuator 211 pulls down to normal position, the leak of valve 18 is removed and enhanced engine braking is eliminated.

In FIG. 33A, dashed lines have been added to show an optional inlet manifold 293 and cylinder porting 291. When this arrangement is used in a two-stroke cycle engine, improved scavenging would be obtained and two valves 16 and 18 are available for exhaust. These two valves allow adjustable delayed closing of one of the exhaust valves 18 as described in connection with FIG. 12.

Figure 34:
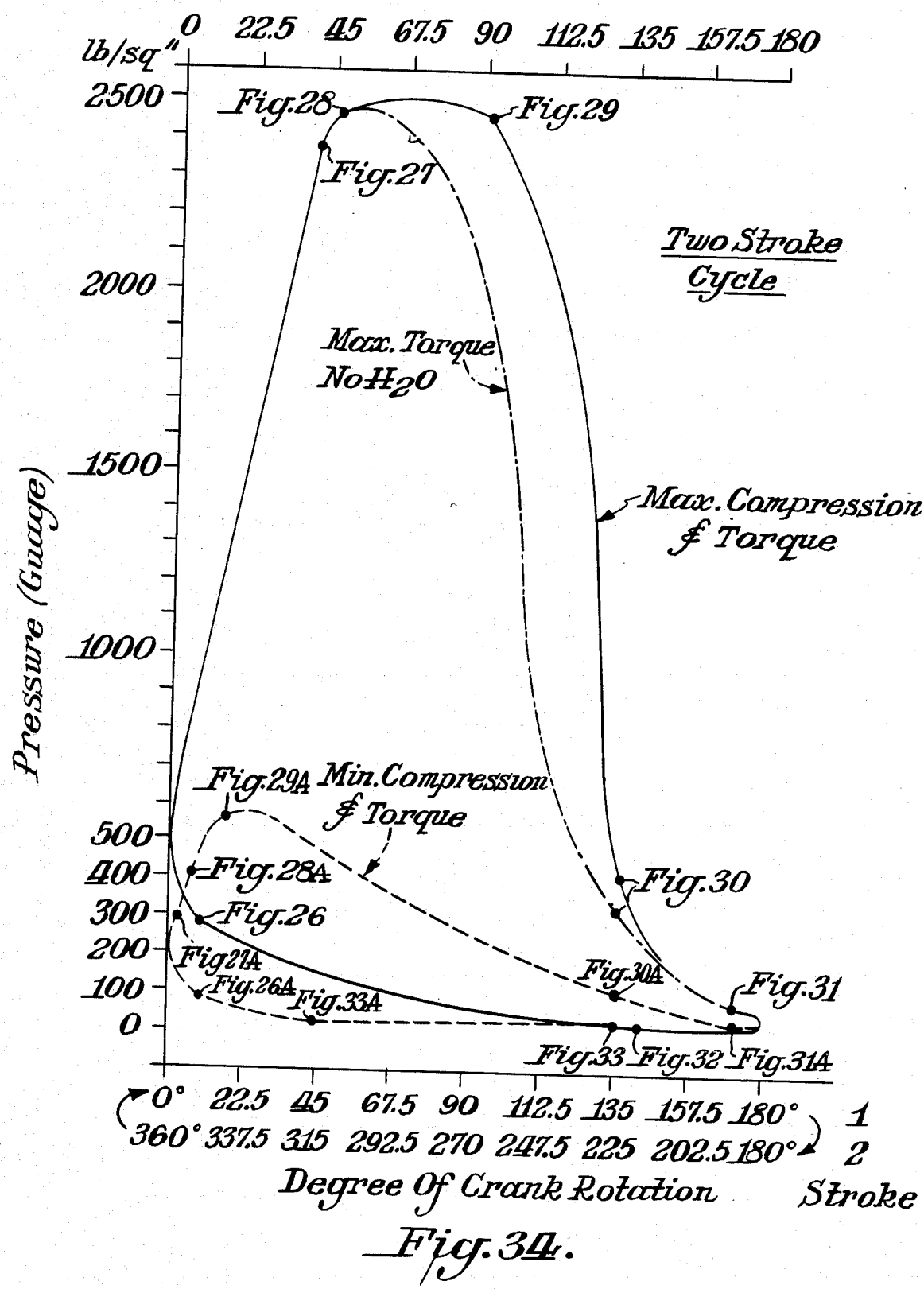
FIG. 34 is a graph of cylinder pressure versus degree of crankshaft rotation (volume) for a two-stroke cycle engine (FIG. 26 through 33a) according to this invention (adjustable closing of the intake valve)

FIG. 34 is a graph of pressure vs. volume [crank 68 position] in the embodiment of the two-stroke cycle, external scavenging pump 272, adjustable delayed closing intake valve 16 engine, shown in sequence by FIGS. 26 through 33A. This diagram shows the maximum torque envelope with water injection [solid line] and without water injection [dash and dot line]. These power envelopes are generated for each revolution of the crankshaft 68. The minimum torque envelope with water injection is shown by the dashed line. The power generated is represented by the area within the envelope which subtracts the compression stroke from the power (expansion) stroke. The power used to drive the scavenging pump should be subtracted from the power represented by the area in the envelope.

Figure 35:
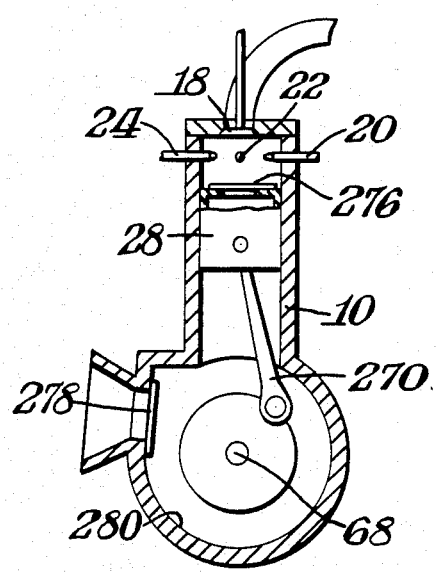
FIG. 35 is a first schematic in a series of one-cylinder views in a two-stroke cycle, crankcase scavenging, adjustable closing exhaust valve engine, showing the sequence of events of the embodied invention, depicted at the position where fuel injection stops and air to crankcase stops (valve closes)

FIG. 35 is the first of nine schematic cross-sectional views of one cylinder 10 in a two-stroke cycle, crankcase 280 scavenged engine with adjustable delayed closing exhaust valve(s) 18. The intake valves 276 are reed [flapper] type and are located in the piston 28. FIG. 35 depicts the position of the crankshaft 68 at 40° after top dead center. The injection of fuel through injector nozzle 20 has just stopped. The piston 28 is well into the expansion [power] stroke. The intake flapper valve 276 is closed. The exhaust valve 18 is closed. The crankcase scavenging inlet valve 278 closes and the crankcase 280 is increasing in pressure due to the piston 28 reducing its volume. Combustion will be complete in a few degrees of crank 68 rotation.

Figure 36:
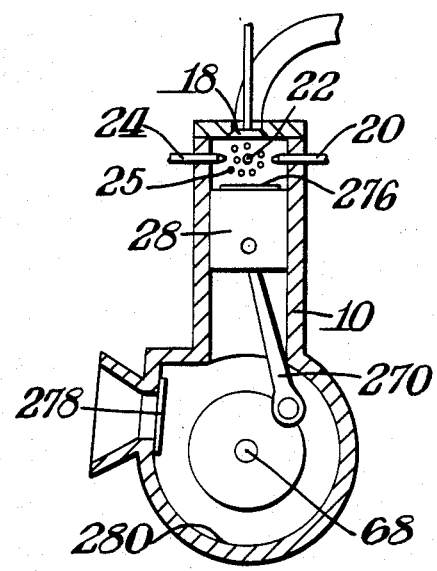
FIG. 36 shows the cylinder at the position of the start of water injection.

FIG. 36 is the same as FIG. 35 except the crankshaft 68 has rotated 5°, to 45° after top dead center. Combustion is near completion and the piston 28 has moved lower in the power stroke. Water injection 25 through injection nozzle 24 has just started.

Figure 37:
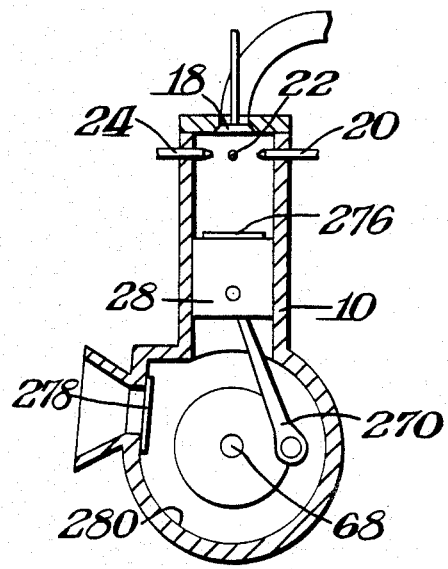
FIG. 37 shows the cylinder at the position of the stop of water injection.

FIG. 37 is the same as FIG. 36 except the crankshaft 68 has rotated 45°, to 90° after top dead center. The piston 28 has moved half way through the power stroke and water injection through nozzle 24 has stopped. The high temperature of combustion of 3500° F. or higher is reduced by gas expansion and by vaporization of the injected water. With expansion only, the temperature would be reduced to the range of 700° F. to 1400° F. During exhaust. With water injection added, the exhaust temperature is reduced to approximately 300° F. Calculations indicated that there would be an increase in engine efficiency in the Diesel engine and the engine of this invention by the injection of liquid water into the cylinder 10 after combustion. Under these conditions calculations show a far greater volume, approximately 3 times, of gas plus vapor during expansion. The injection of water as a liquid, after combustion and ratioed to fuel injection when it does not retard combustion is a teaching of this invention.

Figure 38:
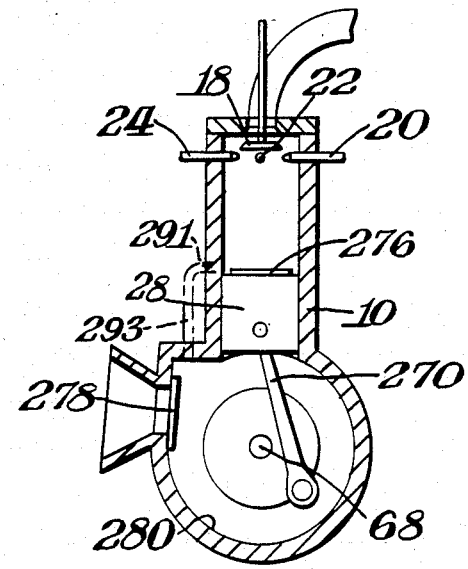
FIG. 38 shows the cylinder at the position of the opening of the exhaust valve.

FIG. 38 is the same as FIG. 37 except the crankshaft 68 has rotated an additional 45°, to 135° after top dead center. The piston 28 has moved to the lower part of its power stroke and the exhaust valve 18 has opened. The exhaust valve 18 has a very high flow capacity and the exhaust system is disigned for very low back pressure to the cylinder 10 can be evacuated in the short time available before the opening of the intake valve 276 or the optional intake port 291 and duct 293.

Figure 39:
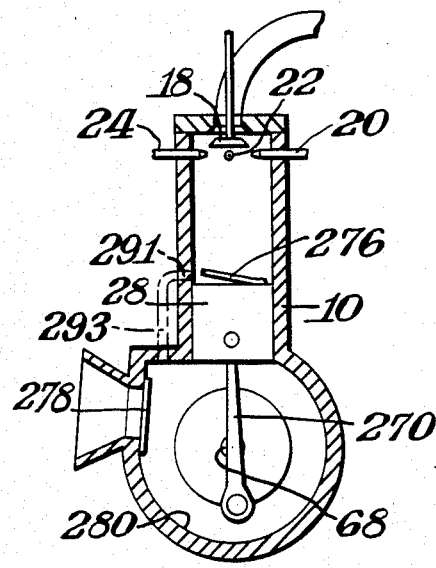
FIG. 39 shows the cylinder at the position of the opening of the piston top intake valve and optional intake porting.

FIG. 39 is the same as FIG. 38 except the crankshaft 68 has rotated 35°, to 170° after top dead center. About this time the intake flapper valve 276 opens to scavenge the remaining exhaust gases out the exhaust valve 18 in a spiral flow pattern. An option is the opening of the intake port 291 and duct 293 which will scavenge the cylinder 10 in a spiral flow pattern. The spiral flow pattern is produced by a helix 290, shown in detail in FIG. 47, in the piston 28 or by the direction of the optional intake ports 291.

Figure 40:
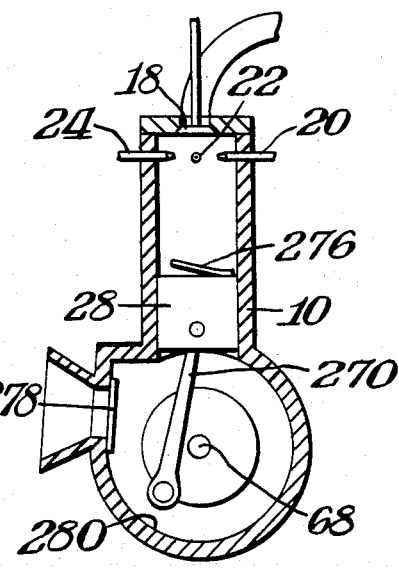
FIG. 40 shows the cylinder at the position of the closing of the exhaust valve (high torque demand)

FIG. 40 is the same as FIG. 39 except that the crankshaft 68 has moved to 40°, after bottom dead center which is 220° after top dead center. The piston 28 has started to move up and the spent gases have been scavenged from the cylinder 10. The exhaust valve 18 closes and intake air continues to surge into the cylinder 10 through intake valve 276 due to the kinetic energy of its velocity. Maximum torque, compression and air charge is obtained when the exhaust valve closes at this position of the crankshaft 68. The crankshaft inlet valve 278 remains closed.

Figure 40A:
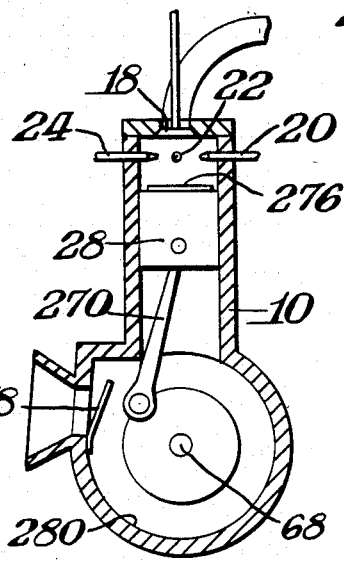
FIG. 40a shows the position of the closing of the exhaust valve (low torque demand)

FIG. 40A is the same as FIG. 40 except the crankshaft 68 has rotated 95°, which is 315° after top dead center. The exhaust valve 18 closes for minimum torque, compression and air charge. In FIG. 40A the intake valve 276 has closed and the crankcase scavenging valve 278 has opened, as shown in FIG. 41.

Figure 41:
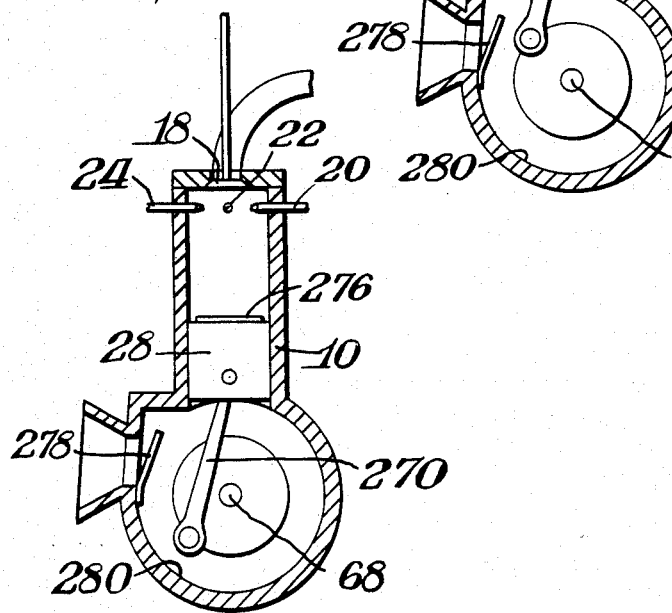
FIG. 41 shows the cylinder at the position of the closing of the piston top intake valve and opening of the crankcase inlet valve.

FIG. 41 is the same as FIG. 40 except the crankshaft 68 has rotated 10°, to 230° after top dead center. The piston 28 has moved up a small amount and the maximum air charge is in the cylinder. The intake valve 276 closes and the crankcase scavenging valve 278 opens. A full charge of combustion air starts to move into the crankcase 280 due to the upward movement of the piston 28.

Figure 42:
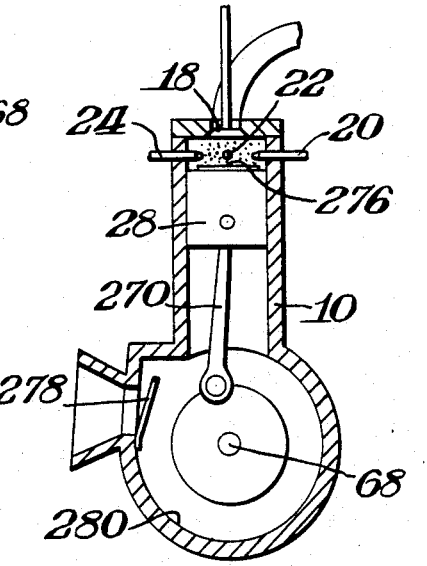
FIG. 42 shows the cylinder at the position of the start of fuel injection.

FIG. 42 is the same as FIG. 41 except the crankshaft 68 has rotated to about 10° before top dead center, which is 350° after top dead center. The piston 28 has moved up to very near the maximum compression piston and fuel injection starts through injector nozzle 20. The fuel has been preheated to near 300° F. by use of low grade exhaust heat and engine block temperature and the heat of high pressure pumping for injection. Some fuels, if not all fuels, may be flash heated and at least partially vaporized by an electric discharge heater. The flash vaporizer may be a part of the fuel injection nozzle and may be located in the small short passage of the injection valve nozzle 20. The at least partially vaporized fuel is directed a very short distance toward the glow plug 22 which is the same direction as the hot compressed air swirl. A rich, not mixture of fuel, vapor and air quickly contacts the hot surface [1200° F. to 2000° F.] of the glow plug 22. It (22) is well above the critical diameter of a sphere which will initiate and propagate a flame front. Combustion [burning] starts very quickly, before a big inventory of fuel is introduced into the cylinder 10. The consistently short period, i.e. percent of injector pump stroke, between the start of injection and the start of combustion, compared to with the relatively long period [degrees of crankshaft rotation] of injection, result in a smooth, nearly constant pressure of combustion without pressure spikes and destructively high pressures. No knock, ping or rattle should be heard as in the Diesel and gasoline (Otto) cycle engines. A remarkable tolerance for most liquid fuels are the result of these embodiments of this invention.

Figure 43:
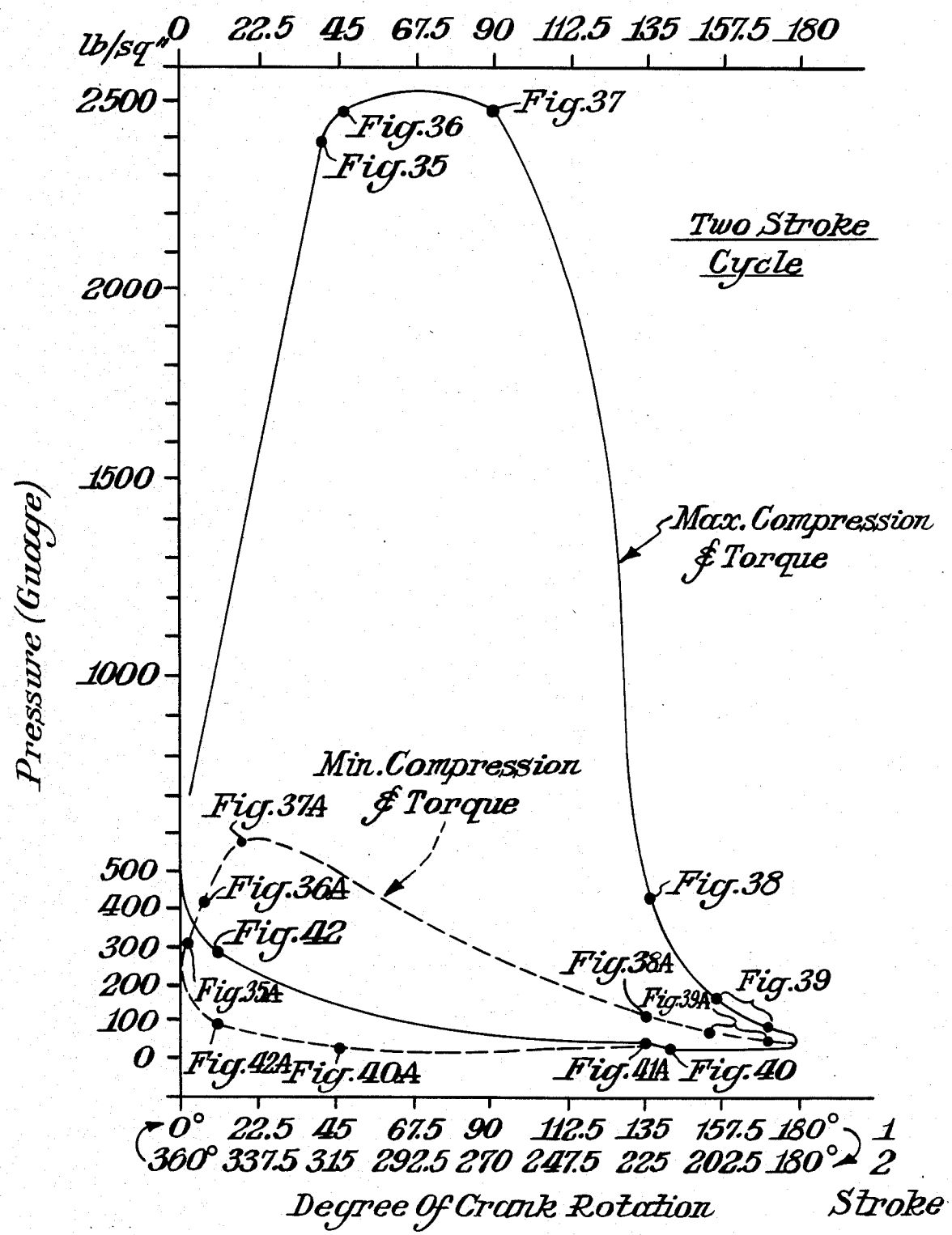
FIG. 43 is a graph of cylinder pressure versus degree of crankshaft rotation (volume) for a two-stroke cycle engine (FIGS. 35 through 42) according to this invention (adjustable closing of exhaust valve)

FIG. 43 is a graph showing pressure vs. crankshaft 68 postion [volume] for the embodiment of a two-stroke cycle, crankcase-280 scavenged, adjustable-delayed-closing-exhaust valve 18, engine, shown in sequence in FIG. 35 through FIG. 42. The diagram of FIG. 43 shows the maximum torque, compression and air charge enveloped with water injection [solid line]. The minimum torque, compression and air charge envelope with water injection is shown by the dashed line. The power generated is represented by the area within the envelope which subtracts the compression stroke from the power [expansion] stroke. The power used to power the crankcase scavenging should be subtracted from the power represented by the area in the envelope. With the two-stroke cycle engine, use of delayed closing of the exhaust valve 18 instead of delayed closing of the intake valve 16, 276 or 291 would be more efficient. This is because lower header 292 or crankcase 280 pressure would be experienced, and, thus, lower scavenging pump losses are subtracted from the power developed. In both two- and four-stroke cycle engines, the use of the exhaust valve 18 to obtain adjustable torque, compression and air charge is generally more efficient because the direction of flow of the combustion air is not changed and swirl would be of greater strength.

FIG. 44 shows the mechanical arrangement of one cylinder 10 of the engine where functional description is depicted in FIGS. 35 through 43. Included are the cylinder 10, the lower crankcase 282, the upper half crankcase 280, the crankshaft 68, the crank throw and counter weight 284, the connecting rod 270, the crankcase scavenging inlet flapper [leaf] valves 278, the cylinder extension 33, ceramic insulation 23, head 12 and exhaust valve 18. Platinum flashing 38 on all ceramic insulation 23, the fuel injector nozzle 20, the glow plug 22, the inlet valves 276. the exhaust header 62, the piston 28, with extension 32, the piston rings 30, and the water injector nozzle 24 are also shown.

FIG. 45 is a plan view taken along line 45—45 of FIG. 44, looking up at the cylinder head 12 and its accessories. Included is the exhaust valve 18, the ceramic insulation 23, the platinum flashing 38, the fuel injector nozzle 20 and its spray pattern with the air swirl, the glow plug 22, the water injector nozzle 24 and its spray pattern with the combustion gas swirl.

FIG. 46 is a plan view taken along line 46—46 of FIG. 44 looking down on the piston 28 top and the cylinder extension 33. The four flapper valves 276 shown in this example are secured at the clockwise end of each valve port 286. This arrangement continues the swirl pattern of the intake air which becomes more violent as the combustion air is compressed. Swirl has been shown to be very important to obtain good (complete) combustion with low ignition lag, freedom from pressure spikes and low emissions. Also shown is the ceramic insulation 23 and platinum flashing 38 inside the cylinder extension 33. The piston rings 30 far down on the piston 28 would not be seen in this view as only a few thousandths of an inch clearance exists between the piston extension 32 and the platinum flashing 38 of the cylinder extension 33.

FIG. 47 shows a cutaway view of the extended 32 piston 28 of FIG. 44. FIG. 47 shows helix vane 290 inside the piston 28 and its extension 32, which imparts a clockwise swirl to the incoming combustion air. This swirl is further enhanced by the valves 276 opening in the direction of flow. The piston pin bearing bosses 287 and ports 286 are sloped to further enhance swirl. The inside perimeter of the piston 28 is lined with screen wire 288. This screen 288 traps engine lube oil which is entrained in the combustion air from crankcase scavenging. The inside surface of the piston is sawtoothed 289 to prevent oil movement upward behind the screen 288 and to encourange oil flow downward to the dry sump crankcase 280, 282. Piston rings 30 are shown for completeness.

FIG. 48 shows schematically use of some conventional techniques to heat the inlet combustion air as much as possible except during maximum torque operation. Present practice, utilizes a shroud 296 to direct combustion air around the exhaust manifold 62, then to valve 300, which takes the warm air to the carburetor and engine for fast warm-up and less pollution. With present practice as soon as warm-up is attained, valve 300 moves to introduce cool air to prevent pre-ignition and detonation. The embodiments of this invention include adding insulation around the shroud 296, the air cleaner 294, the intake manifold 292 and the head 12 to make maximum use of the available heat. The air valve 300 in its normal position shuts off cool air from the air intake. During maximum torque operation, switch 114 is closed by accelerator pedal 102 or the control electronics to actuate solenoid 298 and bring in cooler air through valve 300 to obtain maximum air charge instead of maximum economy. The preheated air provides for best economy and combustion. Pre-ignition cannnot occur as the fuel is not injected until combustion is desired. The hot air helps to prevent detonation in the engine of this invention by preventing delayed ignition with a high, unburned fuel inventory in the cylinder 10.

FIG. 49 shows schematically the operational arrangement of the fuel and water injection systems of this invention. Starting at the fuel tank 368, the fuel passes into the fuel supply pump 302, the discharge fuel line 310 is affixed to the exhaust pipe 64 to gain as much heat as possible from this counter flow heat exchanger arrangement. The fuel line shut-off valve 306 is normally actuated by solenoid 308 through the ignition switch. The 3-way valve 306 allows fuel to pass from the fuel supply pump 302 to the fuel injection pump 314 when the engine is shut down; this valve 306 shuts off fuel from the injector pump 314 and recirculates any fuel pressure present back to the fuel tank 368. A positive shut down is insured in case of a fuel device failure or fuel line pluggage and engine run-on or run away. A manual override to close valve 306 may be used and is available to the driver. From valve 306 the fuel at approximately 250 psi passes to injector pump 314, which, in this example of a four-stroke cycle engine, is driven at one-half the crankshaft 68 speed by a timing belt or chain whose tension is adjusted by idler pulley 20. The fuel output to the fuel injector nozzle 20 is clamped to the cylinder 10 to pick up any additional heat available. The pressure of the fuel in this line is approximately 500 psi, may be 100 psi when a balanced by-pass valve 352 is used, when injection is not taking place and 1500 psi to 5000 psi when injection is taking place. While injection is not taking place, the fuel passes through the fuel injector valve 20 housing at 500 psi (optionally less tha 100 psi) and clears any gases which may have entered. The fuel passes through the by-pass valve 352 and drops in pressure from approximately 500 psi (optionally less than 100 psi) to 3 or 4 psi, to return to the fuel tank 368. When fuel is being injected, the by-pass valve 352 closes and the fuel pressure builds up to cylinder 10 pressure plus approximately 1500 psi to open the fuel injector valve 20. The fuel passes through the nozzle of the fuel injector valve 20 into the cylinder 10 combustion chamber. Injection continues until the needed portions of the injector pump 314 plunger 340 stroke has occurred then the by-pass valve 352 opens and injection stops.

The water injection system starts with the water tank 370 from which water is taken by the water supply pump 304, then adjacent to exhaust pipe 64 to obtain heat. The water then feeds the water injection pump 316 which is driven by timing belt/chain 318 with tension adjustment pulleys 320. The water gains more heat from the cylinder 10 on the way to the water injection valve and nozzle 24. When injection is not signalled, water passes through the by-pass valve 352 and returns by water lines 312 to the water tank 370. When water injection is desired, by-pass valve 352 closes and water is injected through injection valve and nozzle 24.

The water vapor in the exhaust pipe 64 is spray condensed, recovered, filtered, cooled and returned to the water tank by the water recovery system 372. The water recovery system 372 also acts as an excellent exhaust muffler system.

FIG. 50 shows one of the two or more fuel or water injector pumps 314 and 316 consisting of the following: Body, block and cylinder assembly 324 is bored and lapped for receiving plungers 340 and 341, lube oil gallery 344 and annular ring 342, check valves 350, return spring 338, plunger guide 322 and guideway 336. The body may be fabricated from powdered metal for good wear, seal, lubrication, freedom from corrosion and proper thermal expansion coefficient. Attached to the bottom of the body 324 to drive the plunger 340 and receive oil flowing past plunger 340, 341 are the following: Eccentric housing (oil pan) 326, one of 5 to 10 lower main bearing caps 331, one of 5 to 10 upper main bearing caps 333, main bearing cap bolts 334, eccentric journal 328, eccentric outer bearing 332 and showing oil level 335 in eccentric housing (oil pan). The stroke of the plunger 340, 341 for many engines will be ¼ inch, which means the center of the eccenctrical journal 328 would be ⅛ inch offset from the center of the eccentric shaft main bearing journals 330. The center line of plunger 340, 341 may be offset with repect to the center of the main journal 330 as shown against the direction of rotation of the eccentric shaft 330, 328. The amount of this offset is approximately ½ of the offset of the center of the eccentric journal 328, or 1/16 inch in this example. The portion of the plunger 340, 341 stroke used for injection may be 0.080 inch. The diameter of the plunger 340 used in the fuel pump 314 may be 3/16 inch for some engines. The diameter of the plunger 341 used in the water injection pump 316 may be 1/2 inch for use with the same engine. The pressure of the lube oil in the galleries 344 and annular ring 342 will be regulated between the suction pressure at inlet 346 being approximately 250 psi and the injection pressure experienced at outlet 343 when the by-pass valve 352, FIG. 52, is closed. Injection pressure may vary from 1500 psi to 5000 psi. The lube oil pressure will be regulated to accomplish a very small net flow of lube oil from the annular ring 342 past the plunger 340, 341 clearance to the fuel or water. One plunger in the fuel injector pump 314 or the water injector pump 316 will be ported and plumbed to take suction from the engine lube oil system and discharge to the high pressure oil galleries 344. The lube oil pressure and pressure pulsations will be regulated by another plunger against a spring with a side relief port. In the four-stroke cycle engine, the injector pumps 314, 316 will normally rotate at ½ crankshaft 68 speed. When there is need for more fuel or water per degree of crankshaft 68 rotation, the injector pumps 331, 316 may rotate at crankshaft speed or double crankshaft 68 speed, as long as multiples of two are used. In the two-stroke cycle engine, the injector pumps 314, 316 will normally rotate at crankshaft 68 speed. If more fuel or water is needed per degree of crankshaft 68 rotation, then any whole interger multiplier of crankshaft 68 speed can be used. Faster injector pump 314, 316 rotation will require some plumbing changes.

Figure 51:
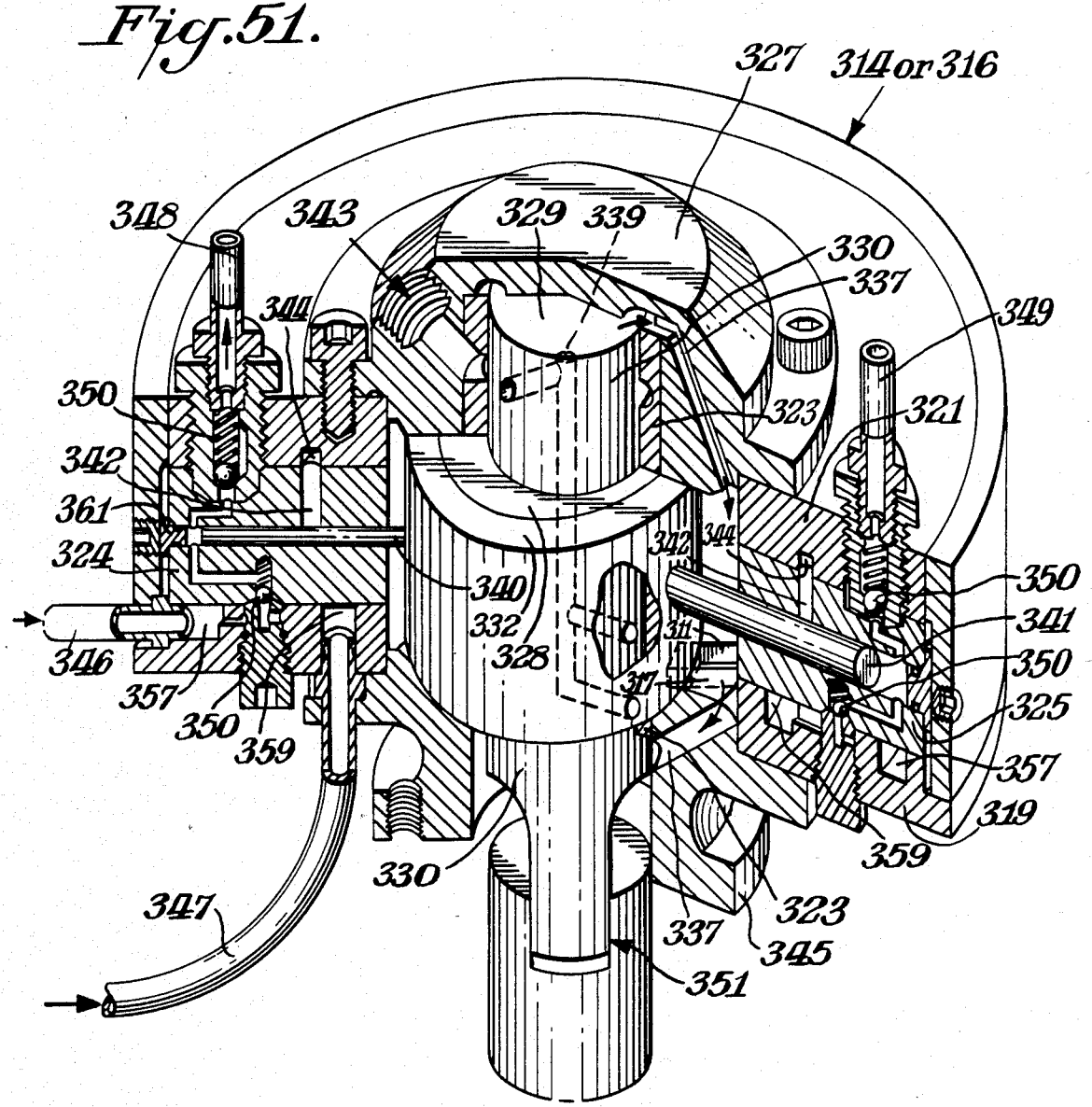
FIG. 51 is a conceptional drawing of a fuel and water injection pump according to this invention.
Figure 51A:
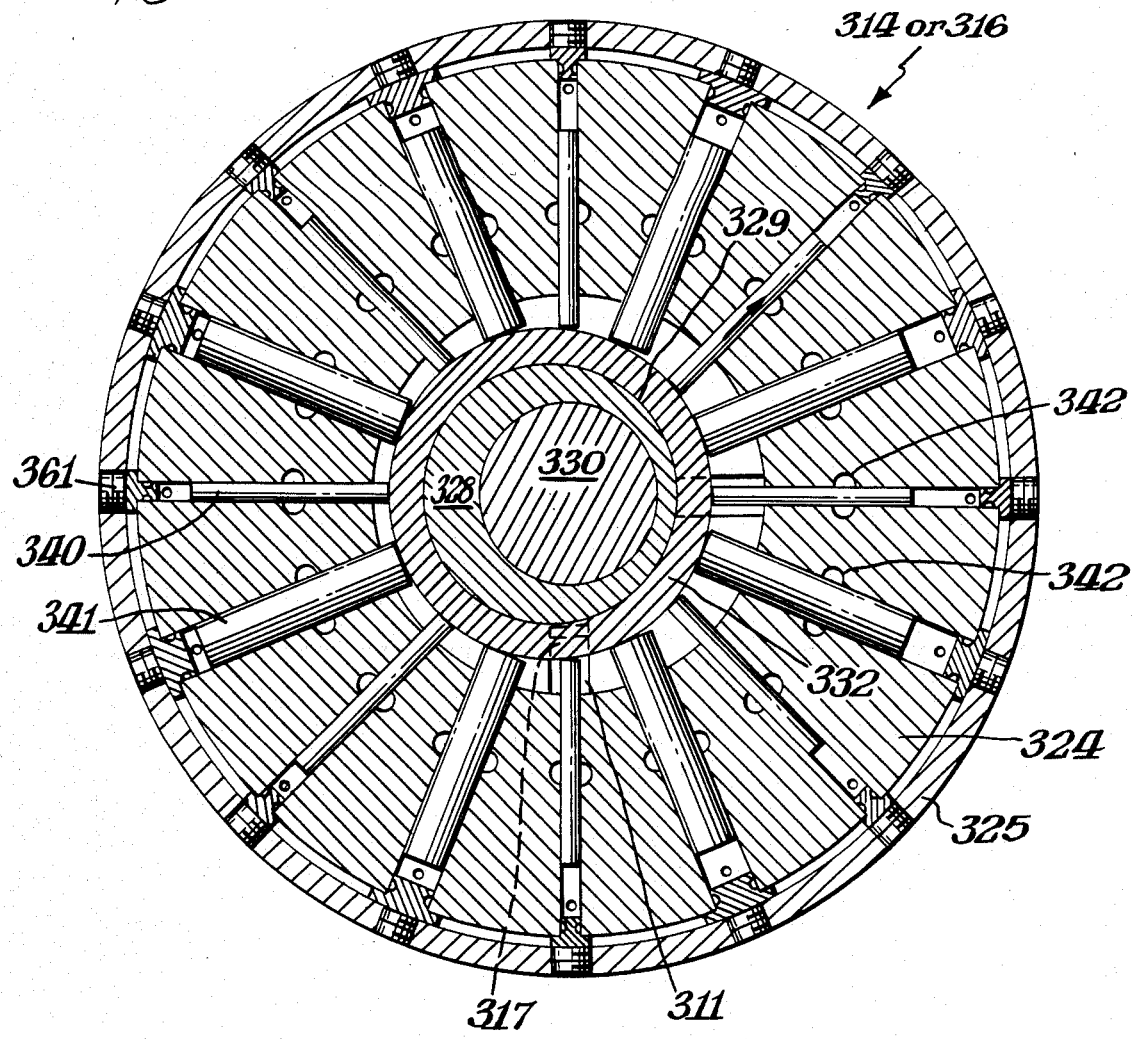
FIG. 51a is a top plan view in cross-section taken through the plungers of the fuel and water injector pump of FIG. 51.

FIGS. 51 and 51A are two figures taken from conceptual and fabrication drawings of a combined fuel and water injection pump 314, 316. There is one body 324, approximately 6 inches in diameter and 1 inch high. It may be fabricated of powdered metal for good wear, corrosion, errosion, seal and lubricating properties. In this pump 314 and 316 there will be eight fuel plungers 340 and eight water plungers 341, all plungers 340 and 341 are extended by contact with one eccentric outer bearing race 332 which moves through the full stroke [in this example, ¼ inch] with 180° rotation of the eccentric journal 328 and eccentric shaft 329. The plungers 340 and 341 are maintained in contact with the eccentric bearing 332 on the return (suction) stroke by approximately 250 psi suction pressure of the fuel or water. The eccentric shaft 329 is driven by a tongue and groove assembly 351 or other style of coupling. The two main bearings 332, their journals 330 and the one eccentric bearing 332 with its journal 328 are sleeve type. They are lubricated by engine pressurized lube oil entering through passage 343 and galleries 339 in eccentric shaft 329. Lube oil returns to the engine crankcase by galleries 337. Lubricating oil at regulated pressure adjustable from 250 psi to 5000 psi or greater is introduced to the plungers 340 and 341 through galleries 344 in the upper body and gallery section 321 and by annular grooves 342 around the plungers 340 and 341. The fuel inlet 346 is connected to fuel gallery 357 in the lower body and gallery section 319 to inlet check valves 350 and into the fuel plunger 340 cavities. These fluid passages are fabricated with no gas traps in order that dependable metering can be accomplished. Water or water solution enters at inlet 347 into gallery 359 and then passes through check valves 350 to the water plunger 341 cavities. The eccentric bearing 332 is prevented from rotating by tongue 317 which protrudes downward into keyway or groove 311. It is well lubricated by engine lube oil returning to the crankcase by galleries 337. The upper body and gallery section 321 and the lower body and gallery section 319 are secured after machining to the main body 324 by braizing or other suitable technique. A ring 325 is used to secure plunger cavity end seals 361 and fuel inlet 346. The upper main bearing housing 327 and the lower main bearing housing 345 are secured to the pump body 324, 319, 321 by bolts. They are sealed against leakage by "O" rings or other type of seal. The plunger bores are progressively lapp machined to obtain the close clearances between plungers 340 and 341 and bores to keep lube oil leakage to a minimum and not result in seizing. The fuel plunger outlet check valve 350 directs fuel through tubing 348 to one of the fuel by-pass valves 352 (not shown). One option of this invention utilizes the injection plungers 340 and 341 outlet check valves 350 to establish approximately 500 psi back pressure on the system to prevent 250 psi suction pressure from free flowing through the system when the by-pass valve 352 is open. The water plunger 341 outlet flows through check valve 350, tubing 349, injector valve 353 and by-pass valve 352.

FIG. 51A is a plan view of FIG. 51 at a cross section through the center of main body 324. All plungers 340 and 341 and their bores have their center lines on a radius from the center line of eccentric shaft 329 without offset. Either direction of rotation may be employed. Offset may be used to reduce wear by limiting to one direction of rotation.

Steel ring 325 holding the plunger 340 and 341 cavity seal 361 is shown in FIG. 51A, the two types of plungers 340 and 341, main bearing journal of the eccentric shaft 330, eccentric journal of the eccentric shaft 328, the tongue on the eccentric bearing 317, the key way 311 for anti-rotation of the eccentric bearing 332 and the annular high pressure lube galleries 342 for the plungers are all shown.

FIG. 52 shows electronic controlled by-pass valve 352, the device in the injection systems which determines the amount and timing of the fuel and water injection, plus the related device which make the system work. When injection is not called for, the fuel or water tank 368 or 370 supplies fluid to the suction of supply pump 302 or 304 where the pressure is raised to approximately 250 psi. The fluid flows through tube 310 or 312 to the fuel injector pump 314 or 316 where the pressure is raised to approximately 500 psi to enable fluid to pass through by-pass valve 352. On the way to by-pass valve 352, the fluid flows through the top of the injector valve 353 body to expel any gases. The fluid will not open the injector valve 353 to the nozzle 355 and combustion chamber until the pressure of the fluid reaches at least 1500 psi above combustion chamber pressure. No electrical power or reverse polarity is supplied to the piezo electric or magnetostrictive device 358 so it is in the shortest configuration. Only spring 360 exerts a force on the valve plunger 356. The plunger cavity 374 in which spring 360 and crystal 358 are located is vented and drained to the engine crankcase and is maintained at near atmospheric pressure. The fluid pressure relief chamber 366 is vented and drained to the fuel or water tank 368 or 370. The valve plunger is exposed to two forces, the force of the spring 360 and the force exerted by the fluid from the injector pump 314 or 316 through the top of injector valve 353 body to the area of the valve plunger 356 exposed to the fluid inlet conduit. The fluid pressure over a fixed area results in a force against spring 360. When the fluid pressure reaches approximately 500 psi, its force would equal the spring force and the valve would open maintaining that pressure against the injector valve 353, which does not open, and pump discharge 314 or 316. The fluid passing through the by-pass valve returns to the fuel or water tank 368 or 370 and no fuel is injected into the combustion chamber.

When it is desired to inject fuel or water into the combustion chamber, electrical energy of correct polarity is supplied to the piezo electric crystal or magnetostrictive device 358. In the energized, correct polarity condition, the crystal 358 is in the extended condition and exerts a force on the valve plunger 356 which is additive to the spring 36 force. With the additional force on the valve plunger 356, approximately 5000 psi fluid pressure from the injector pump 314 or 316 would be required to unseat the plunger and relieve to the fuel or water tank 368 or 270. When fluid does not pass through the by-pass valve 352, pressure builds within the injector pump 314 or 316 to approximately 1500 psi plus the combustion chamber pressure and this opens the injector valve 353 injecting fluid into the combustion chamber through nozzle 355.

The start of the fluid injection with respect to crankshaft 68 position is to be controlled by electronic logic. The quantity of fluid injected is to be controlled by the number of degrees of crankshaft 68 rotation the crystal 358 is energized by the electronic logic. Fuel consumption measurement is effected by totalizing the number of degrees of crankshaft 68 rotation that fuel is injected. Accurate measurrment and control is obtained because the output volume (stroke) of the injector pump per degree of crankshaft 68 will be linear during the period of fuel injection.

Engine lube oil pressure is supplied to annular ring 362 to lubricate the valve plunger 356 in the valve housing 354 with a wide variety of fuels and with water as the fluid. A fluid seal 365 limits the loss of lube oil to the fluid.

Figure 52A:
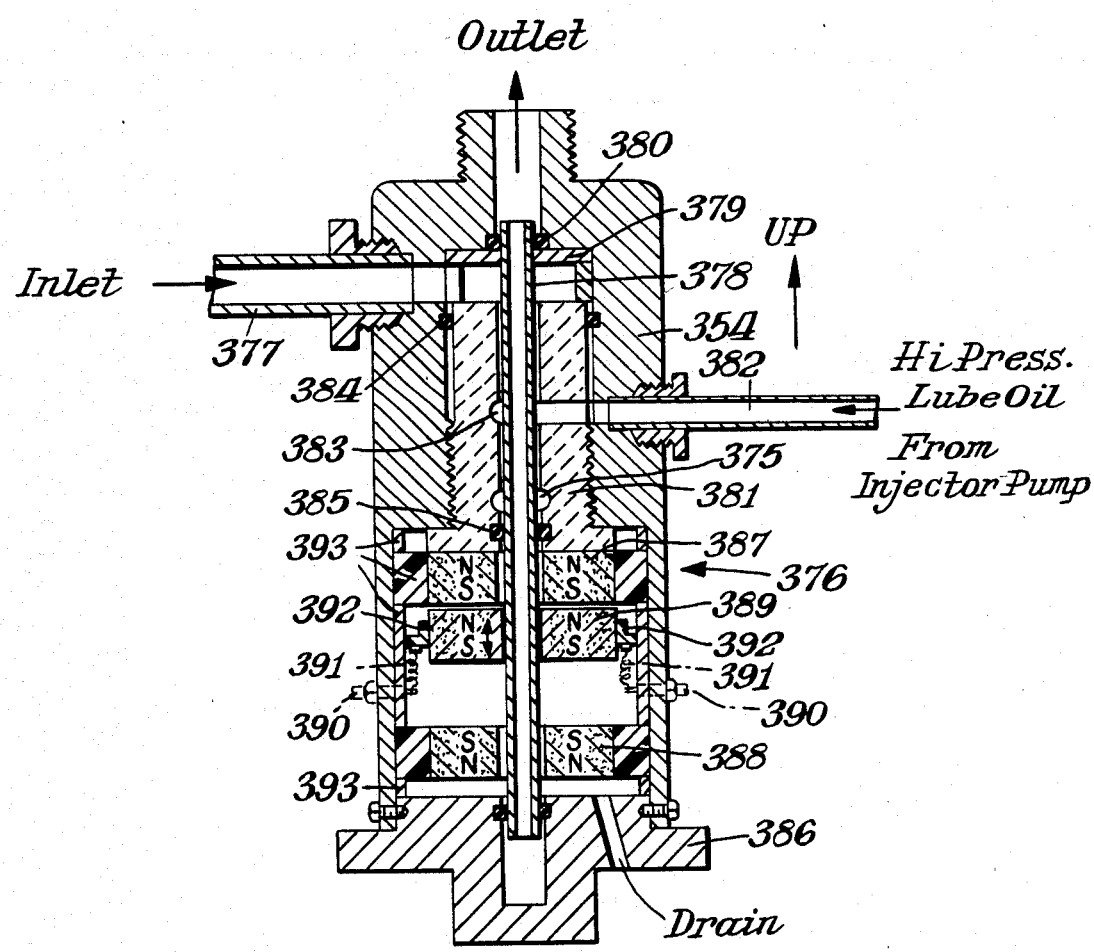
FIG. 52a shows the moving coil, polarized, by-pass valve of this invention.

As shown in FIG. 52A, the moving coil, balanced by-pass valve 376 has been developed as an option to the piezo actuated by-pass valve 352. The magnetic by-pass valve 376 of this invention utilizes a valve body 354, a fuel or water inlet 377, a metallic, usually stainless steel, valve tube 378 which moves up into the valve seat retainer 379, and valve seat seal 380 to stop by-pass flow. The valve tube 378 moves down out of the valve seal 380 and retainer 379 to open and restablish by-pass flow and stop injection. With this valve 376 closed, the pressure at the inlet (also to the injector valve 353) is approximately 1500 psi plus combustion chamber pressure during injection. The pressure at the by-pass valve 376 and injection valve 353 when not injecting will be less than 100 psi unless otherwise arranged. The pressure at the outlet check valve 350 of the injector pumps 314 or 316 should be 500 psi when not injecting and 1500 psi plus combustion chamber pressure when injecting. This is to be accomplished by a heavy spring on the outlet check valve 350. The valve tube 378 is supported, guided and sealed by honed and lapped cylinder 381 which incorporates the high pressure lube oil inlet 382 and annular ring 383 as well as seal 384 and seal 385. Annular groove 375 drains to the lube oil sump to relive seal 385 from exposure to high pressure lube oil. The bottom end cap 386 closes the bottom end of the valve 376 and is a guide, balance pressure chamber, seal and drain for the valve tube 378. The actuator consists of two ring shaped permanent magnets 387 and 388 with their south poles toward the moving coil 389. The moving coil 389 in one configuration is preferably made from ¼ inch Mylar® audio tape with aluminum or silver conducting plate coated on top of the ferrite (or chrome) magnetic coating. The tape 389 is secured to the tube 378 valve and wound to the diameter of the ring magnets 387 and 388. The conducting paste allows electrical current to selectively magnetize the ferrite coating. As shown, the north end is on top and pulls the south pole of permanent magnet 387. The bottom of the moving coil 389 is south polarity and is repelled by the south pole of permanent magnet 388. A pulse of electrical current will polarize the moving coil 389 and move it 389 to the desired position. After reaching position, electrical current is no longer required to hold the coil 389 in position because of the memory of the ferrite coating. The ferrite coating strengthens the magnetic field and helps overcome the distance of the magnetic gap. By reversing the polarity of the electrical current pulse, the magnetic polarity of the moving coil 389 is reversed. The upper permanent magnet 387 repulses and the lwoer permanent magnet 388 attracts the moving coil 389, moving it to the lower position against the lower magnet 388 where it is held by the memory of the ferrite coating. The contact surfaces of the moving coil 389 and the permanent magnets are quite flat. As a result, the air will dampen the last movement as they come together and prevent damage. Electrical current is carried to the coil 389 by insulated terminals 390, conducting flexure strips 391 and anchors 392 on the coil 389. The permanent magnets 387 and 388 are held in position by non-magnetic, electrically insulating tubes 393.

Figure 53:
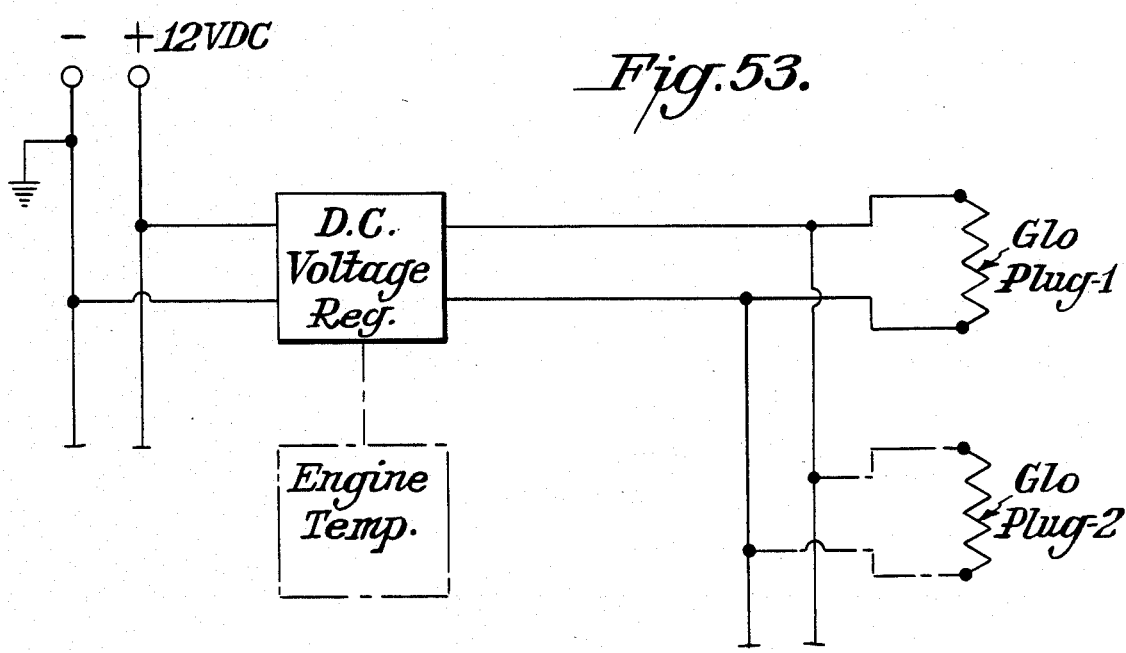
FIG. 53 is a schematic diagram of a simple glow plug temperature control according to this invention.

FIG. 53 indicates a simple manner of electrically controlling the temperature of some types of glow plugs in an engine. The D.C. voltage regulator takes the nominal 12 volts D.C. source and controls the output to a steady 9 to 10 volts output D.C. or pulsed D.C. or A.C. The glow plugs have a platinum hemispherical resistance film. The film acts as a resistor with a positive coefficient of resistance with temperature. For a given design of glow plug and a constant cooling environment, a fixed voltage supply will result in a fixed temperature. If the temperature increases, the resistance rises and the current decreases, lowering the temperature. When this self-regulation of temperature satisfies the ignition requirements of the engine under all extremes of the combustion chamber environment, it is the preferred method.

Addition of an engine temperature sensor to reset the value of the regulated voltage will allow this simple system to satisfy wide extremes of operating conditions.

Figure 54:
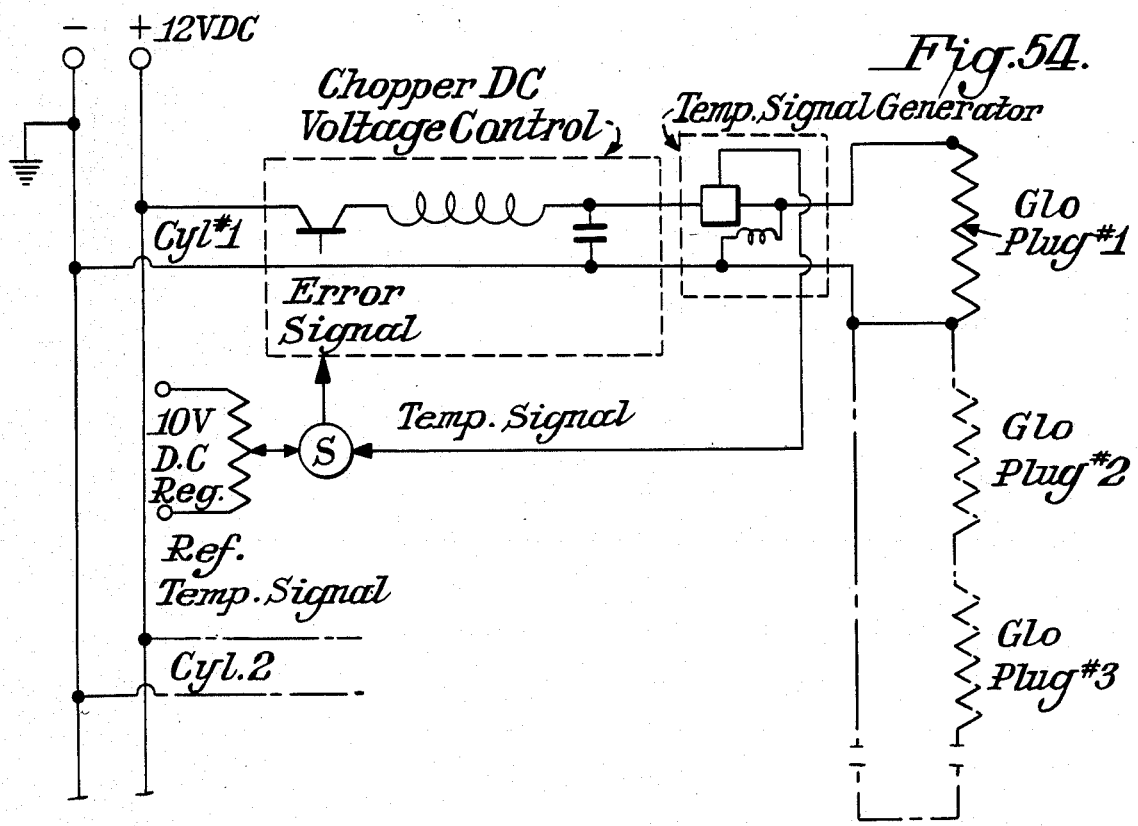
FIG. 54 is a schematic diagram of the electronic means to precisely control the glow plugs of this invention.

FIG. 54 diagrams an accurate glow plug temperature control system. This system used with the platinum film glow plug should meet the needs of an engine requiring precise control of glow plug temperature while being exposed to rapid and wide changes in combustion chamber conditions. Because of the accurate correlation between temperature and resistance in platinum conductor, the glow plug temperature can be determined quickly and accurately by measuring its resistance. Ohm's Law states that $R$ (Resistance $=E$(Voltage)$/I$(Current). A Hall effect device may be used to measure the voltage drop and current, then perform the arithmetic division. The temperature signal generator supplies the temperature of the glow plug. By comparing this temperature signal with a reference temperature signal "temp. set point" in a summing function, a differential signal, or error signal, is generated. The error signal goes to the chopper voltage control to adjust the voltage to the glow plug until the error signal reaches zero. The system can be arranged in at least two configurations. One is as shown with a separate control system for each glow plug. the second configuration would be where all glow plugs are connected in parallel or series across one control system.

Figure 55:
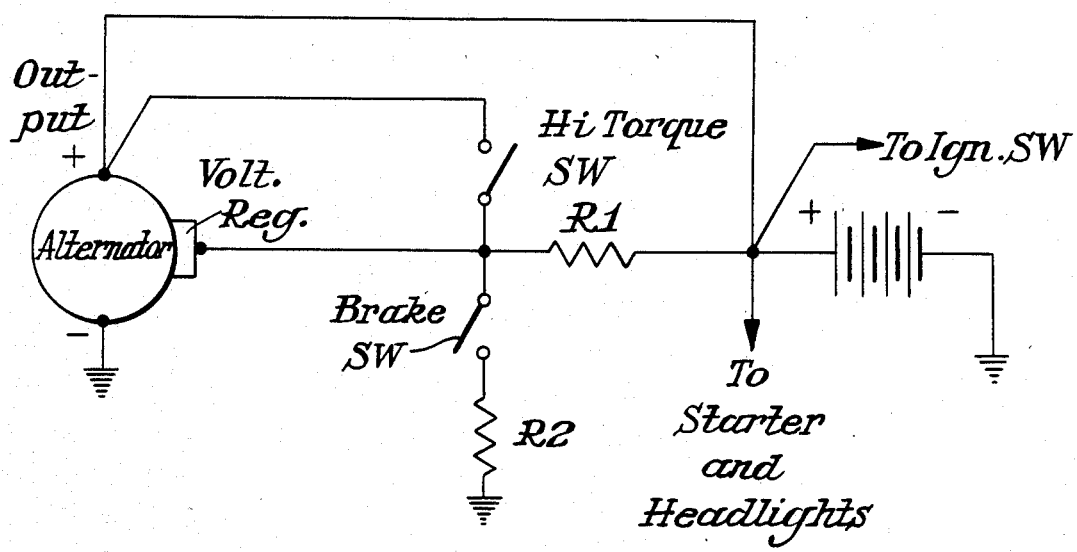
FIG. 55 is a schematic diagram of the electronic means to load and unload the engine with the alternator responding to load demand.

An energy saving alternator control is shown in FIG. 55 indicating the addition of wiring, switches and resistors to the standard automotive voltage regulator controlling alternator output. During normal highway operation, the alternator output is connected to the "+" terminal of the battery and electrical load. The "+" terminal is connected to the battery voltage terminal of the voltage regulator through resistor (R1), which has a small voltage drop across it. When the battery voltage drops, more output from the alternator is required. The addition of (R1) will require setting the voltage regulator for a slightly lower voltage. When the battery voltage rises, less output is supplied from the alternator.

When the accelerator is depressed for high output (torque) from the engine, the high torque switch is closed. With the high torque switch closed, alternator output "+" voltage is connected directly to the voltage regulator. The higher voltage to the voltage regulator cuts back on alternator output leaving more engine power (torque) available to satisfy propulsion demands. As soon as the high throttle position is relieved, the high torque switch opens and the alternator returns to normal operation. The high torque switch may also be closed by a signal from the electronic logic on high torque demand.

When the heel of the accelerator is depressed for engine braking or the brake pedal is slightly depressed, the brake switch is closed connecting the battery "+" voltage signal to ground through resistors (R1) and (R2). This forms a voltage divider which greatly lowers the voltage to the voltage regulator. With low voltage to the voltage regulator, maximum output from the alternator is called for. The battery is charged using energy that normally is wasted by the brakes or engine losses. When the brake is released and/or the heel pressure on the accelerator released, the brake switch opens and the alternator returns to normal operation.

Figure 56:
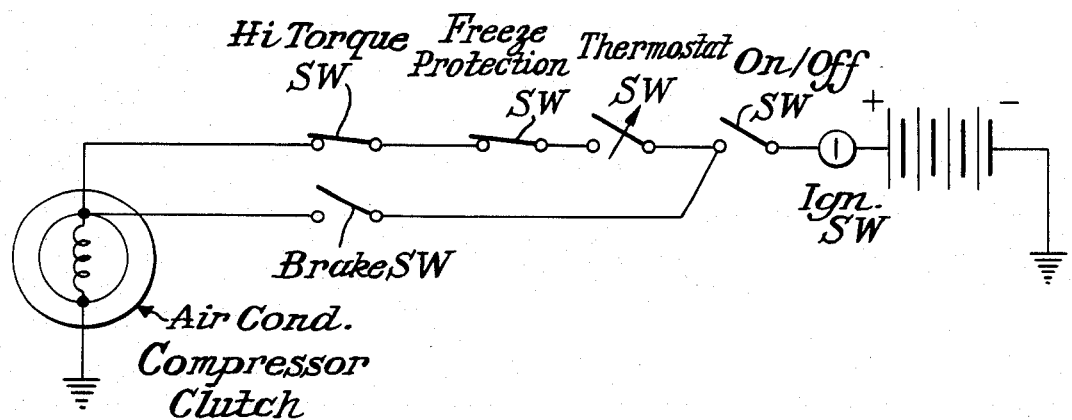
FIG. 56 is a schematic diagram of electronic means to load and unload the engine with the air conditioning compressor responding to load demand.

FIG. 56 shows a control system for an energy-saving air conditioning system. Additional wiring and two switches to the air conditioning compressor controls are required. These two switches permit greater efficiency of engine and air conditioning operation as well as enhanced engine braking. During normal operation, power to the air conditioner compressor clutch flows from the battery, through the ignition switch, through the air conditioner on/off switch, through the optional thermostat switch, through the evaporator freeze protection switch, through the added, normally closed, high torque switch to the clutch coil.

When high torque is required, as indicated by accelerator pedal position or by electronic logic, the high torque switch is opened and the air conditioner compressor load is eliminated making additional torque available to propel the vehicle. When the load demand is removed, the high torque switch is closed and normal operation continues.

When the heel of the accelerator is depressed for engine braking or the brake pedal is even slightly depressed, the brake switch closes and the compressor clutch is energized and closed except when the air conditioner on/off switch is off or the ignition switch is off. During extended operation in this mode, such as in descending a long mountain grade, the evaporator may freeze up, this should result in low air flow through the evaporator but no damage. Energy will be better utilized and wear and tear on brakes is reduced.

FIG. 57 is a functional block diagram of an electrical and/or pneumatic and/or hydraulic and/or mechanical control circuit which should perform the functions and sequence of operations necessary to accomplish the thermodynamic cycle of this invention on an internal combustion engine of this invention. FIG. 57 is best described by listing each item in sequential order with a description of the item's function, need and operation.

Item 106. The accelerator potentiometer 106 adjusts the voltage of the desired engine speed buss 408 in response to the accelerator pedal position (not shown).

Item 400. Amplifier 400 increases the strength and isolates the input signals 402, 404, 406 from the output potentiometer 106. The voltages of the inputs are summed to give the voltage of the output. The output voltage of amplifier 400 determines the maximum output voltage of potentiometer 106.

Item 401. The high engine speed limit module 401 allows freedom of control inputs without allowing overspeed and damage to the engine.

Item 402. The regulated voltage reference input 402 to amplifier 400 sets the idle speed of the engine by adjusting the value of the desired engine speed buss 408 when accelerator potentiometer 106 is at the minimum (idle) position.

Item 404. The transmission ratio input 404 to amplifier 400 adjusts engine speed to the transmission gear selected. The result of input 404 is to enable the position of accelerator potentiometer 106 to determine engine speed when the transmission is in neutral and determine vehicle speed when any transmission gear is selected. The highest voltage input is used for the greatest gear ratio (low gear) and the lowest voltage input is for the smallest gear ratio (high gear).

Item 406. The fuel injection voltage input 406 enables fuel injection when voltage is present. When no voltage is present at input 406, there will be no output from amplifier 400 and no voltage on the desired engine speed buss 408. As a result, the demand firing modules 420, 464, etc. will not enable fuel injection. Input 406 does not enable injection during engine braking.

Item 408. The desired engine speed buss 408 is the output voltage from the accelerator potentiometer 106. When the desired buss 408 is equal to or greater than the actual engine speed buss 432 voltage, then fuel injection to all cylinders is enabled. The air charge (compression ratio) control 470 is moved toward the maximum torque position in direct proportion to the amount the desired buss 408 is above the actual buss 432. Increased torque will increase engine speed and the actual buss 432 voltage to establish a new balance. When the desired buss 408 voltage is below the actual buss 432 voltage, the demand firing modules 420, 464, etc. will not enable fuel injection. Engine torque will drop to zero and engine speed will decrease causing the actual buss 432 to drop in voltage. As soon as the actual buss 432 voltage drops to the value of the desired buss 408 voltage, the fuel injection will be enabled.

Item 410. The commutator 410 consists of a disc 411 with a magnet 414 mounted on it. The disc 411 rotates at crankshaft speed when used on a two-stroke cycle engine and at one-half crankshaft speed when used on a four-stroke cycle engine. The disc 411 and magnet 414 rotate past pick-up coils 412, one for each cylinder in the engine. The fixed pick-up coils 412 send an enable pulse (examples T1 and T8) to start the injection sequence for each cylinder at the correct position in the engine sequence. It is noted that the pick-up coils 412 numbers 1 to 8 are cylinder firing sequence and usually are not cylinder numbers.

Item 411. A disc 411, i.e. a gear, a harmonic balancer, a flywheel, etc., is a part that rotates at the same speed as the camshaft and is used as the rotating member of the commutator 410.

Item 412. Pick-up coils 412 are fixed in position and do not rotate. When the magnet 414 in or on the rotating disc 411 passes a coil 412, it generates an enable signal. This enable signal starts the injection sequence of the cylinder, which is near the position where combustion should begin.

Item 414. A magnet 414 is located in or on the rotating disc 411 of the commutator 410 to generate enable voltages from pick-up coils 412.

Item 415. A fuel and water injection signal sequence chart 415 plots the presence or absence of a logic signal at various positions of the crankshaft. The injection signal sequence 415 is plotted for one engine cylinder and the start of the next cylinder in the firing order. Eight signals, T1 through T8, are shown.

Item 416. The OR module 416 has an input for each cylinder of the engine and one enable output (T1). If any input is in the "1" (signal) condition, the output will be in the "1" (signal) condition. The output enable signal starts the count of VAC-1 418. The other condition of the inputs and outputs if the "0" (normal) condition.

Item 418. A voltage adjustable counter VAC-1 418 is used to adjust the start of fuel injection to all cylinders with respect to the position of the piston in the cylinder at the start of the power (expansion) stroke. Very shortly after fuel injection starts, ignition occurs. Combustion continues until shortly after fuel injection stops. In this circuit, VAC-1 418 is enabled (reset) to start counting degrees of rotation of the crankshaft by a pulse signal T1 from any of the pick-up coils 412 of the commutator 410 through OR logic 416. The pulses indicating degrees of rotation of the crankshaft are input to VAC-1 418 from buss 428. The voltage that determines the number of pulses to be counted comes from AMP 436. This signal is smaller with higher engine speed. Thus, fuel injection starts earlier with higher engine speed. VAC-1 418 outputs a pulse T2 to VAC-2 438 when the count is complete and VAC-1 418 is "set". VAC-1 418 is now ready for another "reset" enable pulse from the commutator 410 to adjust the start of fuel injection to the next cylinder in the firing order.

Item 420. The random demand firing fuel injection control module for the first cylinder in the firing order is DF-1 420. When the crankshaft rotates to the position where the injection sequence for the first cylinder in the firing order should start the magnet 414, should pass pick-up coil #1 412 and send an enable pulse T1 to DF-1 420. If the desired torque, engine speed, vehicle speed signal 408 is greater than or equal to the actual torque, engine speed, vehicle speed signal 432, then the enable pulse T1 will pass through DF-1 to FF-1 422 and "set" FF-1 422. Cylinder #1 will have fuel injected. When the desired signal 408 is less than the actual signal 432, the enable pulse T1 will not pass through DF-1 420 and fuel injection will not occur in cylinder #1 of the first order. There is a demand firing module such as 420 and 464 for each cylinder of the engine.

Item 422. The flip-flop logic elements for cylinder #1 of the firing order FF-1 422 will output a pedestal enable signal to terminal 1 of AND-1 424 when, and only when, a "set" pulse is passed through DF-1 420. The output enable signal will be maintained until a pulse T4 from VAC-2 438 resets FF-1 422. This signal T4 occurs at the end of fuel injection. The function of this logic element 422 is to select the proper cylinder for injection. There is a flip-flop logic element such as 422 for each cylinder of the engine.

Item 424. The two-input and logic element AND-1 424 requires both inputs 1 and 2 to be in the "1" state for the output to assume the "1" state. The output is amplified in power by AMP-1 442 to close the by-pass valve F-1 444 for the portion of the fuel injection pump stroke necessary to inject the needed fuel. The end of the pedestal signal also sets FF-11 448 so water is injected only to cylinder #1 of the firing order. There is a two-input AND logic element like AND-1 424 for each cylinder of the engine.

Item 426. The flywheel starter gear 426 is one means to obtain pulse signals 428 that can be arranged to give a pulse for each degree of crankshaft rotation. The pulses are obtained by magnetic pick-up coils 412. Two pulses are readily obtained from each gear tooth by one pick-up coil 412. Four pulses per gear 426 tooth can be obtained by use of a second pick-up coil 412, etc. These pulses are used to accurately measure engine RPM (speed) and to accurately start and stop fuel and water injection at changing crankshaft positions.

Item 428. The pulse engine speed buss 428 is obtained from gear 426 by pick-up coils 412. There should be about one pulse per degree of crankshaft rotation. This 428 pulse signal is used by the four pulse counters (VAC's) to control injection start and stop. Engine speed buss 428 is used by a frequency (pulse) to voltage converter 434 to obtain an analog voltage signal 432 which is proportional to engine speed. It may also be used to obtain digital engine speed indication.

Item 430. The bias voltage 430 sets the base position of the piston just before the start of the expansion (power) stroke when fuel injection starts.

Item 42. The direct current, analog, voltage, actual engine speed, signal buss 42 is derived from the pulse engine speed buss 428 by the frequency-to-voltage converter 434. This buss has a number of uses. As an inverse NOT input to AMP 480, this results in the air charge (torque) signal buss 446. Buss 432 is needed to accurately generate the air charge buss 446 because less air charge is compressed for the same voltage setting at higher engine speeds. As an inverse actual input to AMP 472, it is compared with the desired engine speed buss 408 to control the amount of air charge (compression ratio) and torque. As an inverse input to AMP 436, the start position of fuel injection is advanced as engine speed increases, it is used as a direct actual input to DF-1 420, DF-2 464, etc. for each cylinder. The actual signal buss 432 is compared with the desired signal buss 408. When the actual engine speed buss 432 is equal to or below the desired engine speed buss 408, the start of fuel injection is enabled. When the actual buss 42 is above the desired buss 408, the start of fuel injection is not enabled. As a direct input to AMP 456, it increases the number of crankshaft degrees of rotation from the stop of fuel injection to the start of water injection as engine speed increases.

Item 434. The frequency (pulse) to analog voltage converter F-V 434 is used to convert the pulse signal buss 428 to a DC voltage amplitude engine speed buss 432.

Item 436. The two-input amplifier AMP 436 has one inverting input 432 and one direct input 430. The function of AMP 436 is to output a DC voltage that will adjust VAC-1 418 for the number of degrees of crankshaft rotation from the injection sequence enable signal T1 to the start of fuel injection T2. The result is to advance the start of fuel injection with an increase of engine speed 432.

Item 438. The voltage adjustable counter VAC-2 438 controls the number of degrees of crankshaft rotation and the percentage of fuel injector plunger stroke during which fuel is injected. By this method, the quantity of fuel for each and all cylinder combustion cycles is accurately controlled. The enable (reset) signal from VAC-1 418 causes the output signal T3 440 to start fuel injection. The pulse signal 428 input containers until the number of counts set by the air charge buss 446 is reached. The output signal T3 440 then drops to zero, "0", and fuel injection stops. At the same time that fuel injection stops, an output pulse T4 is produced to reset the start and count of VAC-3 452, also to reset FF-1 422, etc. for each cylinder of the cylinder selection and fuel demand firing circuit.

Item 440. The fuel injection duration buss 440 signal T3 is generated by VAC-2 438 and is connected to the #2 input of AND gate 1, 2, 3, etc. 424 for each and all cylinders of the engine.

Item 442. The relay drivers, voltage amplifiers, power amplifiers AMP-1, 2, 3, etc. 442 are used to actuate their corresponding by-pass valves F-1, 2, 3, etc. 444 for each cylinder of the engine.

Item 444. The electronically controlled by-pass valves F-1, 2, 3, etc. 444 are closed when energized. They 444 stop return of fuel to the tank and force the fuel to be injected into the combustion chamber under high pressure.

Item 446. The mass (weight) of air (oxygen) which is being charged to each cylinder at any point in time is represented by an analog, direct current, voltage signal buss 446. The signal 446 is generated by AMP 480 which sums the factors which determine the amount of air charged to each cylinder. The signal 446 sets the count of VAC-2 438 to inject the stoichiometric amount of fuel and sets the count of VAC-4 458 to inject water in proportion to the fuel injection for greatest power and efficiency.

Item 448. Flip-flop FF-11 448 is duplicated for each cylinder of an engine by numbers FF-22, 33, 44, etc. The function of FF-11 is to insure that only the one cylinder of the engine that is ready for water injection is enabled. Also, when random demand fuel injection occurs, FF-11, 22, 33, etc. 448 will not enable water injection unless fuel injection has occurred. When fuel injection occurs, AND logic 1, 2, 3, 4 etc. 424 has an output signal like T3. When this pedestal signal drops to zero at the end of fuel injection, FF-11, 22, 33, etc. 448 is set and enabled. The output signal goes to the "1" condition. At the end of water injection, FF-11, 22, 33, etc. 448 is reset by pulse T7 from VAC-4 458 and the output signal drops to the "0" condition. No more water injection will be enabled in this cylinder until a set signal is received from the corresponding fuel injection logic.

Item 450. AND logic 11 450 must be enabled from F-11 448 through input 1 for the water injection pedestal signal T6 (common to all cylinders) to pass. The output pedestal signal passes through AMP-11 460 to by-pass valve W1 462 and water is injected in the #1 cylinder of the firing order.

Item 452. Voltage adjusted count module VAC-3 452 is common to all cylinder water injection systems. The function of VAC-3 452 is to adjust the number of degrees of crankshaft rotation between the stop of fuel injection and the start of water injection. VAC-3 452 utilizes the crankshaft degrees of rotation signal buss 428 to input counts. The bias or base count is set by voltage 454. Faster engine speeds, buss 432 increase the number of degrees of crankshaft rotation between the stop of fuel injection and the start of water injection. VAC-3 452 is reset by a pulse T4 from VAC-2 438. Its one output signal T5 is a pulse to reset and start count on the amount of water injection by VAC-4 458.

Item 454. The bias, base count, DDC voltage 454 is one of two inputs to AMP 456 where it is summed and passed to VAC-3 452 for count adjustments.

Item 456. The amplifier AMP 456 is used to sum the base count bias voltage 454 and the engine speed voltage 432 to set the count for the start of water injection.

Item 458. The voltage adjusted count module VAC-4 458 is used to set up the percent of water injector pump stroke where water is injected. VAC-4 458 is reset to start count and injection by pulse T5 from VAC-3 452. At this point in crankshaft position, the output T6 rises to start the pedestal signal and start water injection in the cylinder selected by the commutator 410. Crankshaft rotation degree count pulses are input by buss 428. The count adjusting voltage is obtained from AMP 468 by summing the air charge torque signal 446, and the exhaust gas or engine block temperature signal 466. This sum makes water injection proportional to fuel injection with trim adjustments by exhaust gas or engine block temperature. At the end of the adjustable count, output signal T6 drops to "0" and stops the selected cylinder water injection. Also a pulse signal T7 is output to reset FF-11, 22, 33, etc., which turns off the enable signal to AND-11, 22, 33, etc., so that next cylinder water injection sequence can be selected.

Item 460. The voltage power and current amplifier AMP-11, 22, 33, etc. 460 is used to operate the by-pass valve W-1, 2, 3, etc., 462, whenever AMP-11 460 receives a signal from AND-11, 22, 33, etc. 450.

Item 462. A water injection by-pass valve W1, 2, 3, etc., 462, is closed for the duration of the electronic signal from AMP-11, 22, 33, etc. 460. When closed, high pressure water from the injector pump is forced to open the water injection valve (not shown) to inject water into the selected cylinder.

Item 464. The random demand firing fuel injection control module for the second cylinder in the firing order is DF-2 464. DF-2 464 is used to determine if the second cylinder in the firing order should have fuel and water injected to mantain the needed torque, engine speed and vehicle speed. The injection enable signal T8 from the commutator 410 will pass through DF-2 464 in the same manner enable signals pass through DF-1, 420, i.e. whenever the desired buss 408 voltage is equal to or greater than the acutal buss 432 voltage. Each cylinder has a demand firing module 420, 464, etc., to accomplish the random demand firing portion engine torque control.

Item 466. The exhaust gas (vapor) or engine block temperature signal 466 is used to trim the basic ratio of water injection to fuel injection.

Item 468. The summing amplifier AMP 468 allows adjustment of the water to fuel injection ratio.

Item 470. The cam relative position torque control motor 470 is used to retard or advance the closing of the intake valve(s) or retard the closing of the exhaust valve(s) or vary the open duration of the exhaust valve(s) during the compression stroke. This motor 470 is powered by AMP 472. It drives the cam relative positioning device and a potentiometer 474, or other device to feed back the relative mechanical position of the valve closing position resulting in adjustable air charge and engine torque.

Item 472. The cam relative position, torque control amplifier 472 has four summing inputs and one output. Zero output drives the relative valve position motor 470 to the normal, minimum torque position. Maximum output drives the relative valve positions to the maximum torque position. The feed back input 476 results in a reproduceable relative valve position for each value of the other summed inputs. Each increase in relative valve position results in a larger air charge size and higher torque amplifier. The normal controlling inputs are the desired engine speed input 408 and the actual engine speed input 432. When the actual input 432 is above or equal to the desired input 408, the valving is set for minimum air charge and torque. As the actual input 432 falls below the desired input 408, the valving is set for greater air charge and torque is proportion to the difference between the two inputs 432, 408 voltages. The arrangement of the actual input 432 as an inverse input results in a zero sum of the two inputs 408, 432 when the two are equal. The engine braking override 478 is normally at zero voltage and has no effect on the other inputs 408, 432, 476. When engine braking is called for, override input 478 goes to maximum to force valving to maximum air charge which permits maximum engine braking.

Item 474. The relative cam and valve(s) position transmitter 474 generates the relative cam and valve(s) position signal 476. When the valves are set for minimum air charge and torque, the transmitter 474 output 476 is at minimum. When the valves are set for maximum air charge and torque, the transmitter 474 output 476 is at maximum.

Item 476. The relative cam and valve(s) position signal buss 476 is derived from transmitter 474. Buss 476 has two primary uses: first as position feed back to amplifier 472 and, second, as the primary summing input to amplifier 480 to determine air charge size, represented by buss 446.

Item 478. The engine braking override input 478 to amplifier 472 drives the relative cam and valve positions to maximum air charge for maximum engine braking enhancement.

Item 480. The air charge, engine torque, summing amplifier AMP 480 is used to calculate continuously the mass (weight) of air (oxygen) in each cylinder charge. The output becomes the air charge, engine torque buss 446. The basic and primary input for this calculation is the relative cam and valve(s) position buss 476 which determines the portion of each piston displacement that is used for the air charge. The other inputs include engine speed 432. Generally as the engine speed increases, the air charge decreases. In this engine, speed effect is non-linear and actually increases the air charge under some conditions. The combustion air intake temperature 484 results in a reduction of air charge mass (weight) with an increase in temperature. When errors in calculating and controlling the air/fuel mixture occur, the input from the exhaust oxygen sensor 482 trims the value of buss 446 up or down to correct the problem. The temperature of the metered fuel 483 may be used to correct the volumetric metering of the fuel to a mass (weight) basis.

Item 482. The engine exhaust oxygen content signal 482 is used to trim the value of the air charge buss 446 to restore the optimum air/fuel ratio.

Item 483. The fuel temperature input 483 measured at the injector pump corrects for fuel volume changes with temperature.

Item 484. The combustion air intake temperature signal 484 taken at the manifold side of the intake valve is used as an input to AMP 480 to make the conversion from volume of air (oxygen) to mass (weight) of air (oxygen) to each cylinder.

ETC tor etc. stands for "and so forth". It is used to simplify FIG. 57 by showng only one set of modules that are needed for each cylinder of the engine.

Figure 58:
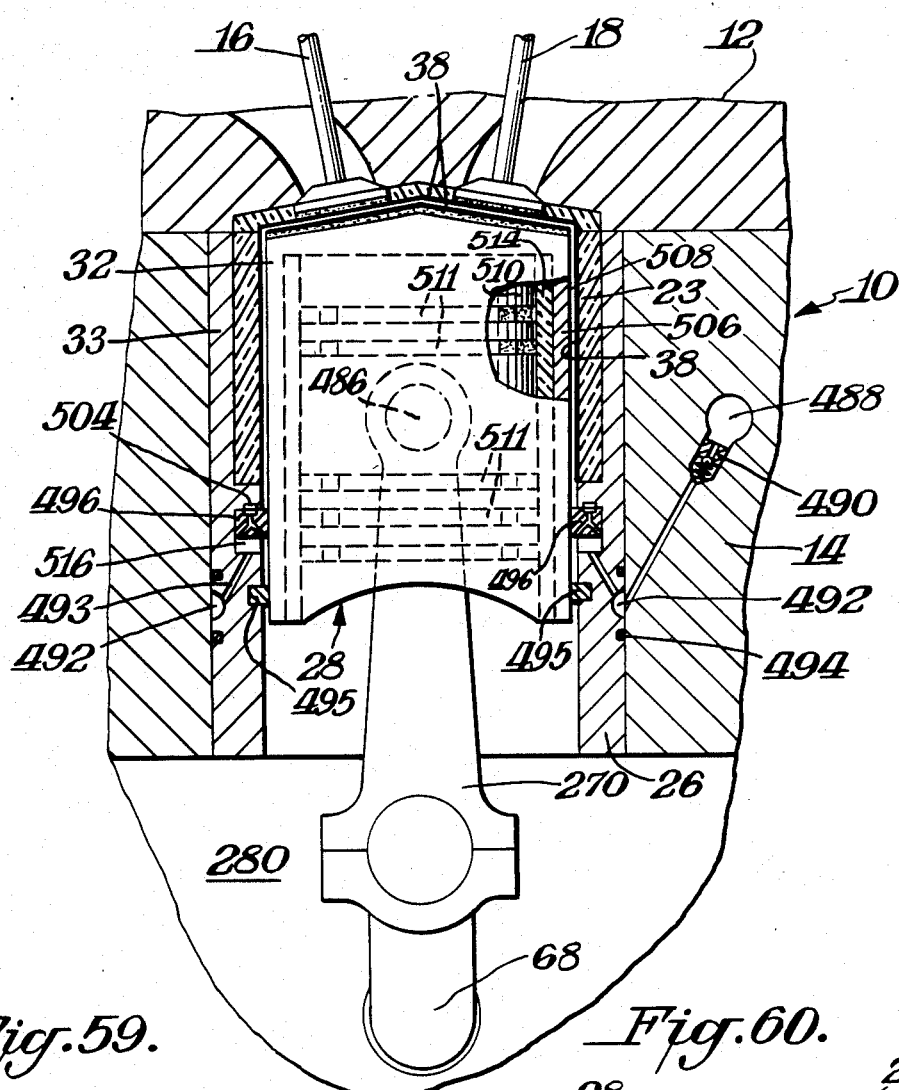
FIG. 58 is a view partly in cross-section of an engine cylinder having a pressure-balanced seal and unique piston.

FIG. 58 is a cross-sectional view of an engine cylinder with the pressure balanced, low friction, no sealed fluid leakage, piston to cylinder seal of this invention. FIG. 58 shows the engine cylinder assembly 10 including the engine head 12 which encloses the top of the cylinder block 14 and supports the valves 16, 18 and other components not shown. The cylinder block 14 is a solid support medium with tubular openings in which the pistons 28 move. The head 12 cover the top and the crankcase 280 encloses the bottom. The intake valve 16 is used to allow passage of combustion air into the combustion chamber in the proper sequence during the combustion cycle. When late closing of the intake valve 16 is used to control torque, some combustion air will flow out of the valve 16 before it (16) closes. The intake valve(s) 16 are usually located in the engine head 12. The exhaust valve 18 is used to allow passage of expended combustion gases plus vapors from the combustion chamber in the proper sequence of the combustion cycle. Exhaust valves 18 are usually located in the engine head 12.

Ceramic-like insulation 23 is used to greatly reduce the loss of heat from the combustion chamber to more nearly conform to adiabatic engine operation. The steel sleeve 26 may or may not be used in the engine block 14. The sleeve 26 is used when the engine block 14 material lacks the strength, lubrication, wear and insulation characteristics needed to enclose the combustion chamber and accomodate movement and seal of the piston 28. The piston 28 is used to change the volume of the combustion chamber and transmit torque to the crankshaft 68. The piston 28 of FIGS. 58, 59, 60 and 61 is considerably different than any piston presently known and is described in detail below. The piston extension 32 or "top hat" is used to displace the volume of the cylinder extension 33 and allows the piston-to-cylinder seal 496 to be located below any surface that is ever in direct contact with the cumbustion gases. The cylinder extension 33 is not used as a sliding lubricated surface. Therefore no lubricated surface in the combustion chamber is in direct contact with the combustion gases. The inner surface is covered with ceramic-like insulating material 23 which is coated with a platinum and uridium-like reflecting material 38. The heat reflective, catalytic, insulation sealing, erosion resistant, platinum and iridium-like material 38 should reduce the heat loss from the combustion chamber by at least one order of magnitude compared to using insulation 23 alone.

The crankshaft 68 is used to convert the reciprocating force of the piston 28 through the connecting rod 270 to the rotating torque of the crankshaft 78. The connecting rod 270 joins the reciprocating piston 28 to the rotating crankshaft 68. The crankshaft 280 encloses the crankshaft 68 and acts as an oil sump. The piston pin 486 connects and forms a bearing between the piston 28 and the connecting rod 270. The engine lube (seal) oil header 488 supplies lube oil to engine parts as well as seal and lube to the piston/cylinder interface. All of the above will occur at a pressure usually in the range of 40 to 80 psi. The lube (seal) oil check valve 490 permits lube (seal) oil to charge the seal recess 516 whenever the lube (seal) oil header 488 pressure is higher. The check valve 490 prevents back flow and loss of balance pressure whenever the oil pressure in the seal recess 516 is higher. The annular oil supply passage 492 evenly supplies lube oil to the seal recess 516 by means of multiple oil passages 493. Lube oil is supplied to the seal recess 516 whenever its (516) oil pressure is less than the engine lube oil supply header 488 pressure. When this occurs, lube (seal) oil from supply header 488 flows through check valve 490 to the annular seal oil ring 492 through passages 493 to the seal recess 516. The seal oil pressure in seal recess 516 is low because the combustion chamber pressure presented to the top of seal ring 496 is low. As a result, the seal ring 496 moves to the top of seal recess 516 as it is filled with seal oil from engine lube (seal) oil header 488. When the combustion chamber pressure presented to the top of seal ring 496 exceeds lube (seal) oil header 488 pressure, the seal ring 496 moves down to increase the seal (lube) oil pressure to balance the combustion chamber pressure. Check valve 490 closes to prevent loss of oil to the lube (seal) oil header 488. The pressure difference across seal ring 496 is always low and interchange of fluid is prevented by the oil film. Friction is very low because of full lubrication and the low mechanical force required of the seal ring 496 on the piston sliding seal surface 508. The oil passageways 493 connect the seal recess 516 and the annular oil supply ring so that even and rapid filling can occur. The oil seals 494 stop oil leaks from the sometimes very high pressure annular oil supply ring 492. Without these seals 494, oil may find a path between the block 14 and the sleeve 26. The optional oil seal ring 495 is shown because it may be necessary on some engines to introduce additional restriction to the leakage of oil from the seal recess 516 to the crankcase 280, in addition to the capillary restriction of the piston 28 to sleeve 26 clearance. The piston to cylinder seal ring 496 is preferably made of filled or unfilled Teflon ® (polytetrafluoroethylene) like material. Its parts and functions are described below. The rotation spring recess 504 is shown for reference when describing FIGS. 62, 63 and 64 below. The piston seal sleeve 506 is shown in FIGS. 58, 59, 60 and 61. It forms the outer shell and head (dome) of the piston 28. Its outer surface is the sliding seal surface 508. The inner surface interlocks with the teeth of the inner shell 511 to hold the piston together and to allow for assembly. The outer shell grooves 507 (not shown in FIG. 58) interlock with the inner shell teeth 511 to hold the piston assembly 28 together. The piston sliding seal surface 508 is a coating on the piston outer seal sleeve 506 which presents a low wear, low friction, good seal surface such as used on the cylinders of aluminum block engines with no cylinder sleeves 26. The piston inner sleeve and pin bearing support 510 is used to transfer forces from the piston outer sleeve 506 to the piston pin 486, and thus to the connecting rod 270 and the crankshaft 68. Support 510 allows assembly of the piston 28 without penetration of the outer sleeve 506 and its seal surface 508. The inner shell teeth 511 protrude from the inner shell and pin bearing support 510 to interlock with the grooves in the outer shell 507 to hold the piston assembly 28 together. The two inserts to lock the piston assembly together 514 are used to insure that the inner shell and pin bearing support 510 can not rotate 90° with respect to the outer (seal) sleeve 506, lose the interlock and come apart. This arrangement is described further in FIGS. 59, 60 and 61.

Figure 59:
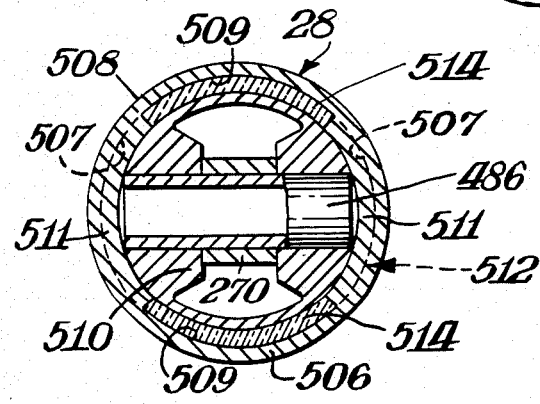
FIG. 59 is a plan view, partly in cross-section, taken along line 59—59 of FIG. 60 of the piston shown in FIGS. 58 and 60 in the locked position.
Figure 60:
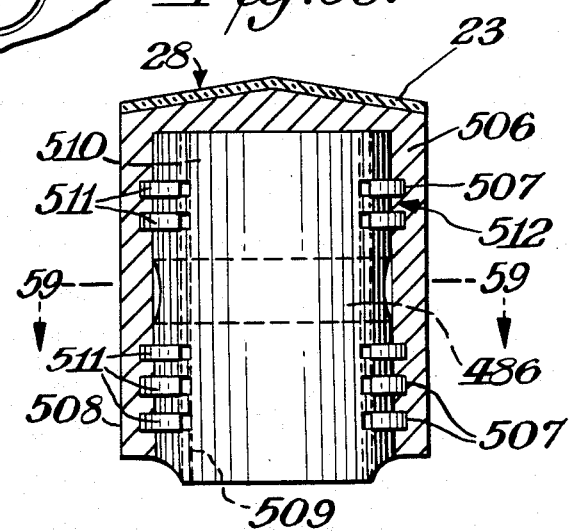
FIG. 60 is a view partly in cross-section, of the piston of FIG. 58 rotated 90° about its vertical axis.

FIG. 59 is a cross-sectional view through the piston pin 486 from the top of the piston assembly 28 taken along the line 59—59 of FIG. 60. The connecting rod 270 is shown in cross-section where it encircles and forms a bearing with the piston pin 486. The piston pin 486 is shown partially in cross-section to illustrate the relationship of the connecting rod 270 and the manner in which the inner sleeve 510 forms the pin bearing support. The outer sleeve 506, with its grooves 507, is shown interlocked with the teeth of the inner sleeve 511, in a manner similar to the breach 512 of a rifle. The outer sleeve grooves 507 are a part of the breach-type interlock 512. The piston sliding seal surface 508 is not penetrated to insert the piston pin 486 in the piston 28 of this invention. The insertion groove in the outer sleeve 509 is used to pass the teeth of the inner shell 511 when assembling the piston 28. The inner sleeve and pin bearing support 510 is shown in the assembled position supporting the piston pin 486 and interlocked by teeth 511 in the outer sleeve groove 507. The inner sleeve teeth 511 are shown interlocked with the outer sleeve grooves 507. The breach-type interlock 512 consists of the inner sleeve teeth 511, the outer sleeve grooves 507 and the insertion grooves in the outer sleeve 509. The breach locking inserts 514 are shown installed to prevent rotation of the inner sleeve 510 with respect to the outer sleeve 506 which would result in disassembly of the piston 28.

FIG. 60 is a side cross-sectional view of the piston 28 rotated 90° in relation to the piston 28 shown in FIG. 58. Ceramic-like thermal insulation 23 is coated on the head of the piston assembly 28. The piston pin 486 is shown for completeness and to again show that the outer seal sleeve is not penetrated. The outer piston sleeve and head 506 are shown with the interlocking grooves 507 engaging the inner sleeve teeth 511. The piston sliding seal surface 508 is shown to emphasize the smooth, uninterrupted surface. One of the two insertion grooves in the outer sleeve 509 shown to communicate the length of the groove 509 is the full length of the inner surface of the outer sleeve 506. The inner sleeve and pin bearing support 510 has teeth 511 for interlocking and forms the outer bearings for the piston pin 486. The assembly procedure includes inserting the piston pin 486 through the hole in the walls of the inner sleeve 510 before inserting into the outer sleeve 506 and rotating 90° to interlock. The inner sleeve teeth 511 are shown interlocked with the outer sleeve grooves 507. The breach-type interlock 512 is shown most clearly in this figure.

Figure 61:
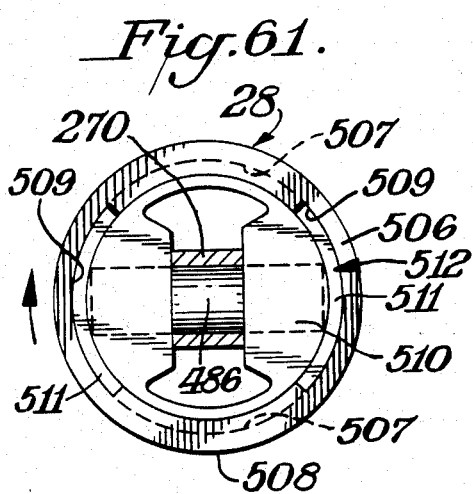
FIG. 61 is a bottom plan view of the piston shown in FIGS. 58, 59 and 60 wherein its inner sleeve and piston pin are rotated 90° with respect to the outer sleeve for assembly.

FIG. 61 is a cross-sectional view through the piston pin 486 from the top of the piston assembly 28. The locking inserts 514 of FIG. 58 have been removed and the outer sleeve 506 has been rotated 90° so the inner sleeve 510 can be pulled out of the outer sleeve 506 for disassembly. The connecting rod 270 is shown in cross-section at the piston pin 486 end. The piston pin 486 is shown for clarity and completeness. The outer piston sleeve 506 is shown rotated 90° with respect to the inner sleeve and pin bearing support 510 to show how the piston assembly 28 is disassembled. The outer sleeve grooves 507 have been disengaged from the inner sleeve teeth 511. The piston sliding seal surface 508 has been included to show that it is not violated by disassembly. The two assembly and disassembly grooves in the outer sleeve 509 are shown in the position to allow withdrawal of the inner sleeve teeth 511. The inner sleeve and pin bearing support 510 are shown in plan view just under the dome position of the outer sleeve 506. This figure shows the pin bearing support strength of the inner sleeve 510. The inner sleeve teeth 511 are shown rotated out of the interlocking grooves of the outer sleeve 507 and ready for withdrawal. The breach-type interlock 512 is shown unlocked (rotated) and ready for withdrawal.

Figure 62:
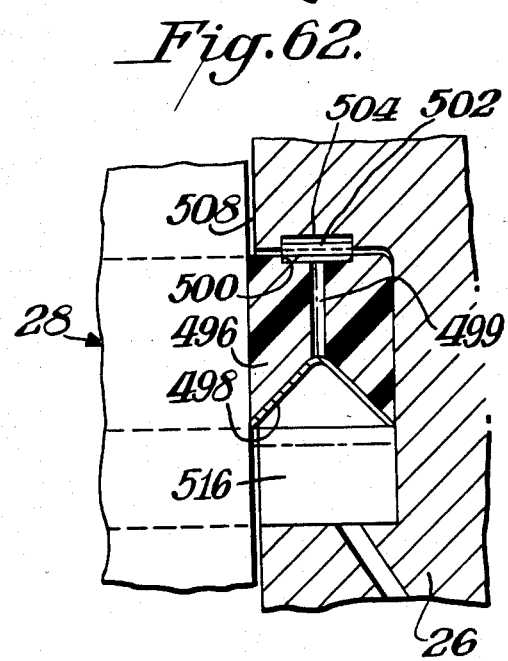
FIG. 62 is an enlarged cross-sectional view of the pressure-balanced seal ring of FIG. 58.

FIG. 62 is an exploded view of the pressure balanced seal ring 496 of FIG. 58. The cylinder sleeve 26 encloses the piston-to-cylinder seal and is a guide for the piston assembly 28. The piston assembly 28 with the exterior sliding seal surface 508 is the component of this engine subject to wear and repair or replacement, instead of the cylinder walls in a conventional engine. The piston-to-cylinder seal ring 496 is made of a filled or unfilled Teflon ®-like material. A Teflon ®-like material has a very low coefficient of friction and good wear characteristics. It will also creep with pressure and time, and in this case pressure on the top and bottom will cause the seal ring 496 to expand in width, reducing the seal clearance and making up for wear. Creep will continue until the pressures on the width are equal to the pressures on the height. When the piston 28 and its seal surface 508 moves down, any oil film on the surface 508 will be pulled into the wedge formed by the radius on the upper corner of the seal ring 496. This wedge of oil will lubricate the seal ring 496 and prevent wear. The oil wedge will also be pulled by adhesion of the seal surface 508 to the oil reservoir formed by seal recess 516. Thus, most of the oil which has found its way past by the seal ring 496 to the combustion chamber side will be returned. The bottom side of the seal ring 496 is "V" shaped and is reinforced by a soft metal-like ring 498. When the piston seal surface 508 moves up, oil is scraped off the piston seal surface 508 by the sharp edge of the wiper ring 498 and only a small amount of oil moves upward by the ring. Thus oil consumption is low.

The function of the seal ring 496 is simple because the combustion chamber pressure above the seal ring 496 is balanced by the pressure of the seal (lube) oil below it (496). When low pressure, approximately less than 40 psi, exists in the combustion chamber, engine lube oil flows into seal recess 516 and moves the seal ring 496 up to the top of the seal recess 516. When the combustion chamber pressure rises above the engine lube oil pressure (i.e. usually in the range of 40 to 80 psi), the seal ring 496 is moved down to increase the seal (lube) oil pressure in seal recess 516. The lube oil does not return to the engine lube oil system because of check valve 490 shown in FIG. 58. The pressures are balanced and zero combustion gas leakage occurs. Some leakage of oil occurs from seal recess 516 to the engine oil sump by capillary flow through the clearance between the piston seal surface 508 and the cylinder sleeve 26. As a result of this sequence, the seal ring 496 moves up to recharge the seal recess 516 with oil, and down to balance pressures across the seal 496 when they are high. The soft metal-like wiper cup 498 is used as a check valve to prevent a significant amount of oil flow to the combustion chamber. The fastener 499 holds the wiper cup 498 and the ratchet ring 500 in place on the seal ring 496. The metal-like ratchet ring 500 is used to rotate the seal ring 496 slowly around the piston 28 and the cylinder sleeve 26. The seal rotation springs 502 om recesses 504 are also used to rotate the seal ring 496. The operation of these parts is described below in the discussion of FIG. 64.

Figure 63:
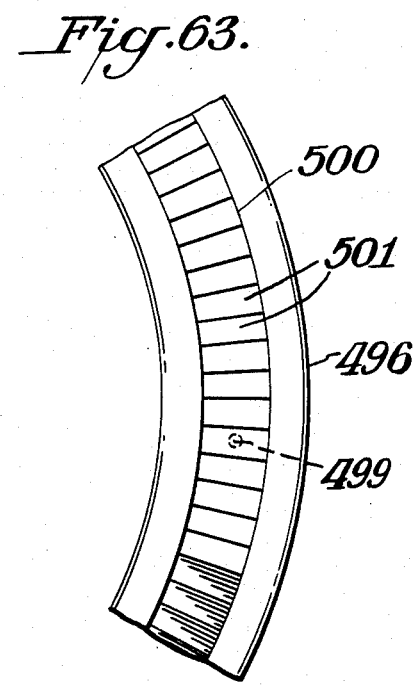
FIG. 63 is a top plan view of a segment of the pressure-balanced seal ring.

FIG. 63 is an enlarged top plan view of a segment of the seal ring 496 and its ratchet ring 500. The Teflon ®-like seal ring 496 is shown for clarity. The fastener 499 and others (not shown) hold the ratchet ring 500 to the top of the seal ring 496. The ratchet ring 500 is used to slowly rotate the seal ring 96 around the piston 28. The teeth of the ratchet ring 501 are saw tooth in shape and allow for one way step movement of the seal ring 496.

Figure 64:
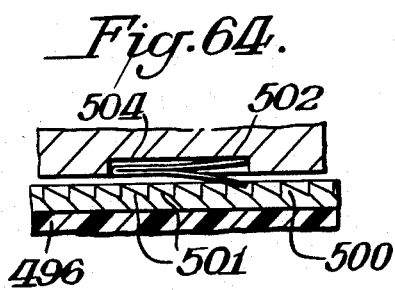
FIG. 64 is a cross-sectional view of the rotation spring and ratchet ring of the pressure-balanced seal.

FIG. 64 is a side cross-sectional view of the parts that step-rotate the seal ring 496 around the piston 28 (not shown). The seal ring 496 is shown in an enlarged side cross-sectional view. The ratchet ring 500 is shown on top of the seal ring 496. The ratchet ring teeth 501 are shown on top of the ratchet ring 500. The seal ring rotation spring(s) 502 are partially enclosed and restricted in longitudinal movement by the ratchet spring(s) recesses 504. As the seal ring 496 moves down to equalize high fluid pressure, the ratchet ring 500 and teeth 501 also move down. The fork spring 502 separate. It can not move to the right or left in the spring recess 504. The lower spring 502 tong arcs to the left and snaps over a ratchet tooth 501. The seal ring 496 rises as a part of the seal sequence, this forces the lower spring 502 tong to arc up to the right. The spring 502 can not move to the left in its recess 504 so force is applied to the ratchet tooth 501 and the ratchet ring 500 and seal ring 496 are moved to the right which is a step in its rotation around the piston 28 (not shown).

While the above detailed description has been presented with reference to the accompanying drawings, it is to be understood that no actual engine has been built to date employing these inventive concepts. Based upon my knowledge of the field and the results obtained from searches of the prior patent art, I will set forth in the claims hereinbelow those concepts and combinations which I believe are new in the world and which are distinguishable from concepts and combinations in the known prior art.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. An improved internal combustion engine having pistons, cylinders forming combustion chambers, intake and exhaust valves, and having means for injecting a combustion fuel and introducing air into the cylinders, means for igniting the fuel and air mixture in the cylinders and means for exhaustng gases from the cylinders following combustion, the improvement comprising continuously adjustable intake and exhaust valve control means, adjustable on demand, which provides a variable air charge and compression ratio coupled with a fixed, high expansion ratio, said expansion ratio being at least 17:1, and means for metering said combustion fuel injected into the combustion chamber just before the end of compression to stoichiometric proportions to match the air charge at all engine loads.

2. An improved four-stroke internal combustion engine having pistons, cylinders forming combustion chambers, intake and exhaust valve, and having means for injecting a combustion fuel and introducing air into the cylinders, means for igniting the fuel and air mixture in the cylinders and means for exhausting gases from the cylinders following combustion, the improvement comprising continuously adjustable intake and exhaust valve control means adjustable on demand, which provides a variable air charge and compression ratio coupled with a fixed, high expansion ratio, said expansion ratio being at least 17:1, and means for metering said combustion fuel injected into the combustion chamber just before the end of compression to stoichiometric proportions to match the air charge at all engine loads.

3. The improved engine of claim 2 having means for adjustably retarding the closing of the intake valves on demand and during engine operation to close each intake valve after the corresponding piston reaches bottom dead center, thereby reducing air pumping losses by eliminating throttling while adjusting the air charge on demand.

4. The improved engine of claim 2 having a continuous, high temperature, direct contact heating element glow plug for igniting combustion.

5. The improved engine of claim 2 having means for providing that no lubricated, sliding surface within each cylinder is directly exposed to combustion chamber gases.

6. The improved engine of claim 2 having means for injecting water into the combustion chambers after air intake, fuel injection and after a part or all of combustion, in proportion to the amount of fuel injected.

7. The improved engine of claim 2 having means for throttling of exhaust gases to provide enhanced engine braking.

8. The improved engine of claim 2 having means for adjustably advancing the closing of the intake valves on demand and during engine operation to close each valve before the corresponding piston reaches bottom dead center, thereby controlling the engine torque and reducing air pumping losses by eliminating throttling.

9. The improved engine of claim 2 having means for effecting a piston-to-cylinder, oil-pressure-balanced gas seal and thereby permitting no gas leakage, a shorter piston design, lower friction losses and less wear.

10. The improved engine of claim 2 having means for adjustable duration opening of an exhaust valve on demand and during engine operation during the compression stroke to effect variable gas charge and compression ratio and a fixed high expansion ratio.

11. The improved engine of claim 2 having thermal insulation on the surfaces of the combustion chambers comprising a layer of a ceramic-like material coated with a platinum-like material and having an outer coating of an iridium-like material.

12. An improved two-stroke internal combustion engine having pistons, cylinders forming combustion chambers, intake and exhaust valves, and having means for injecting a combustion fuel and introducing air into the cylinders, means for igniting the fuel and air mixture in the cylinders and means for exhausting gases from the cylinders following combustion, the improvement comprising continuously adjustable intake and exhaust valve control means, adjustable on demand, which provide a variable air charge and compression ratio coupled with a fixed, high expansion ratio, said expansion ratio being at least 17:1, and means for metering said combustion fuel injected into the combustion chamber just before the end of compression to stoichiometric proportions to match the air charge at all engine loads.

13. The improved engine of claim 12 having means for adjustably retarding the closing of the intake valves on demand and during engine operation to close each intake valve after the corresponding piston reaches bottom dead center, thereby reducing air pumping losses by eliminating throttling while adjusting the air charge on demand.

14. The improved engine of claim 12 having a continuous, high temperature, direct contact heating element glow plug for igniting combustion.

15. The improved engine of claim 12 having means for providing that no lubricated, sliding surface within each cylinder is directly exposed to combustion chamber gases.

16. The improved engine of claim 12 having means for injecting water into the combustion chambers after air intake, fuel injection and after a part or all of combustion, in proportion to the amount of fuel injected.

17. The improved engine of claim 12 having means for effecting a piston-to-cylinder, oil-pressure-balanced gas seal and thereby permitting no gas leakage, a shorter piston design, lower friction losses and less wear.

18. The improved engine of claim 12 having means for adjustably retarding the closing of the exhaust valve on demand and during engine operation to close each exhaust valve after the corresponding piston reaches bottom dead center to effect variable air charge and compression ratio and a fixed high expansion ratio.

19. The improved engine of claim 12 having means for partially opening, during the full two-stroke cycle, at least one valve per cylinder to provide a controlled gas leak from the combustion chamber for enhanced engine braking.

20. The improved engine of claim 12 having thermal insulation on the surfaces of the combustion chambers comprising a layer of a ceramic-like material coated with a platinum-like material and having an outer coating of an iridium-like material.

* * * * *

UNITED STATES PATENT AND TRADEMARK OFFICE
CERTIFICATE OF CORRECTION

PATENT NO. : 4,805,571

DATED : February 21, 1989

INVENTOR(S) : Duane W. Humphrey

It is certified that error appears in the above-identified patent and that said Letters Patent is hereby corrected as shown below:

In col. 1, line 44, please add --high-- between "constant" and "torque".

In col. 1, line 44, please change "of" to --for--.

In col. 1, line 49, please change "are" to --is--.

In col. 2, line 2, please change "kown" to --known--.

In col. 2, line 5, please add --.-- after "efficiency".

In col. 3, lines 41-42, please change "electrical signal" to --electric crystal--.

In col. 4, lines 4-5, please change "generator," to --generators,--

In col. 4, line 21, please add --view-- between "plan" and "partly".

In col. 4, line 34, please change "view" to --views--.

In col. 4, line 62, please change the second "the" to --this--.

In col. 4, line 65, please add --depicted-- between "cylinder" and "at".

In col. 6, line 37, please add --side-- between "cross-sectional" and "view".

In col. 6, line 49, please change "a" to --an--.

In col. 7, line 59, please add --after-- between "until" and "the".

In col. 7, line 60, please change "Thus" to --This--.

UNITED STATES PATENT AND TRADEMARK OFFICE
CERTIFICATE OF CORRECTION

PATENT NO. : 4,805,571

DATED : February 21, 1989

INVENTOR(S) : Duane W. Humphrey

It is certified that error appears in the above-identified patent and that said Letters Patent is hereby corrected as shown below:

In col. 8, line 63, please change "or" to --on--.

In col. 8, line 65, please change "to" to --or--.

In col. 9, line 40, please change "of" to --the--.

In col. 10, line 21, please change "the" to --that--. (1st occurrence)

In col. 10, line 45, please change "as" to --an--.

In col. 11, line 36, please change "combind" to --combined--.

In col. 11, line 36, please add --a-- between "as" and "braking".

In col. 12, line 41, please change "hel" to --help--.

In col. 12, line 53, please change "or" to --of--.

In col. 12, line 64, please add --also-- between "could" and "be".

In col. 12, line 66, please change "heavilyy" to --heavily--.

In col. 13, line 50, please change "with" to --without--.

In col. 15, line 50, please change "covers" to --converts--.

In col. 18, line 23, please add --compressor-- between "conditioning" and "to".

UNITED STATES PATENT AND TRADEMARK OFFICE
CERTIFICATE OF CORRECTION

PATENT NO. : 4,805,571

DATED : February 21, 1989

INVENTOR(S) : Duane W. Humphrey

It is certified that error appears in the above-identified patent and that said Letters Patent is hereby corrected as shown below:

In col. 19, line 17, please add —to— between "move" and "the".

In col. 19, line 27, please change "vave" to —vane—.

In col. 20, line 22, please change "17" to —171—.

In col. 20, line 29, please change "196" to —192—.

In col. 23, line 22, please change "24" to —214—.

In col. 25, line 16, please add —fuel— between "of" and "injected".

In col. 25, line 44, please change "30°" to —30%—.

In col. 25, line 64, please change "445°" to —455°—.

In col. 26, line 15, please delete "the" and add —high—.

In col. 26, line 40, please change "about" to —above—.

In col. 27, line 3, please change "engines" to —engine—.

In col. 27, line 8, please change "ingition" to —ignition—.

In col. 28, line 57, please change "to" to —by—.

In col. 30, line 62, please change "disigned" to —designed—.

In col. 30, line 62, please change "to" to —so—.

UNITED STATES PATENT AND TRADEMARK OFFICE
CERTIFICATE OF CORRECTION

PATENT NO. : 4,805,571

DATED : February 21, 1989

INVENTOR(S) : Duane W. Humphrey

It is certified that error appears in the above-identified patent and that said Letters Patent is hereby corrected as shown below:

In col. 31, line 17, please change "crankshaft" to --crankcase--. (2nd occurr.)

In col. 36, line 61, please change "36" to --360--.

In col. 37, line 10, please change "measurrment" to --measurement--.

In col. 38, line 1, please change "lwoer" to --lower--.

In col. 38, line 38, please add --a-- between "in" and "platinum".

In col. 41, line 12, please change "if" to --is--.

In col. 41, line 47, please change "first" to --firing--.

In col. 42, line 23, please change "42." to --432.--.

In col. 42, line 24, please change "42" to --432--.

In col. 42, line 30, please change "voltage" to --valve--.

In col. 42, line 41, please change "42" to --432--.

In col. 42, line 66, please delete "containers" and substitute therefor --counts--.

In col. 43, line 3, please change "the" to --and--.

In col. 43, line 3, please change "and" to --the--.

In col. 43, line 48, please change "F-11 448" to --FF-11 448--.

In col. 43, line 66, please change "DDC" to --DC--.

UNITED STATES PATENT AND TRADEMARK OFFICE
CERTIFICATE OF CORRECTION

PATENT NO. : 4,805,571

DATED : February 21, 1989

INVENTOR(S) : Duane W. Humphrey

It is certified that error appears in the above-identified patent and that said Letters Patent is hereby corrected as shown below:

In col. 44, line 37, please change "mantain" to --maintain--.

In col. 44, line 44, please add --of-- between "portion" and "engine".

In col. 45, line 2, please change "amplifier" to --amplitude--.

In col. 45, line 66, please change "tor" to --or--.

In col. 46, line 9, please change "head" to --heads--.

In col. 46, line 51, please change "78" to --68--.

In col. 48, line 12, please change "groove" to --grooves--.

In col. 50, lines 11-12, please change "separate." to --separates.--.

In the claims:

In col. 50, line 56, claim 2, please change "valve," to --valves,--.

In col. 51, line 30, claim 9, please change "short" to --shorter--.

In col. 51, line 35, claim 10, please change "gas" to --air--.

Signed and Sealed this

Twentieth Day of March, 1990

Attest:

JEFFREY M. SAMUELS

*Attesting Officer*　　*Acting Commissioner of Patents and Trademarks*